(12) United States Patent
Higuchi et al.

(10) Patent No.: US 7,008,571 B2
(45) Date of Patent: Mar. 7, 2006

(54) OPTICAL COMPONENT AND SULFUR-CONTAINING POLY(THIO)ESTER (CO)POLYMER

(75) Inventors: Chojiro Higuchi, Sodegaura (JP); Atsuo Otsuji, Sodegaura (JP); Kenichi Sugimoto, Sodegaura (JP); Mitsuo Nakamura, Sodegaura (JP); Masatoshi Takagi, Sodegaura (JP); Yasuhiro Nukii, Omuta (JP); Koju Okazaki, Sodegaura (JP)

(73) Assignee: Mitsui Chemicals, Inc., Tokyo (JP)

( * ) Notice: Subject to any disclaimer, the term of this patent is extended or adjusted under 35 U.S.C. 154(b) by 330 days.

(21) Appl. No.: 10/275,704

(22) PCT Filed: Mar. 11, 2002

(86) PCT No.: PCT/JP02/02237

§ 371 (c)(1),
(2), (4) Date: Nov. 8, 2002

(87) PCT Pub. No.: WO02/072670

PCT Pub. Date: Sep. 19, 2002

(65) Prior Publication Data

US 2003/0204030 A1    Oct. 30, 2003

(30) Foreign Application Priority Data

Mar. 9, 2001  (JP)  ............................. 2001-066145
Mar. 9, 2001  (JP)  ............................. 2001-066146

(51) Int. Cl.
B29D 11/00 (2006.01)

(52) U.S. Cl. ........................ 264/1.1; 528/377; 528/390; 528/391; 528/364; 528/365; 427/162

(58) Field of Classification Search ................ 528/377, 528/390, 391, 364, 365; 264/1.1; 427/162
See application file for complete search history.

(56) References Cited

FOREIGN PATENT DOCUMENTS

| JP | 03-043415 A | 2/1991 |
| JP | 09-302094 A | 11/1997 |

OTHER PUBLICATIONS

Machine Translation, JP 09-312094, Endo et al., Nov. 25, 1997.*

* cited by examiner

Primary Examiner—Randy Gulakowski
Assistant Examiner—Christopher Keehan
(74) Attorney, Agent, or Firm—Buchanan Ingersoll PC

(57) ABSTRACT

A poly(thio)ester (co)polymer which comprises a repeating structural unit represented by the formula (1-A) as an essential structural unit:

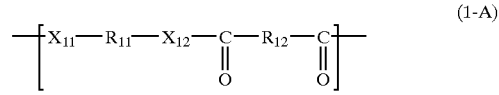

(1-A)

[wherein $R_{11}$ is a divalent aliphatic hydrocarbon group which may contain at least one sulfur atom in a sulfide group; $R_{12}$ is a mono- or poly-cyclic aliphatic or aromatic dicarboxylic acid residue; and $X_{11}$ and $X_{12}$ are each independently an oxygen atom or sulfur atom, and when $X_{11}$ and $X_{12}$ are the oxygen atoms, $R_{11}$ is a divalent aliphatic hydrocarbon group containing at least one sulfur atom in the sulfide group]; and an optical component obtainable by molding the poly(thio)ester (co)polymer. The poly(thio)ester (co)polymer is excellent in transparency and optical characteristics (e.g., a higher refractive index, higher Abbe number, and lower birefringence), and has also good mechanical characteristics and thermal characteristics, and further is excellent in melt fluidity and injection moldability.

37 Claims, No Drawings

OPTICAL COMPONENT AND SULFUR-CONTAINING POLY(THIO)ESTER (CO)POLYMER

TECHNICAL FIELD

The present invention relates to an optical component obtainable by molding a poly(thio)ester (co)polymer containing a specific repeating structural unit as an essential structural unit.

The present invention also relates to a poly(thio)ester (co)polymer containing a specific repeating structural unit, and a resin composition comprising the above (co)polymer.

The optical component of the present invention which can be obtained by molding the poly(thio)ester (co)polymer is excellent in transparency, mechanical characteristics (e.g., impact resistance) and thermal characteristics, and has a relatively high refractive index, a low chromatic aberration (high Abbe number) and a low birefringence as well as rich melt fluidity and good moldability. Accordingly, the above optical component is useful as a molding material for a variety of optical components such as plastic optical lenses typified by vision-correcting eyeglass lenses (spectacles lenses) and pickup lenses, optical disk boards for information record, plastic boards for liquid crystal cells, optical fibers, and optical waveguides.

BACKGROUND ART

Inorganic glass has been widely used in various fields as a transparent optical material, because of its favorable properties, e.g., high transparency and low optical anisotropy. However, it has some disadvantages of being heavy, fragile, poor in productivity and the like. Therefore, various optical resins have been extensively developed to replace the inorganic glass.

One of the basically most important characteristics as the optical resins is transparency. The highly transparent optical resins which are known so far include polymethyl methacrylate (PMMA), bisphenol A polycarbonate (BPA-PC), polystyrene (PS), methyl methacrylate/styrene copolymer (MS), styrene/acrylonitrile copolymer (SAN), poly(4-methyl-1-pentene) (TPX), polycycloolefin (COP), polydiethylene glycol bisallyl carbonate (EGAC) and polyurethane (PTU).

The PMMA has been widely used as one of the typical optical resins, because of excellent transparency and weather resistance as well as good moldability. However, it has disadvantages of a relatively low refractive index (nd) of 1.49 and high water absorbing properties.

The BPA-PC has been used in optical applications typified by optical disk boards for information record, because of excellent transparency, heat resistance and impact resistance as well as a relatively high refractive index (nd: 1.59). However, the BPA-PC has disadvantages of a relatively high aberration (dispersion of refractive index) and birefringence, high melt viscosity, and relatively poor moldability, which have limited its applications as the optical resin.

The PS and MS have high moldability, high transparency, low water absorbing properties and a high refractive index. However, they have been scarcely used as the optical resins, because of their disadvantages of insufficient resistance to impact, weather and heat. Furthermore, the SAN is relatively high in refractive index, and is considered to have balanced mechanical properties. However, it is also scarcely used as the optical resin, because of its relatively insufficient heat resistance (thermal deformation temperature: 80 to 90° C.).

The TPX and COP, although being excellent in transparency, having low water absorbing properties and being excellent in heat resistance, have disadvantages of a low refractive index (nd: 1.47 to 1.53), and insufficient impact resistance, gas barrier properties and dye-affinity.

The EGAC is a thermosetting resin obtained by polymerizing diethylene glycol bisallyl carbonate which is a monomer, and has been most widely used for common spectacles lenses. It has favorable characteristics of high transparency, high heat resistance and a very low chromatic aberration, but disadvantages of a low refractive index (nd: 1.50) and slightly poor impact resistance.

The PTU is a thermosetting resin obtained by the reaction between a diisocyanate compound and a polythiol compound, and most widely used at present for spectacles lenses of a high refractive index. It is the very excellent optical resin having, particularly, excellent transparency and impact resistance, and a high refractive index and a relatively low chromatic aberration. However, it needs a long thermal polymerization/molding time (1 to 3 days) in a spectacles lens production process, which is essentially its sole major disadvantage. Accordingly, it involves the productivity-related problems.

Novel polycarbonate-based thermoplastic optical resins have been proposed, in order to solve the disadvantages involved in the above-described bisphenol A polycarbonate (BPA-PC, hereinafter referred to as the general-purpose polycarbonate) which is one of the typical optical resins, and to produce high-quality optical components in a short time by injection molding. For example, Japanese Patent Laid-open Publication Nos. 66234/1989 and 223119/1989 disclose that a polymer such as an alicyclic polycarbonate copolymer having a repeating structural unit derived from an alicyclic dihydroxy compound has a relatively low chromatic aberration (high Abbe number) and a low birefringence, and they propose its optical applications. The polymers given by these processes can be injection-molded in a short time into optical components. However, it is difficult for these components to sufficiently satisfy requirements of the practical optical components, although having favorable characteristics, e.g., a high Abbe number or a relatively low birefringence. More specifically, they have several practical problems to be solved when used for spectacles lenses, and for example, they are relatively low in refractive index and hardly sufficient in heat resistance.

As described above, each of the conventional optical resins involves its own disadvantages and problems to be solved, though has been put to practical use while taking its characteristics into consideration for specific purposes. Under such circumstances, there are nowadays-keen demands for novel thermoplastic optical resins which are excellent in transparency and optical characteristics (e.g., a high refractive index, a high Abbe number and a low birefringence), good in mechanical characteristics (e.g., impact resistance) and thermal characteristics (e.g., thermal deformation temperature), and excellent in melt fluidity.

DISCLOSURE OF THE INVENTION

It is an object of the present invention to provide a novel thermoplastic optical resin excellent in transparency and optical characteristics (e.g., a high refractive index, a high Abbe number and a low birefringence), good in mechanical and thermal characteristics, and excellent in melt fluidity and injection moldability by solving the above disadvantages involved in the conventional optical resins.

The inventors of the present invention have extensively studied to solve the above problems, and as a result, the present invention has been achieved.

That is, the present invention provides:

(1) an optical component obtained by molding a poly(thio)ester (co)polymer comprising a repeating structural unit represented by the formula (1-A) as an essential structural unit:

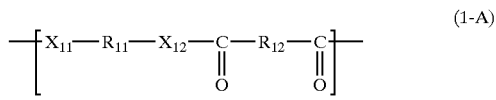
(1-A)

[wherein $R_{11}$ is a cyclic alkylene group, straight-chain or cyclic alkylene group containing at least one sulfur atom in a sulfide group, or a combination of the straight-chain and cyclic alkylene groups; $R_{12}$ is a mono- or poly-cyclic aliphatic or aromatic dicarboxylic acid residue; and $X_{11}$ and $X_{12}$ are each independently an oxygen atom or sulfur atom, and when $X_{11}$ and $X_{12}$ are the oxygen atoms, $R_{11}$ is a straight-chain or cyclic alkylene group containing at least one sulfur atom in the sulfide group, or a combination of the straight-chain and cyclic alkylene groups], (2) the optical component, wherein $R_{12}$ in the formula (1-A) is a mono- or poly-cyclic aliphatic dicarboxylic acid residue, (3) the optical component, wherein $R_{12}$ in the formula (1-A) is represented by one of the following formulae:

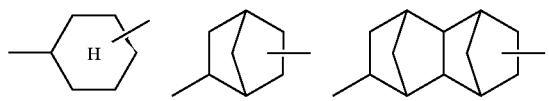

(4) the optical components of (1) to (3), wherein $R_{11}$ in the formula (1-A) is a straight-chain or cyclic alkylene group containing at least one sulfur atom in the sulfide group, or a combination of the straight-chain and cyclic alkylene groups, (5) the optical component of (4), wherein $R_{11}$ in the formula (1-A) is represented by one of the following formulae:

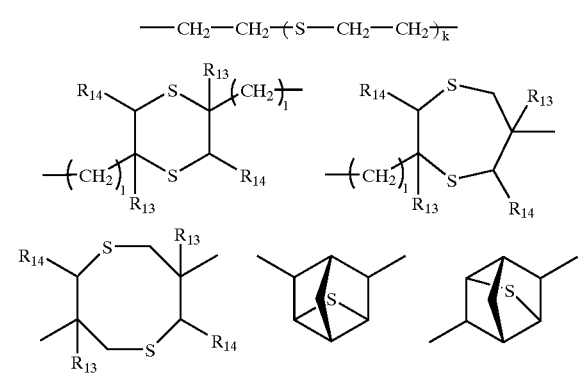

(wherein "k" is an integer of 1 to 4; "l" is an integer of 0 to 3; and $R_{13}$ and $R_{14}$ are each a hydrogen atom or alkyl group), (6) the optical component of (5), wherein $R_{12}$ in the formula (1-A) is represented by one of the following formulae:

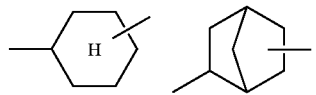

and $R_{11}$ is represented by one of the following formulae:

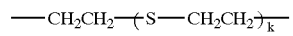

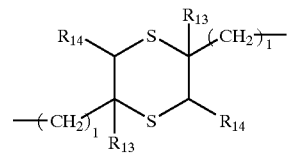

(wherein "k" is an integer of 1 to 4; "l" is an integer of 0 to 3; $R_{13}$ and $R_{14}$ are each a hydrogen atom or alkyl group; and $X_{11}$ and $X_{12}$ are each a sulfur atom), (7) the optical component of (1), wherein $R_{12}$ in the formula (1-A) is a group represented by the following formula:

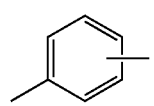

and $R_{11}$ is a group represented by one of the following formulae:

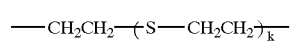

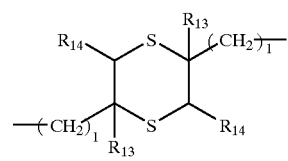

(wherein "k" is an integer of 1 to 4; "l" is an integer of 0 to 3; $R_{13}$ and $R_{14}$ are each a hydrogen atom or alkyl group; and $X_{11}$ and $X_{12}$ are each a sulfur atom), and (8) the optical components of (1) to (7), wherein the poly(thio)ester (co)polymer further contains a repeating structural unit represented by the formula (1-B):

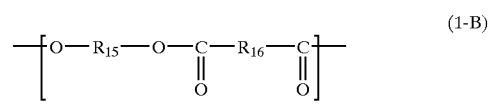
(1-B)

(wherein $R_{15}$ is a bivalent alicyclic hydrocarbon group; and $R_{16}$ is an alicyclic or aromatic dicarboxylic acid residue).

Furthermore, the present invention provides:
(9) a poly(thio)ester (co)polymer comprising a repeating structural unit represented by the formula (1-A) as an essential structural unit:

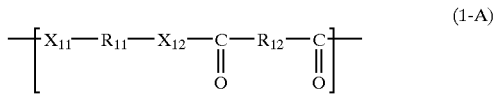

(1-A)

[wherein $R_{11}$ is a cyclic alkylene group, straight-chain or cyclic alkylene group containing at least one sulfur atom in a sulfide group, or a combination of the straight-chain and cyclic alkylene groups; $R_{12}$ is a mono- or poly-cyclic aliphatic or aromatic dicarboxylic acid residue; and $X_{11}$ and $X_{12}$ are each independently an oxygen atom or sulfur atom, and when $X_{11}$ and $X_{12}$ are the oxygen atoms, $R_{11}$ is a straight-chain or cyclic alkylene group containing at least one sulfur atom in the sulfide group, or a combination of the straight-chain and cyclic alkylene groups],

(10) the poly(thio)ester (co)polymer of (9), wherein $R_{12}$ in the formula (1-A) is a mono- or poly-cyclic aliphatic dicarboxylic acid residue,

(11) the poly(thio)ester (co)polymer of (10), wherein $R_{12}$ in the formula (1-A) is represented by one of the following formulae:

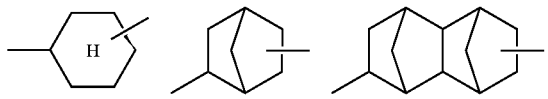

(12) the poly(thio)ester (co)polymers of (9) to (11), wherein $R_{11}$ in the formula (1-A) is a straight-chain or cyclic alkylene group containing at least one sulfur atom in the sulfide group, or a combination of the straight-chain and cyclic alkylene groups,

(13) the poly(thio)ester (co)polymer of (12), wherein $R_{11}$ in the formula (1-A) is represented by one of the following formulae:

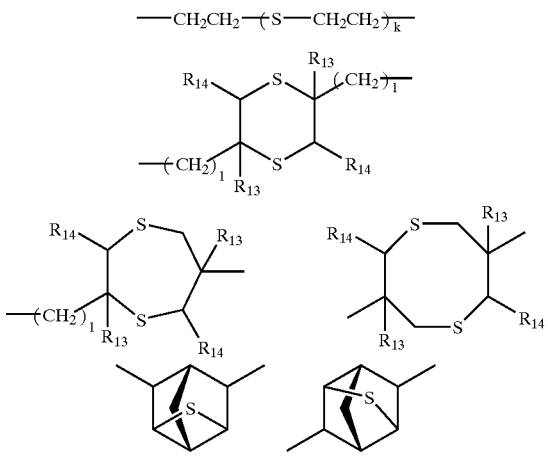

(wherein "k" is an integer of 1 to 4; "l" is an integer of 0 to 3; and $R_{13}$ and $R_{14}$ are each a hydrogen atom or alkyl group),

(14) the poly(thio)ester (co)polymer of (13), wherein $R_{12}$ in the formula (1-A) is represented by one of the following formulae:

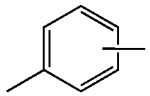

and $R_{11}$ is represented by one of the following formulae:

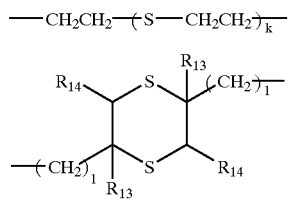

(wherein "k" is an integer of 1 to 4; "l" is an integer of 0 to 3; $R_{13}$ and $R_{14}$ are each a hydrogen atom or alkyl group; and $X_{11}$ and $X_{12}$ are sulfur atoms),

(15) the poly(thio)ester (co)polymer of (9), wherein $R_{12}$ in the formula (1-A) is represented by the following formula:

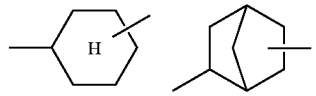

and $R_{11}$ is represented by one of the following formulae:

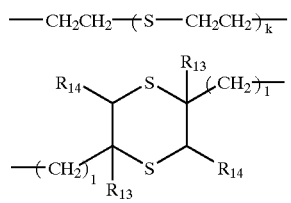

(wherein "k" is an integer of 1 to 4; "l" is an integer of 0 to 3; $R_{13}$ and $R_{14}$ are each a hydrogen atom or alkyl group; and $X_{11}$ and $X_{12}$ are sulfur atoms), and

(16) the poly(thio)ester (co)polymers of (9) to (15), which further contains a repeating structural unit represented by the formula (1-B):

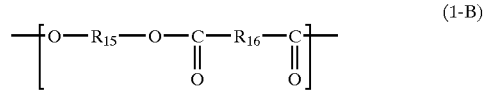

(1-B)

(wherein $R_{15}$ is a bivalent alicyclic hydrocarbon group; and $R_{16}$ is an alicyclic or aromatic dicarboxylic acid residue).

Moreover, the preferred embodiments of the poly(thio)ester copolymer of the present invention include:

(17) the poly(thio)ester copolymer (16), which comprises repeating structural units represented by the formulae (2-A) and (2-B):

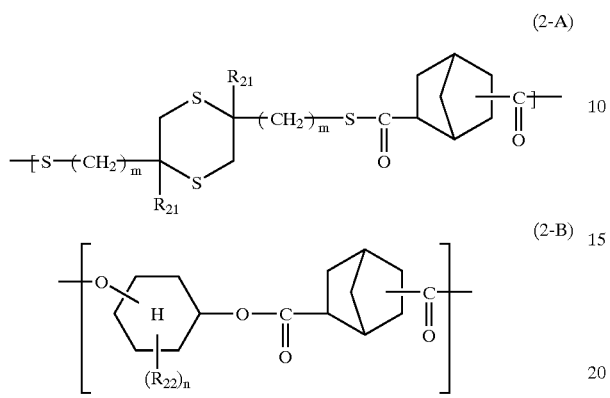

(2-A)

(2-B)

(wherein each $R_{21}$ is a hydrogen atom or alkyl group; each $R_{22}$ is independently an alkyl or alkoxy group, or a halogen atom; each "m" is an integer of 0 to 3; and each "n" is an integer of 0 to 4),

(18) the poly(thio)ester copolymer of (16), which comprises repeating structural units represented by the formulae (2-A) and (3-B):

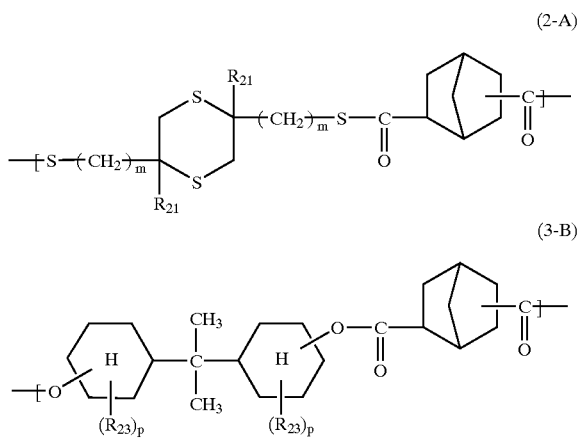

(2-A)

(3-B)

(wherein each $R_{21}$ is a hydrogen atom or alkyl group; each $R_{23}$ is independently an alkyl or alkoxy group, or a halogen atom; each "m" is an integer of 0 to 3; and each "p" is an integer of 0 to 4),

(19) the poly(thio)ester copolymer of (16), which comprises repeating structural units represented by the formulae (3-A) and (4-B):

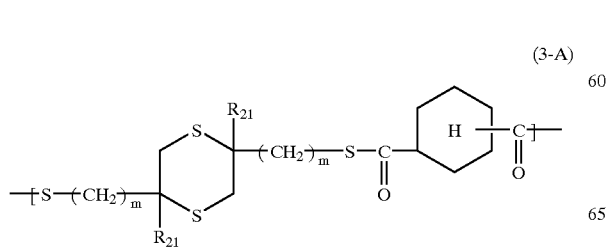

(3-A)

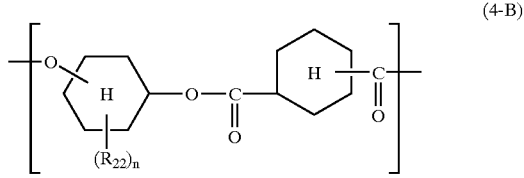

(4-B)

(wherein each $R_{21}$ is a hydrogen atom or alkyl group; each $R_{22}$ is independently an alkyl or alkoxy group, or a halogen atom; each "m" is an integer of 0 to 3; and each "n" is an integer of 0 to 4),

(20) the poly(thio)ester copolymer of (16), which comprises repeating structural units represented by the formulae (3-A) and (5-B):

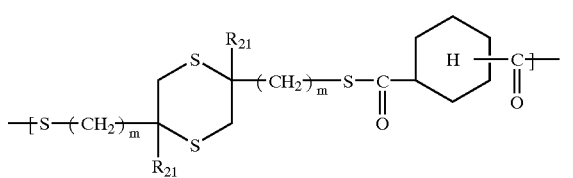

(3-A)

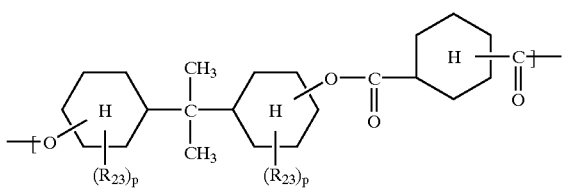

(5-B)

(wherein each $R_{21}$ is a hydrogen atom or alkyl group; each $R_{23}$ is independently an alkyl or alkoxy group, or a halogen atom; each "m" is an integer of 0 to 3; and each "p" is an integer of 0 to 4),

(21) the poly(thio)ester copolymer of (16), which comprises repeating structural units represented by the formulae (4-A) and (6-B):

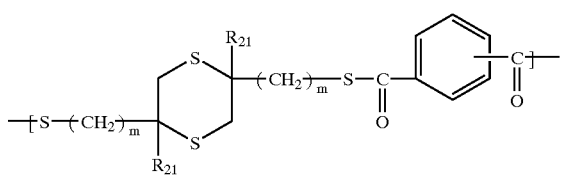

(4-A)

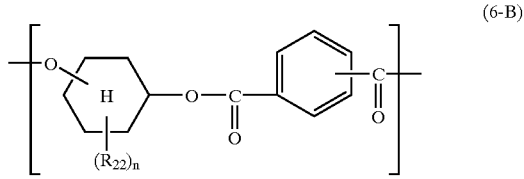

(6-B)

(wherein each R21 is a hydrogen atom or alkyl group; each $R_{22}$ is independently an alkyl or alkoxy group, or a halogen atom; each "m" is an integer of 0 to 3; and each "n" is an integer of 0 to 4),

(22) the poly(thio)ester copolymer of (16), which comprises repeating structural units represented by the formulae (4-A) and (7-B):

(4-A)

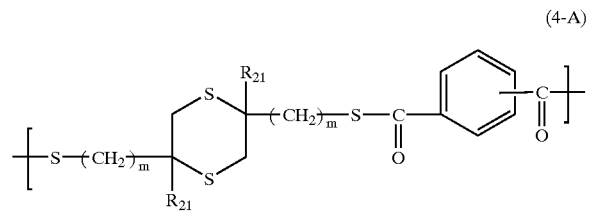

(7-B)

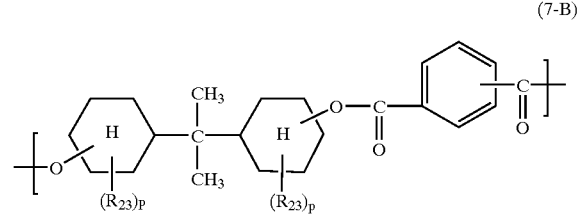

(wherein each $R_{21}$ is a hydrogen atom or alkyl group; each $R_{23}$ is independently an alkyl or alkoxy group, or a halogen atom; each "m" is an integer of 0 to 3; and each "p" is an integer of 0 to 4),

(23) the poly(thio)ester copolymers of (17) to (22), which further contains a repeating structural unit represented by the formula (1-C):

(1-C)

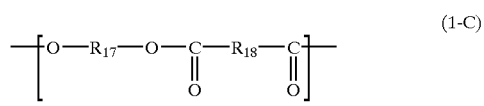

(wherein $R_{17}$ is a bivalent aromatic hydrocarbon group; and $R_{18}$ is an alicyclic or aromatic dicarboxylic acid residue).

The present invention is further concerned with a resin composition comprising the above poly(thio)ester copolymers (17) to (23), an optical component comprising the above poly(thio)ester copolymers of (17) to (23), and an optical component obtained by molding the resin composition.

BEST MODE FOR CARRYING OUT THE INVENTION

The present invention will be described in more detail.

First, the optical component obtained by molding the poly(thio)ester (co)polymer comprising a repeating structural unit represented by the formula (1-A) as an essential structural unit will be described.

The poly(thio)ester (co)polymer of the present invention is a polymer produced by the reaction of a dicarboxylic compound with a dihydroxy and/or dithiol compound, and has a linear polymer structure. It differs from the so-called thermosetting resin, which is crosslinked under heat into a polymer of network structure.

The poly(thio)ester (co)polymer is molten and fluidized, when heated at a certain temperature or above, and can be molded into a shape. Its polymer molecules may be partly crosslinked with each other to an extent not harmful to the shaping/molding process for the (co)polymer. In such a case, it is also defined that the poly(thio)ester (co)polymer is an essentially linear structure.

In the formula (1-A), $R_{11}$ is a cyclic alkylene group, straight-chain or cyclic alkylene group containing at least one sulfur atom in a sulfide group, or a combination of the straight-chain and cyclic alkylene groups. When $X_{11}$ and $X_{12}$ are oxygen atoms, $R_{11}$ is a straight-chain or cyclic alkylene group containing at least one sulfur atom in the sulfide group, or a combination of the straight-chain and cyclic alkylene groups.

$R_{11}$ is preferably a cyclic alkylene group having a total carbon number of 6 to 12, straight-chain or cyclic alkylene group having a total carbon number of 1 to 20 and containing at least one sulfur atom in the sulfide group, or a combination of the straight-chain and cyclic alkylene groups; more preferably cyclohexylene group, straight-chain alkylene group having a total carbon number of 1 to 12 or cyclic alkylene group having a total carbon number of 5 to 12, each containing at least one sulfur atom in the sulfide group, or a combination of the straight-chain and cyclic alkylene groups; still more preferably straight-chain alkylene group having a total carbon number of 1 to 8, cyclic alkylene group having a total carbon number of 5 to 10, each containing at least one sulfur atom in the sulfide group, or a combination of the straight-chain and cyclic alkylene groups.

$R_{11}$ may contain a hetero atom, e.g., oxygen, in addition to sulfur. It preferably contains at least one sulfur atom in the sulfide group, to have a high refractive index and Abbe number as the intended effects of the present invention, more preferably two or more sulfur atoms in each sulfide group.

Still more preferably, the $R_{11}$ group is one of the following groups:

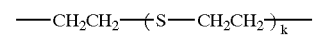

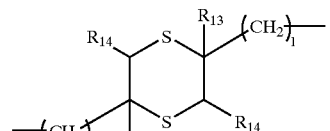

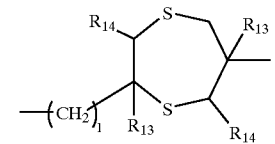

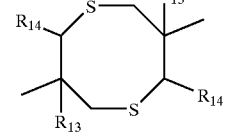

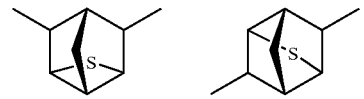

and of these groups, the following are particularly preferable:

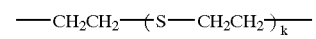

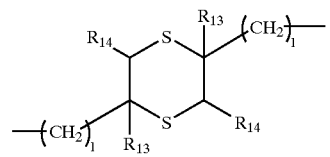

In the above formulae, "k" is an integer of 1 to 4, preferably of 1 to 3, more preferably 1 or 2, still more preferably 1.

"l" is an integer of 0 to 3, preferably of 0 to 2, more preferably 0 or 1, still more preferably 1.

$R_{13}$ and $R_{14}$ are each a hydrogen atom or alkyl group, preferably the hydrogen atom or alkyl group of 1 to 4 carbon atoms, more preferably the hydrogen atom or methyl group, still more preferably the hydrogen atom.

In the formula (1-A), $R_{12}$ is a mono- or poly-cyclic aliphatic or aromatic dicarboxylic acid residue.

It is preferably a mono- or poly-cyclic aliphatic or aromatic dicarboxylic acid residue having a total carbon number of 5 to 20, more preferably 6 to 12.

More specifically, the mono- or poly-cyclic aliphatic dicarboxylic acid residue include the followings:

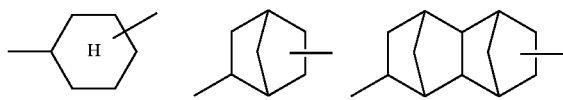

The mono- or poly-cyclic aromatic dicarboxylic acid residue include the followings:

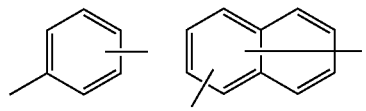

In order to securely obtain the intended effect of the present invention (high Abbe number), $R_{12}$ is preferably a mono- or poly-cyclic aliphatic dicarboxylic acid residue having a total carbon number of 6 to 12, more preferably a mono- or poly-cyclic aliphatic dicarboxylic acid residue represented by one of the following formulae:

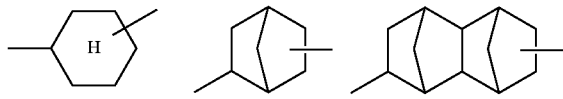

still more preferably a divalent mono- or poly-cyclic aliphatic dicarboxylic acid residue represented by one of the following formulae:

The poly(thio)ester (co)polymer containing the repeating structural unit represented by the formula (1-A) is suitably produced by various (thio)ester polymerization processes, the reactions involved therein being by themselves known (e.g., those described in Jikken Kagaku Kouza, version 4 (Vol. 28), Synthesis of Polymers, P. 217 to 231, Maruzen (1988)).

These polymerization processes typically include melt polymerization which uses dicarboxylic acid chloride or the like, solution polymerization, interfacial polymerization, trans-esterification and direct polymerization.

More specifically, these polymerization processes include:

(I) (thio)esterification in which an acid halide (e.g., acid chloride or bromide) of a dicarboxylic acid represented by the formula (2) reacts with a dithiol or/and dihydroxy compound represented by the formula (1) in the presence or absence of a solvent for the dehydrohalogenation, (II) (thio)esterification in which an ester (alkyl ester, e.g., methyl, ethyl, n-propyl, n-butyl, isobutyl or tert-butyl ester, aryl ester, e.g., phenyl ester, or the like) of a dicarboxylic acid represented by the formula (2) reacts with a dithiol or/and dihydroxy compound represented by the formula (1) in the presence or absence of a solvent for the trans-esterification, and (III) (thio)esterification in which a dicarboxylic acid represented by the formula (2) reacts with a dithiol or/and dihydroxy compound represented by the formula (1) in the presence or absence of a solvent for the dehydration/condensation.

In these processes, an acid or base (inorganic or organic) may be used, as required, to promote the reaction more efficiently.

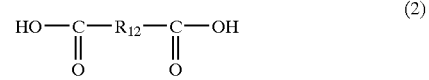

(wherein $R_{11}$, $R_{12}$, $X_{11}$ and $X_{12}$ are the same as described above).

For the dithiol or dihydroxy compounds represented by the formula (1), various compounds industrially available or obtainable by known processes can be suitably used. These compounds include, but not limited to, 1,4-cyclohexanedithiol, 1,3-cyclohexanedithiol, 1,2-cyclohexanedithiol, 1,4-bis(mercaptomethyl)cyclohexane, 1,3-bis-(mercaptomethyl)cyclohexane, 1,2-bis(mercaptomethyl)-cyclohexane, bis(2-mercaptoethyl)sulfide, bis(2-mercaptoethylthio)ethane, 2,5-bis(mercaptomethyl)-1,4-dithian, 2,5-bis(mercapto-methyl)-2,5-dimethyl-1,4-dithian, 2-mercaptomethyl-6-mercapto-1,4-dithiacycloheptane, 3,7-dimercapto-1,5-dithiacyclooctane, 2,5-bis(hydroxymethyl)-1,4-dithian, 2,5-bis(hydroxymethyl)-2,5-dimethyl-1,4-dithian, 2-hydroxymethyl-6-hydroxy-1,4-dithiacycloheptane, 3,7-dihydroxy-1,5-dithiancyclooctane, 2,4-bis(mercaptomethyl)-1,3-dithiolan, 4,5-bis(mercaptomethyl)-1,3-dithian, 2,4-bis(hydroxymethyl)-1,3-dithiolan, 4,5-bis(hydroxymethyl)-1,3-dithian, 2-mercaptomethyl-4-hydroxymethyl-1,3-dithiolan, 2,6-dimercapto-8-thiatricyclo[2.2.1.1$^{3,5}$]octane, 2,5-dimercapto-8-thiatricyclo[2.2.1.1$^{2,3}$]octane, 2,6-dihydroxy-8-thiatricyclo[2.2.1.1$^{3,5}$]octane, and 2,5-dihydroxy-8-thiatricyclo[2.2.1.1$^{2,3}$]octane.

Some of more typical processes for producing the dithiol or dihydroxy compound represented by the formula (1) will be described below. The dithiol compound, e.g., 2,5-bis(hydroxymethyl)-1,4-dithian and 2,5-bis(mercaptomethyl)-1,4-dithian, can be produced by a process described in Japanese Patent laid-open Publication No. 3-236836 or Journal of Organic Chemistry, Vol. 34, P. 3389 to 3391 (1969).

The dihydroxy compound, e.g., 2,5-bis(hydroxymethyl)-1,4-dithian, 3-hydroxy-6-hydroxymethyl-1,5-dithiacycloheptane, 3,7-dihydroxy-1,5-dithiacyclooctane, 2,5-bis(hydroxymethyl)-1,4-dithian or 2,5-bis(hydroxymethyl)-2,5-dimethyl-1,4-dithian, is produced by hydrolyzing the dihalogenated compound represented by the formula (3) as the intermediate for the dithiol compound, e.g., 2,5-bis (mercaptomethyl)-1,4-dithian or 2,5-bis(mercaptomethyl)-2,5-dimethyl-1,4-dithian, in a protonic polar solvent in the presence of an alkali metal or its salt.

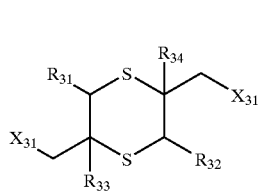

(3)

(wherein $R_{31}$, $R_{32}$, $R_{33}$ and $R_{34}$ are each a hydrogen atom or alkyl group; and $X_{31}$ is fluoro, chloro, bromo or iodo group).

The protonic polar solvents useful for the above hydrolysis process include, but not limited to, water, methanol, ethanol, isopropanol and n-butanol. The alkali metals and their salts useful for the hydrolysis process include sodium bicarbonate, sodium carbonate, potassium carbonate, sodium hydroxide and potassium hydroxide. They may be used under the conditions normally used for hydrolysis with the aid of an alkali.

It should be noted, however, that hydrolysis of the dihalogenated compound represented by the formula (3) may produce, in addition to 2,5-bis(hydroxymethyl)-1,4-dithian, a mixture of by-product dihydroxy compounds, e.g., 3-hydroxy-6-hydroxymethyl-1,5-dithiacycloheptane and 3,7-dihydroxy-1,5-dithiacyclooctane, depending on the hydrolysis conditions. Therefore, each compound is obtained by a separation and purification process, e.g., column chromatography or fractionation.

The dihydroxy compound, e.g., 2,6-dihydroxy-8-thiatricyclo[2.2.1.1$^{3,5}$]octane or 2,5-dihydroxy-8-thiatricyclo[2.2.1.1$^{2,3}$]octane is produced by a known process described in, e.g., Journal of Organic Chemistry, Vol. 34, p. 3998 to 4002 (1968), where a dihalogenated compound, e.g., 2,6-dichloro-8-thiatricyclo[ 2.2.1.1$^{3,5}$]octane or 2,5-dichloro-8-thiatricyclo[2.2.1.1$^{2,3}$]octane, is hydrolyzed.

Some of the alicyclic dithiol or dihydroxy compounds have a stereoisomer, e.g., cis, trans, exo or endo. Any stereoisomer of the alicyclic dithiol or dihydroxy compound is useful for the present invention. Each of these isomers may be individually used after being isolated, or a mixture of these isomers may be used.

For the dicarboxylic acids represented by the formula (2), various compounds industrially available or obtainable by known processes can be suitably used.

These compounds include, but not limited to, monocyclic aliphatic dicarboxylic acids, e.g., 1,4-cyclohexanedicarboxylic acid, 1,3-cyclohexanedicarboxylic acid and 1,2-cyclohexanedicarboxylic acid; polycyclic aliphatic dicarboxylic acids, e.g., norbornane-2,5-dicarboxylic acid, norbornane-2,6-dicarboxylic acid and norbornane-2,3-dicarboxylic acid; and aromatic dicarboxylic acids, e.g., terephthalic acid, isophthalic acid, phthalic acid, 2,6-naphthalenedicarboxylic acid, 1,4-naphthalenedicarboxylic acid and 1,5-naphthalenedicarboxylic acid.

Some of the alicyclic dicarboxylic acids or derivatives thereof (acid halides or esters) have a stereoisomer, e.g., cis, trans, exo or endo, in addition to positional isomer. Any positional isomer and stereoisomer of the alicyclic dicarboxylic acid or a derivative thereof (acid halide or ester) are useful for the present invention. Each of these isomers may be individually used after being isolated, or a mixture of these isomers may be used.

The more preferable repeating structural units represented by the formula (1-A) for the present invention include:

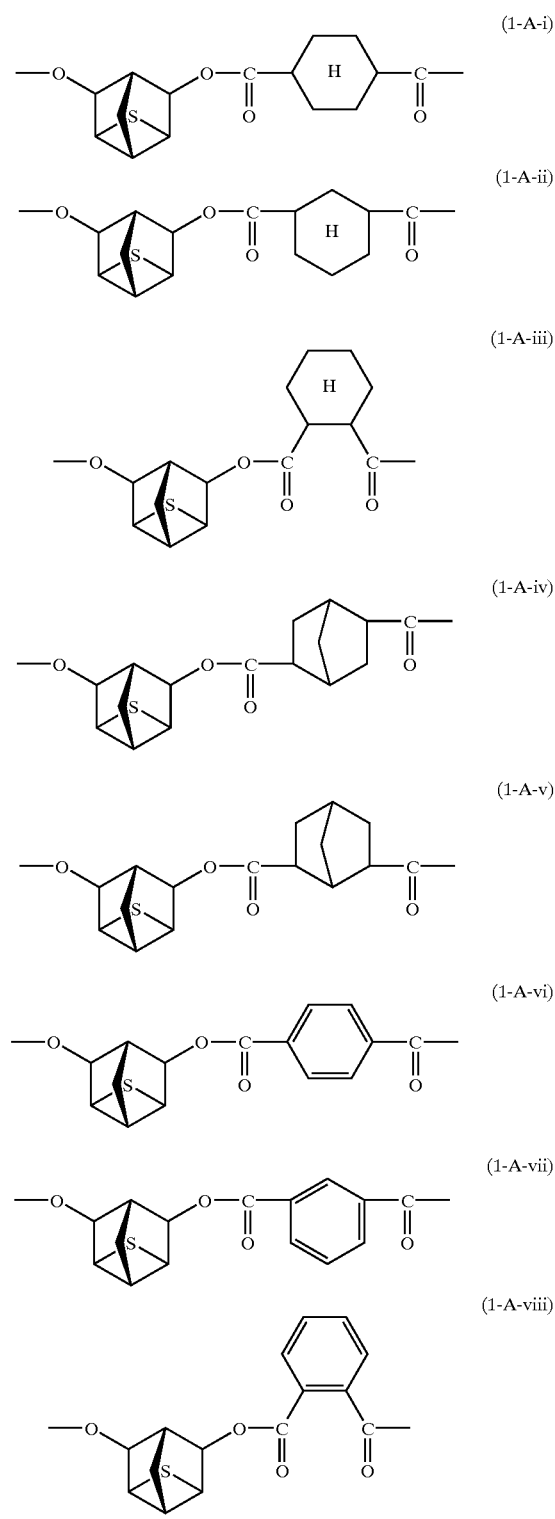

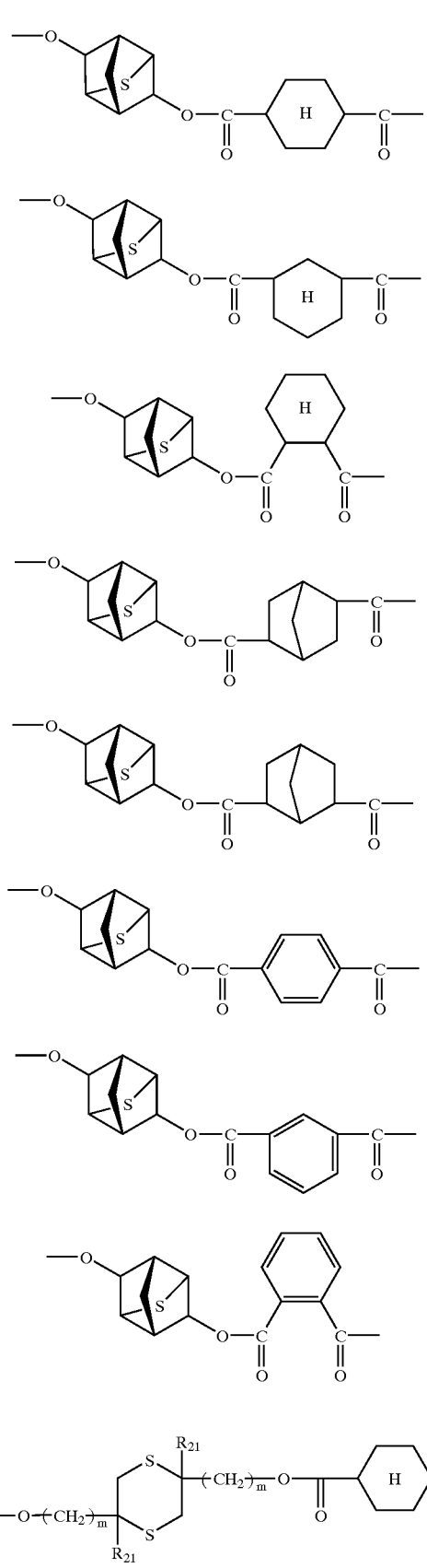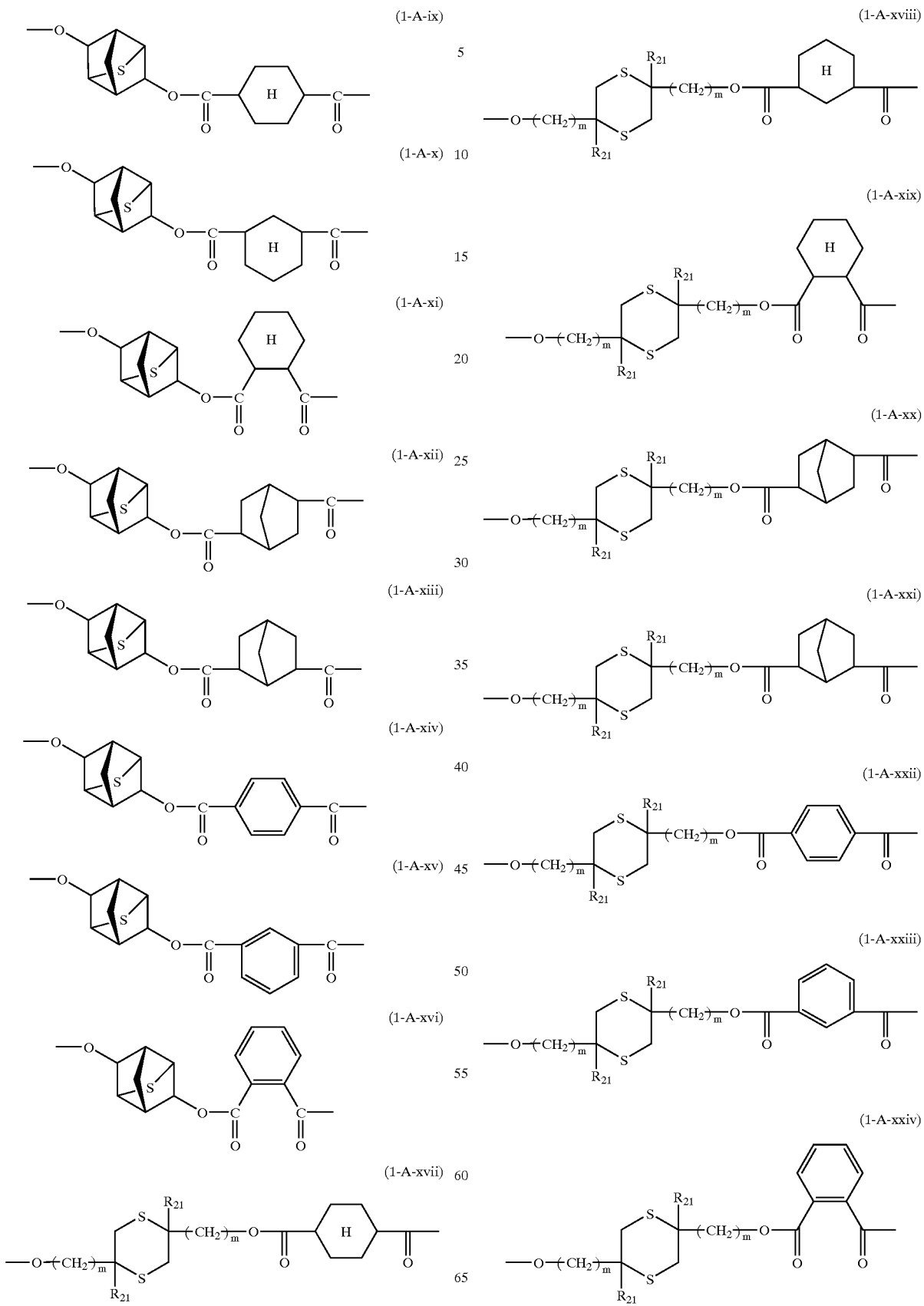

-continued

The poly(thio)ester (co)polymer of the present invention may be a two component system or a multi-component system having three or more components of which the repeating structural units represented by the formula (1-A) are different each other.

The dithiol/dihydroxy compound represented by the formula (1) as the starting monomer for the poly(thio)ester (co)polymer of the present invention may have a stereoisomer, and the monocyclic or polycyclic aliphatic dicarboxylic acid represented by the formula (2) or a derivative thereof has a positional and steric isomer. As a result, the repeating structural unit represented by the formula (1-A) normally has two or more different types of the isomers derived from the positional or steric isomer. The repeating structural unit for the poly(thio)ester (co)polymer of the present invention may contain a mixture of these isomers, or may contain only a specific isomer.

The poly(thio)ester (co)polymer of the present invention is characterized by containing the repeating structural unit represented by the formula (1-A) as an essential structural unit. However, it is preferable that the poly(thio)ester (co)polymer simultaneously contains one or more repeating structural units other than that represented by the formula (1-A), in order to satisfy the properties which the optical component is required to have.

That is, in order to obtain the desired effect of the present invention, among the poly(thio)ester (co)polymers of the present invention, a two-component copolymer containing the repeating structural unit represented by the formula (1-A) and another unit not represented by the formula (1-A) is preferable.

The poly(thio)ester copolymer may be a random copolymer, alternative copolymer or block copolymer.

The repeating structural unit other than that represented by the formula (1-A) is preferably a repeating structural unit represented by the formula (1-B):

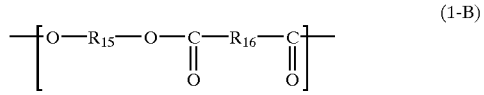
(1-B)

(wherein $R_{15}$ is a bivalent alicyclic hydrocarbon group; and $R_{16}$ is an alicyclic or aromatic dicarboxylic acid residue).

$R_{15}$ in the formula (1-B) is a bivalent alicyclic hydrocarbon group, preferably having a total carbon number of 6 to 20, more preferably 6 to 12.

In the formula (1-B), $R_{16}$ is an alicyclic or aromatic dicarboxylic acid residue, and specifically, it has the same meaning as $R_{12}$ described above. The $R_{16}$ group is preferably an alicyclic dicarboxylic acid residue, more preferably a group represented by one of the following formulae:

Moreover, a phenylene group, which is a residue of benzenedicarboxylic acid (e.g., isophthalic or terephthalic acid), can be also cited as one of the preferable groups.

The repeating structural unit represented by the formula (1-B) is obtained from the alicyclic or aromatic dicarboxylic acid represented by the formula (2) and a known alicyclic dihydroxy compound represented by the formula (4):

(4)

(wherein $R_{15}$ has the meaning same as described above).

Typical examples of the alicyclic dihydroxy compounds include, but not limited to, 1,4-cyclohexanediol, 1,3-cyclohexanediol, 1,2-cyclohexanediol, 2,5-dimethyl-1,4-cyclohexanediol, 1,4-cyclohexanedimethanol, 1,3-cyclohexanedimethanol, 1,2-cyclohexanedimethanol, 2,2-bis(4'-hydroxycyclohexyl)methane (commonly referred to as hydrogenated bisphenol F), 2,2-bis(4'-hydroxycyclohexyl)propane (commonly referred to as hydrogenated bisphenol A), 2,2-bis(4-hydroxy-2-methylcyclohexyl)propane, 2,2-bis(4-hydroxy-3-methylcyclohexyl)propane, 2,2-bis(4-hydroxy-3-ethylcyclohexyl)propane, 2,2-bis(4-hydroxy-3-tert-butyl-cyclohexyl)propane, 2,2-bis(4-hydroxy-2,5-dimethylcyclohexyl)propane, 2,2-bis(4-hydroxy-3,5-dimethylcyclohexyl)propane, 2,5-dihydroxynorbornane, 2,6-dihydroxynorbornane, 2,3-dihydroxynorbornane, 2,5-bis(hydroxymethyl)norbornane, 2,6-bis(hydroxymethyl)norbornane, 2,3-bis(hydroxymethyl)norbornane and tricycle[$5.2.1.0^{2,6}$]decanedimethanol.

In the poly(thio)ester copolymer, a ratio of the repeating structural unit represented by the formula (1-A) is in a range of 1 to 99% by mol, preferably 5 to 95% by mol, more preferably 10 to 90% by mol, still more preferably 20 to 80% by mol based on the total repeating structural units represented by the formulae (1-A) and (1-B), in consideration of balanced properties, e.g., optical properties (e.g., refractive index and Abbe number), heat resistance, moldability and mechanical properties.

The repeating structural unit represented by the formula (1-A), when being 5% or more of the total repeating structural units represented by the formulae (1-A) and (1-B), will preferably give an optical resin having sufficient performance of both the refractive index and Abbe number.

On the other hand, a ratio of the repeating structural unit represented by the formula (1-B) is in a range of 1 to 99% by mol, preferably 5 to 95% by mol, more preferably 10 to 90% by mol, still more preferably 20 to 80% by mol based on the total repeating structural units represented by the formulae (1-A) and (1-B) for the poly(thio)ester copolymer, in consideration of balanced properties, e.g., optical properties (e.g., refractive index and Abbe number), heat resistance, moldability and mechanical properties. The repeating structural unit represented by the formula (1-B), when being 5% or more of the total repeating structural units represented by the formulae (1-A) and (1-B), will preferably give an optical resin having sufficient performance of both heat resistance and moldability.

The following poly(thio)ester copolymers <1> to <6> are cited as the preferable examples of the poly(thio)ester copolymer of the present invention. Each of these poly(thio)ester copolymers will be described below.

<1> Poly(thio)ester copolymer comprising a repeating structural units represented by the formulae (2-A) and (2-B)

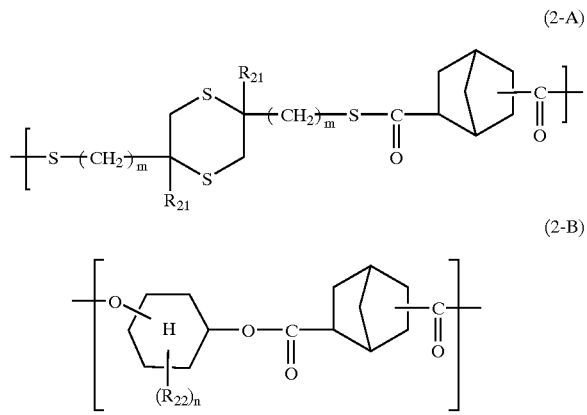

(2-A)

(2-B)

(wherein each $R_{21}$ is independently a hydrogen atom or an alkyl group; each $R_{22}$ is independently an alkyl or alkoxy group, or a halogen atom; each "m" is independently an integer of 0 to 3; and each "n" is independently an integer of 0 to 4).

One of the typical processes for producing the poly(thio) ester copolymer causes a mixture of a dithiol compound represented by the formula (5) and a dihydroxy compound represented by the formula (6), to react with an alicyclic dicarboxylic acid represented by the formula (7) or a derivative thereof (e.g., acid halide or ester), to copolymerize them by a (thio)esterification reaction.

This poly(thio)ester copolymer has two repeating structural units as essential structural units, one being represented by the formula (2-A) and obtained from the dithiol compound represented by the formula (5) and the alicyclic dicarboxylic acid represented by the formula (7) or a derivative thereof, and the other being represented by the formula (2-B) and obtained from the dihydroxy compound represented by the formula (6) and the alicyclic dicarboxylic acid represented by the formula (7) or a derivative thereof. It may be a random copolymer, alternative copolymer or block copolymer.

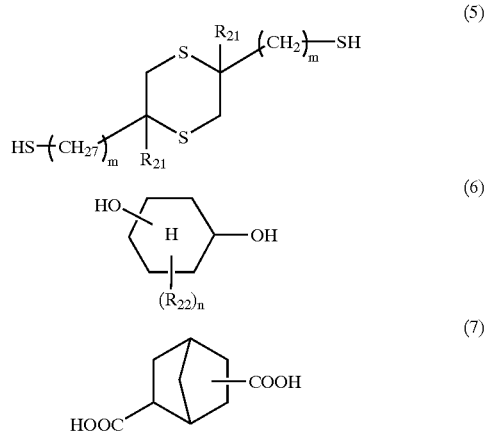

(5)

(6)

(7)

(wherein $R_{21}$, $R_{22}$, "m" and "n" are the same as described above).

In the poly(thio)ester copolymer, a ratio of the repeating structural unit represented by the formula (2-A) is in a range of 1 to 99% by mol, preferably 5 to 95% by mol, more preferably 10 to 90% by mol, still more preferably 20 to 80% by mol based on the total repeating structural units represented by the formulae (2-A) and (2-B), in consideration of balanced properties, e.g., optical properties (e.g., refractive index and Abbe number), heat resistance, moldability and mechanical properties.

In particular, the repeating structural unit represented by the formula (2-A), when being 5% or more of the total repeating structural units represented by the formulae (2-A) and (2-B), will preferably give an optical resin having sufficient performance of both the refractive index and Abbe number.

On the other hand, a ratio of the repeating structural unit represented by the formula (2-B) is in a range of 1 to 99% by mol, preferably 5 to 95% by mol, more preferably 10 to 90% by mol, still more preferably 20 to 80% by mol based on the total repeating structural units represented by the formulae (2-A) and (2-B) for the poly(thio)ester copolymer, in consideration of balanced properties, e.g., optical properties (e.g., refractive index and Abbe number), heat resistance, moldability and mechanical properties. The repeating structural unit represented by the formula (2-B), when being 5% or more of the total repeating structural units represented by the formulae (2-A) and (2-B), will preferably give an optical resin having sufficient performance of both heat resistance and moldability.

In the formula (2-A), each $R_{21}$ is a hydrogen atom or alkyl group, preferably the hydrogen atom or alkyl group of 1 to 8 carbon atoms, more preferably the hydrogen atom or alkyl group of 1 to 4 carbon atoms.

Examples of the substituent $R_{21}$ include a hydrogen atom, and a methyl, ethyl, n-propyl, isopropyl, n-butyl, isobutyl, tert-butyl, n-pentyl, isopentyl, n-hexyl, n-octyl and 2-ethylhexyl group.

Of these groups for the substituent $R_{21}$, the hydrogen atom and methyl group are preferable, and the hydrogen atom is more preferable.

In the formula (2-A), "m" is an integer of 0 to 4, preferably of 0 to 3, more preferably 0 or 1, still more preferably 1.

In the formula (2-B), each $R_{22}$ is independently an alkyl or alkoxy group, or a halogen atom.

The preferable examples of the substituent $R_{22}$ include alkyl groups of 1 to 4 carbon atoms (e.g., methyl, ethyl, n-propyl, isopropyl, n-butyl, isobutyl and tert-butyl), alkoxy groups of 1 to 4 carbon atoms (e.g., methoxy, ethoxy, n-propoxy, isopropoxy, n-butoxy, isobutoxy and tert-butoxy), and fluorine, chlorine and bromine atoms. As the substituent $R_{22}$, the methyl group is more preferable.

In the formula (2-B), "n" is an integer of 0 to 4, preferably of 0 to 3, more preferably of 0 to 2, still more preferably 0 or 1, particularly preferably 0.

Of the repeating structural units represented by the formula (2-A), repeating structural units represented by the formulae (2-A-i) and (2-A-ii) are more preferable.

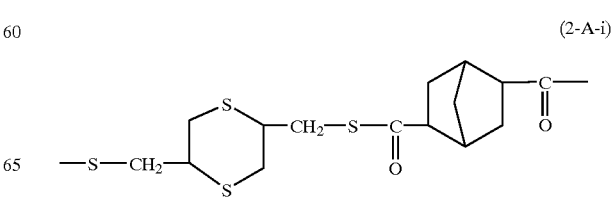

(2-A-i)

-continued

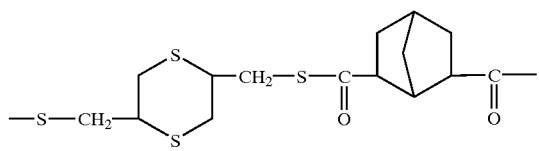

(2-A-ii)

Of the repeating structural units represented by the formula (2-B), repeating structural units represented by the formulae (2-B-i) and (2-B-ii) are more preferable.

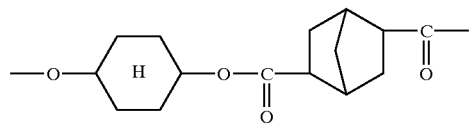

(2-B-i)

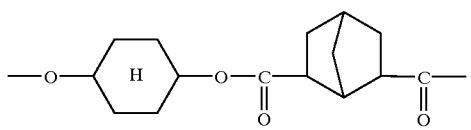

(2-B-ii)

The dithiol compound represented by the formula (6) as the starting monomer for the poly(thio)ester copolymer <1> of the present invention has a stereoisomer, and the aliphatic dicarboxylic acid represented by the formula (7) or a derivative thereof has a positional and steric isomer. As a result, the repeating structural unit represented by the formula (2-A) or (2-B) normally has two or more different repeating structural units of the positional and steric isomers. The repeating structural unit for the poly(thio)ester copolymer <1> of the present invention may contain a mixture of these isomers, or may contain only a specific isomer.

Each of the dithiol compound represented by the formula (5) and dihydroxy compound represented by the formula (6) as the starting monomer for the poly(thio)ester copolymer <1> of the present invention is a known compound, and can be suitably produced by a known process and also is commercially available.

More specifically, the dithiol compound represented by the formula (5) can be suitably produced by a process described in, e.g., Japanese Patent Laid-open Publication No. 3-236836 or Journal of Organic Chemistry, Vol. 34, p. 3389 to 3391 (1969).

Examples of the dithiol compounds represented by the formula (5) include, but not limited to, 2,5-bis(mercaptomethyl)-1,4-dithian and 2,5-bis(mercaptomethyl)-2,5-dimethyl-1,4-dithian.

The dihydroxy compound represented by the formula (6) can be produced by a process described in, e.g., Beilstein, Vol. 6, p. 741, and is available as an industrial starting material. The compound represented by the formula (6) has a cis or trans stereoisomer with respect to two hydroxyl groups bonded to a cyclohexane ring. Each of these stereoisomers or a mixture thereof is useful for the present invention.

Examples of the dihydroxy compounds represented by the formula (6) include, but not limited to, 1,4-cyclohexanediol, 1,3-cyclohexanediol, 1,2-cyclohexanediol and 2,5-dimethyl-1,4-cyclohexanediol.

The alicyclic dicarboxylic acid represented by the formula (7), and its acid halide (e.g., chloride or bromide) and ester (e.g., methyl, ethyl, n-propyl, n-butyl, isobutyl or tert-butyl ester) are known compounds, and can be suitably produced by a known process, e.g., through a reaction route represented by the scheme (A):

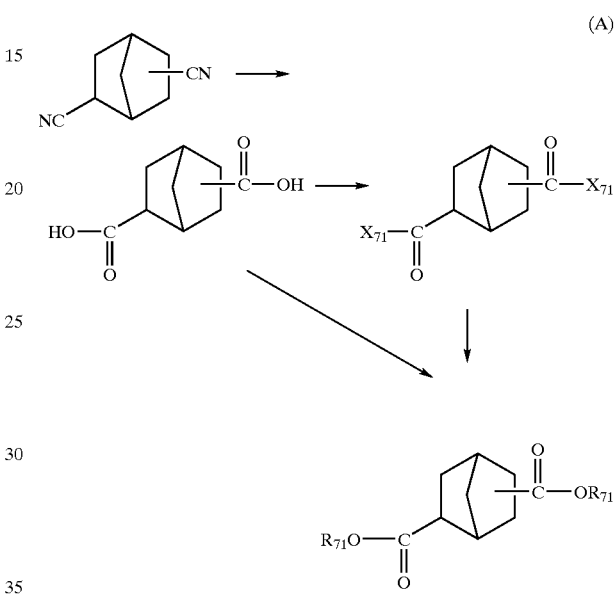

(A)

(wherein $X_{71}$ is a chlorine or bromine atom; and $R_{71}$ is an alkyl or aryl group).

Of the alicyclic dicarboxylic acids represented by the formula (7), alicyclic dicarboxylic acids represented by the formulae (7-i) and (7-ii) are more preferable.

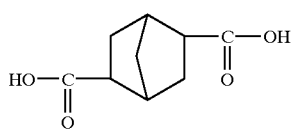

(7-i)

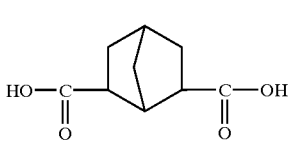

(7-ii)

These alicyclic dicarboxylic acids or derivatives thereof (acid halides or esters) have a stereoisomer, e.g., exo or endo, in addition to the above-described positional isomers. The positional isomer and stereoisomer of the alicyclic dicarboxylic acid or a derivative thereof (acid halide or ester) are useful for the present invention. Each of these isomers may be individually used after being isolated, or a mixture of these isomers may be used.

<2> Next, the poly(thio)ester copolymer comprising the repeating structural units represented by the formulae (2-A) and (3-B) will be described:

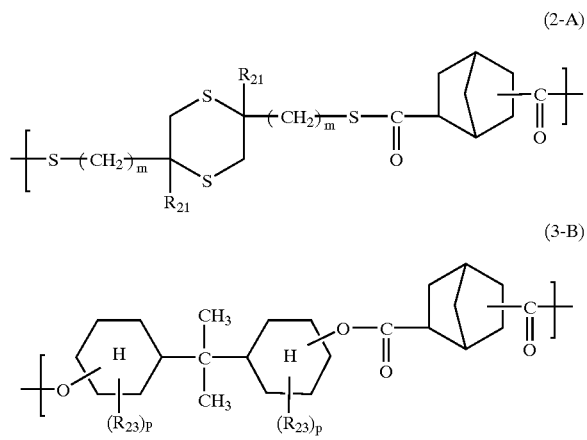

(2-A)

(3-B)

(wherein each $R_{21}$ is independently a hydrogen atom or alkyl group; each $R_{23}$ is independently an alkyl or alkoxy group, or a halogen atom; each "m" is independently an integer of 0 to 3; and each "p" is independently an integer of 0 to 4).

One of the typical processes for producing the poly(thio) ester copolymer <2> causes a mixture of the dithiol compound represented by the formula (5) and a dihydroxy compound represented by the formula (8) to react with the alicyclic dicarboxylic acid represented by the formula (7) or a derivative thereof (e.g., acid halide or ester), and then to copolymerize them by the (thio)esterification reaction, which will be described in more detail later.

The poly(thio)ester copolymer <2> of the present invention has two repeating structural units as essential structural units, one being represented by the formula (2-A) and obtained from the dithiol compound represented by the formula (5) and alicyclic dicarboxylic acid represented by the formula (7) or a derivative thereof, and the other being represented by the formula (3-B) and obtained from the dihydroxy compound represented by the formula (8) and alicyclic dicarboxylic acid represented by the formula (7) or a derivative thereof. It may be a random copolymer, alternating copolymer or block copolymer.

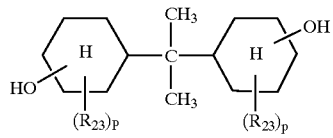

(8)

(wherein $R_{23}$ and "p" are the same as described above).

In the poly(thio)ester copolymer, a ratio of the repeating structural unit represented by the formula (2-A) is in a range of 1 to 99% by mol, preferably 5 to 95% by mol, more preferably 10 to 90% by mol, still more preferably 20 to 80% by mol based on the total repeating structural units represented by the formulae (2-A) and (3-B), in consideration of balanced properties, e.g., optical properties (e.g., refractive index and Abbe number), heat resistance, moldability and mechanical properties. The repeating structural unit represented by the formula (2-A), when being 5% or more of the total repeating structural units represented by the formulae (2-A) and (3-B), will preferably give an optical resin having sufficient performance of both the refractive index and Abbe number.

On the other hand, a ratio of the repeating structural unit represented by the formula (3-B) is in a range of 1 to 99% by mol, preferably 5 to 95% by mol, more preferably 10 to 90% by mol, still more preferably 20 to 80% by mol based on the total repeating structural units represented by the formulae (2-A) and (3-B) for the poly(thio)ester copolymer, in consideration of balanced properties, e.g., optical properties (e.g., refractive index and Abbe number), heat resistance, moldability and mechanical properties. The repeating structural unit represented by the formula (3-B), when being 5% or more of the total repeating structural units represented by the formulae (2-A) and (3-B), will preferably give an optical resin having sufficient performance of both heat resistance and moldability.

In the formula (3-B), each $R_{23}$ is independently an alkyl or alkoxy group, or a halogen atom. The preferable examples of the substituent $R_{23}$ include alkyl groups of 1 to 4 carbon atoms (e.g., methyl, ethyl, n-propyl, isopropyl, n-butyl, isobutyl and tert-butyl), alkoxy groups of 1 to 4 carbon atoms (e.g., methoxy, ethoxy, n-propoxy, isopropoxy, n-butoxy, isobutoxy and tert-butoxy), and fluorine, chlorine and bromine atoms. More preferably, it is methyl group.

In the formula (3-B), "p" is an integer of 0 to 4, preferably of 0 to 3, more preferably of 0 to 2, still more preferably 0 or 1, particularly preferably 0.

Of the repeating structural units represented by the formula (3-B), repeating structural units represented by the formula (3-B-i) and (3-B-ii) are more preferable.

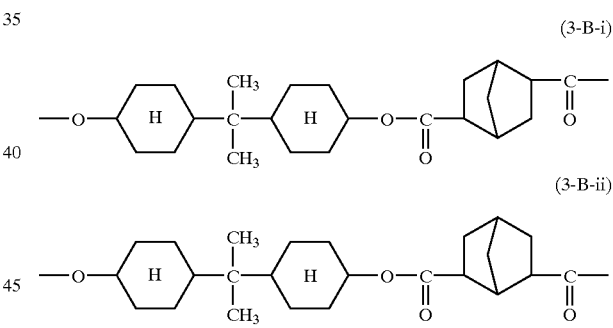

(3-B-i)

(3-B-ii)

The dihydroxy compound represented by the formula (8) as the starting monomer for the poly(thio)ester copolymer <2> of the present invention has a stereoisomer, and the aliphatic dicarboxylic acid represented by the formula (7) or a derivative thereof has a positional and steric isomer. As a result, the repeating structural unit represented by the formula (2-A) or (3-B) normally has two or more different types of the isomers derived from the positional or steric isomer. The repeating structural unit for the poly(thio)ester copolymer <2> of the present invention may contain a mixture of these isomers, or may contain only a specific isomer.

Each of the dihydroxy compounds represented by the formula (8) as the starting monomer for the poly(thio)ester copolymer <2> of the present invention is a known compound, and can be suitably produced by a process and is available as an industrial starting material.

More specifically, the dihydroxy compound represented by the formula (8) is produced by, e.g., hydrogenating 2,2-bis(4-hydroxyphenyl)propane, and is also available as an industrial starting material. These compounds have a cis or trans stereoisomer with respect to the hydroxyl and isopropylidene group bonded to the cyclohexane ring. Each of these stereoisomers or a mixture thereof is useful for the present invention.

The dihydroxy compounds represented by the formula (8) include, but not limited to, 2,2-bis(4-hydroxy-cyclohexyl)propane, 2,2-bis(4-hydroxy-2-methylcyclohexyl)-propane, 2,2-bis(4-hydroxy-3-methylcyclohexyl)propane, 2,2-bis(4-hydroxy-3-ethylcyclohexyl)propane, 2,2-bis(4-hydroxy-3-tert-butylcyclohexyl)propane, 2,2-bis(4-hydroxy-2,5-dimethylcyclohexyl)propane and 2,2-bis(4-hydroxy-3,5-dimethylcyclohexyl)propane.

<3> Next, the poly(thio)ester copolymer comprising a repeating structural units represented by the formulae (3-A) and (4-B) will be described:

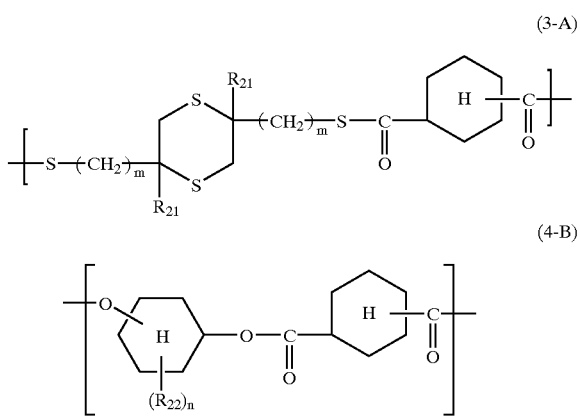

(3-A)

(4-B)

(wherein each $R_{21}$ is independently a hydrogen atom or alkyl group; each $R_{22}$ is independently an alkyl or alkoxy group, or a halogen atom; each "m" is independently an integer of 0 to 3; and each "n" is independently an integer of 0 to 4).

One of the typical processes for producing the poly(thio)ester copolymer <3> causes a mixture of the dithiol and dihydroxy compound represented by the formulae (5) and (6), respectively, to react with an alicyclic dicarboxylic acid represented by the formula (9) or a derivative thereof (e.g., acid halide or ester), to copolymerize them by the (thio)esterification reaction.

This poly(thio)ester copolymer <3> has two repeating structural units as essential structural units, one being represented by the formula (3-A) and obtained from the dithiol compound represented by the formula (5) and alicyclic dicarboxylic acid represented by the formula (9) or a derivative thereof, and the other being represented by the formula (4-B) and obtained from the dihydroxy compound represented by the formula (6) and alicyclic dicarboxylic acid represented by the formula (9) or a derivative thereof. It may be a random copolymer, alternating copolymer or block copolymer.

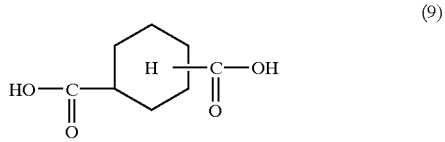

(9)

In the poly(thio)ester copolymer, a ratio of the repeating structural unit represented by the formula (3-A) is in a range of 1 to 99% by mol, preferably 5 to 95% by mol, more preferably 10 to 90% by mol, still more preferably 20 to 80% by mol based on the total repeating structural units represented by the formulae (3-A) and (4-B), in consideration of balanced properties, e.g., optical properties (e.g., refractive index and Abbe number), heat resistance, moldability and mechanical properties. The repeating structural unit represented by the formula (3-A), when being 5% or more of the total repeating structural units represented by the formulae (3-A) and (4-B), will preferably give an optical resin having sufficient performance in the point of the refractive index.

On the other hand, a ratio of the repeating structural unit represented by the formula (4-B) is in a range of 1 to 99% by mol, preferably 5 to 95%, more preferably 10 to 90%, still more preferably 20 to 80% based on the total repeating structural units represented by the formulae (3-A) and (4-B) for the poly(thio)ester copolymer, in consideration of balanced properties, e.g., optical properties (e.g., refractive index and Abbe number), heat resistance, moldability and mechanical properties. The repeating structural unit represented by the formula (4-B), when being 5% or more of the total repeating structural units represented by the formulae (3-A) and (4-B), will preferably give an optical resin having sufficient performance of both heat resistance and moldability.

In the formula (3-A), $R_{21}$ and "m" are the same as defined for the formula (2-A).

In the formula (4-B), $R_{22}$ and "n" are the same as defined for the formula (2-B).

Of the repeating structural units represented by the formula (3-A), repeating structural units represented by the formulae (3-A-i), (3-A-ii) and (3-A-iii) are more preferable.

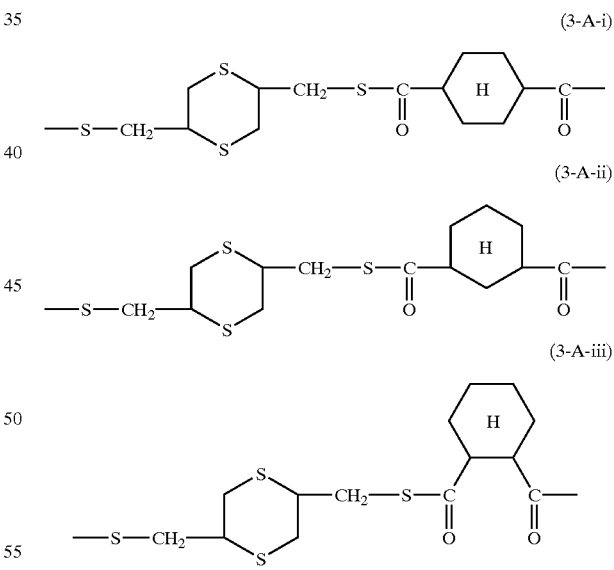

(3-A-i)

(3-A-ii)

(3-A-iii)

Of the repeating structural units represented by the formula (4-B), repeating structural units represented by the formulae (4-B-i), (4-B-ii) and (4-B-iii) are more preferable.

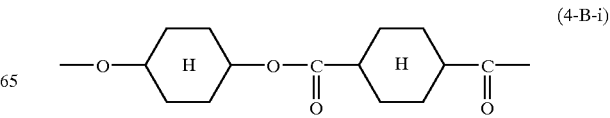

(4-B-i)

-continued (4-B-ii)

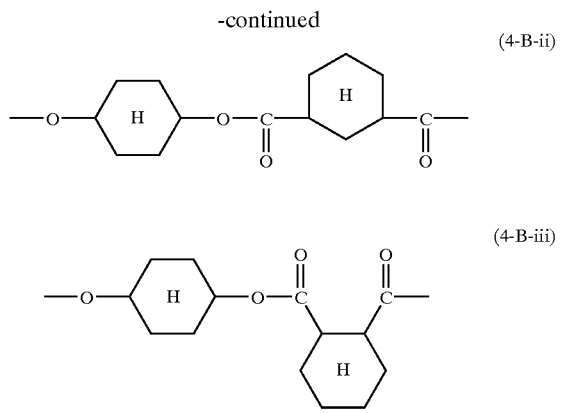

(4-B-iii)

The dihydroxy compound represented by the formula (6) as the starting monomer for the poly(thio)ester copolymer <3> of the present invention has a stereoisomer, and the aliphatic dicarboxylic acid represented by the formula (9) or a derivative thereof has a positional and steric isomer. As a result, the repeating structural unit represented by the formula (3-A) or (4-B) normally has two or more different types of the isomers derived from the positional or steric isomer. The repeating structural unit for the poly(thio)ester copolymer <3> of the present invention may contain a mixture of these isomers, or may contain only a specific isomer.

As described above, the poly(thio)ester copolymer <3> of the present invention is produced by causing a mixture of the dithiol and dihydroxy compound represented by the formulae (5) and (6), respectively, to react with the alicyclic dicarboxylic acid represented by the formula (9) or a derivative thereof (e.g., acid halide or ester), to copolymerize them by the (thio)esterification reaction. The polymerization reaction by itself is suitably effected in a manner similar to that for the known poly(thio)ester polymerization process.

The alicyclic dicarboxylic acid represented by the formula (9), and its acid halide (e.g., acid chloride or acid bromide) and ester (e.g., methyl, ethyl, n-propyl, n-butyl, isobutyl or tert-butyl ester) are known compounds, and can be suitably produced by a known process, e.g., through a reaction route represented by the scheme (B). More specifically, a phthalic acid ester is catalytically reduced in the presence of a catalyst, e.g., Raney nickel, into a cyclohexanedicarboxylate, which is then hydrolyzed into a cyclohexanedicarboxylic acid. Its acid halide is suitably produced by the known acid halogenation process which uses thionyl halide or the like.

(B)

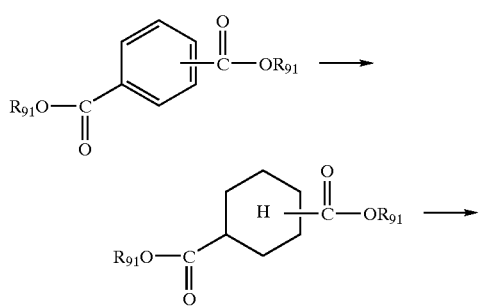

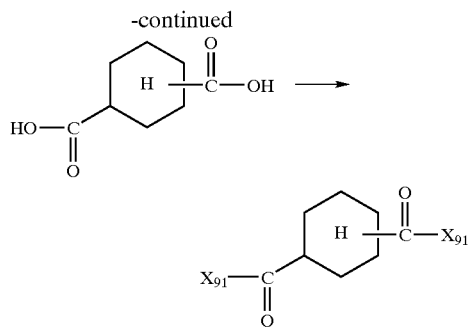

(wherein $X_{91}$ is a chlorine or bromine atom; and $R_{91}$ is an alkyl or aryl group).

The alicyclic dicarboxylic acids represented by the formula (9) for the present invention include 1,4-cyclohexanedicarboxylic, 1,3-cyclohexanedicarboxylic and 1,2-cyclohexanedicarboxylic acid.

These alicyclic dicarboxylic acids or derivatives thereof (acid halides or esters) have a stereoisomer, e.g., cis or trans, in addition to the above-described positional isomer. Any positional isomer and stereoisomer of the alicyclic dicarboxylic acid or a derivative thereof (acid halide or ester) are useful for the present invention. Each of these isomers may be individually used after being isolated, or a mixture of these isomers may be used.

<4> Next, the poly(thio)ester copolymer containing the repeating structural units represented by the formulae (3-A) and (5-B) will be described:

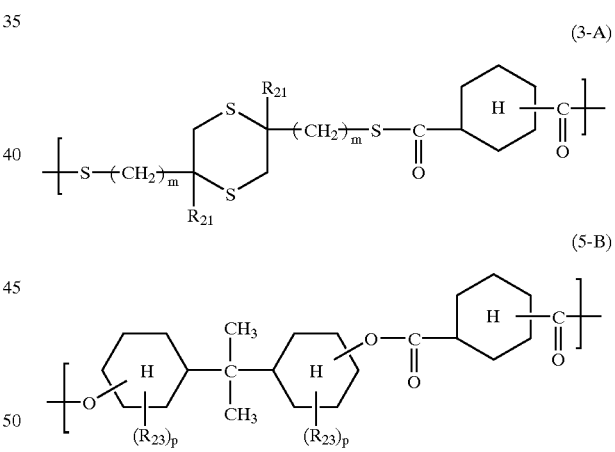

(wherein each $R_{21}$ is independently a hydrogen atom or alkyl group; each $R_{23}$ is independently an alkyl or alkoxy group, or a halogen atom; each "m" is independently an integer of 0 to 3; and each "p" is independently an integer of 0 to 4).

One of the typical processes for producing the poly(thio) ester copolymer <4> causes a mixture of the dithiol and dihydroxy compound represented by the formulae (5) and (8), respectively, to react with the alicyclic dicarboxylic acid represented by the formula (9) or a derivative thereof (e.g., acid halide or ester), to copolymerize them by the (thio) esterification reaction.

This poly(thio)ester copolymer <4> has two repeating structural units as essential structural units, one being represented by the formula (3-A) and obtained from the dithiol compound represented by the formula (5) and the alicyclic dicarboxylic acid represented by the formula (9) or a derivative thereof, and the other being represented by the formula (5-B) and obtained from the dihydroxy compound represented by the formula (8) and alicyclic dicarboxylic acid represented by the formula (9) or a derivative thereof. It may be a random copolymer, alternating copolymer or block copolymer. In the poly(thio)ester copolymer, a ratio of the repeating structural unit represented by the formula (3-A) is in a range of 1 to 99% by mol, preferably 5 to 95% by mol, more preferably 10 to 90% by mol, still more preferably 20 to 80% by mol based on the total repeating structural units represented by the formulae (3-A) and (5-B), in consideration of balanced properties, e.g., optical properties (e.g., refractive index and Abbe number), thermal and mechanical properties, and moldability. The repeating structural unit represented by the formula (3-A), when being 5% or more of the total repeating structural units represented by the formulae (3-A) and (5-B), will preferably give an optical resin having sufficient performance of both the refractive index and Abbe number.

On the other hand, a ratio of the repeating structural unit represented by the formula (5-B) is in a range of 1 to 99% by mol, preferably 5 to 95% by mol, more preferably 10 to 90% by mol, still more preferably 20 to 80% by mol based on the total repeating structural units represented by the formulae (3-A) and (5-B) for the poly(thio)ester copolymer, in consideration of balanced properties, e.g., optical properties (e.g., refractive index and Abbe number), heat resistance, moldability and mechanical properties. The repeating structural unit represented by the formula (5-B), when being 5% or more of the total repeating structural units represented by the formulae (3-A) and (5-B), will preferably give an optical resin having sufficient performance of both heat resistance and moldability.

In the formula (3-A), $R_{21}$ and "m" are the same as defined for the formula (2-A). In the formula (5-B), $R_{23}$ and "p" are the same as defined for the formula (3-B).

Of the repeating structural units represented by the formula (5-B), repeating structural units represented by the formulae (5-B-i), (5-B-ii) and (5-B-iii) are more preferable.

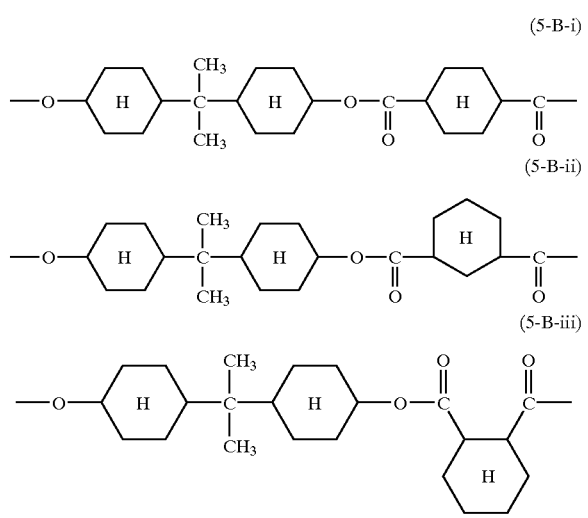

The dihydroxy compound represented by the formula (8) as the starting monomer for the poly(thio)ester copolymer <4> of the present invention has a stereoisomer, and the aliphatic dicarboxylic acid represented by the formula (9) or a derivative thereof has a positional and steric isomer. As a result, the repeating structural unit represented by the formula (3-A) or (5-B) normally has two or more different types of the isomers derived from the positional or steric isomer. The repeating structural unit for the poly(thio)ester copolymer <4> of the present invention may contain a mixture of these isomers, or may contain only a specific isomer.

<5> Next, the poly(thio)ester copolymer containing repeating structural units represented by the formulae (4-A) and (6-B) will be described:

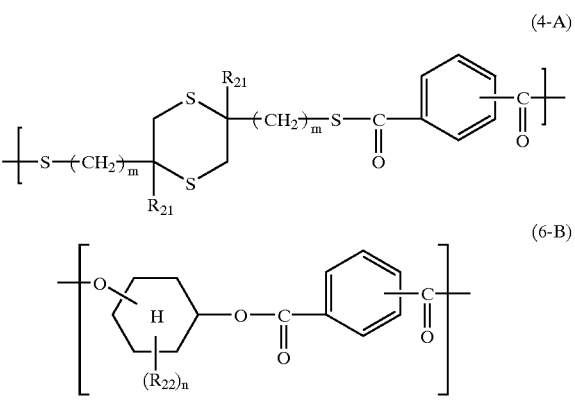

(wherein each $R_{21}$ is independently a hydrogen atom or alkyl group; each $R_{22}$ is independently an alkyl or alkoxy group, or a halogen atom; each "m" is independently an integer of 0 to 3; and each "n" is independently an integer of 0 to 4).

One of the typical processes for producing the poly(thio) ester copolymer <5> causes a mixture of a dithiol compound and dihydroxy compound represented by the formulae (5) and (6), respectively, to react with a phthalic acid represented by the formula (10) or a derivative thereof (e.g., acid halide or ester), to copolymerize them by the (thio)esterification reaction.

This poly(thio)ester copolymer <5> has two repeating structural units as essential structural units, one being represented by the formula (4-A) and obtained from the dithiol compound represented by the formula (5) and the phthalic acid represented by the formula (10) or a derivative thereof, and the other being represented by the formula (6-B) and obtained from the dihydroxy compound represented by the formula (6) and the phthalic acid represented by the formula (10) or a derivative thereof. It may be a random copolymer, alternating copolymer or block copolymer.

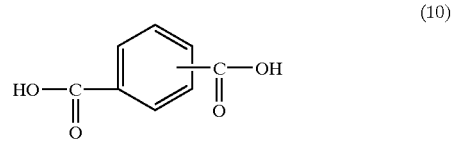

In the poly(thio)ester copolymer, a ratio of the repeating structural unit represented by the formula (4-A) is in a range of 1 to 99% by mol, preferably 5 to 95% by mol, more preferably 10 to 90% by mol, still more preferably 20 to 80% by mol based on the total repeating structural units represented by the formulae (4-A) and (6-B), in consideration of balanced properties, e.g., optical properties (e.g., refractive index and Abbe number), heat resistance, moldability and mechanical properties. The repeating structural unit represented by the formula (4-A), when being 5% or more of the total repeating structural units represented by the formulae (4-A) and (6-B), will preferably give an optical resin having sufficient performance of the refractive index.

On the other hand, a ratio of the repeating structural unit represented by the formula (6-B) is in a range of 1 to 99% by mol, preferably 5 to 95% by mol, more preferably 10 to 90% by mol, still more preferably 20 to 80% by mol based on the total repeating structural units represented by the formulae (4-A) and (6-B) for the poly(thio)ester copolymer, in consideration of balanced properties, e.g., optical properties (e.g., refractive index and Abbe number), heat resistance, moldability and mechanical properties. The repeating structural unit represented by the formula (6-B), when being 5% or more of the total repeating structural units represented by the formulae (4-A) and (6-B), will preferably give an optical resin having sufficient performance of both heat resistance and moldability.

In the formula (4-A), $R_{21}$ and "m" are the same as defined for the formula (2-A).

In the formula (6-B), $R_{22}$ and "n" are the same as defined for the formula (2-B).

Of the repeating structural units represented by the formula (4-A), repeating structural units represented by the formulae (4-A-i), (4-A-ii) and (4-A-iii) are more preferable.

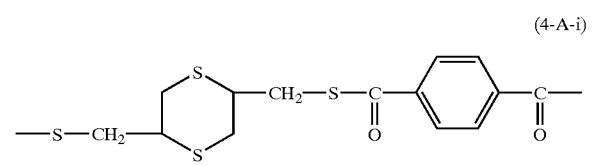
(4-A-i)

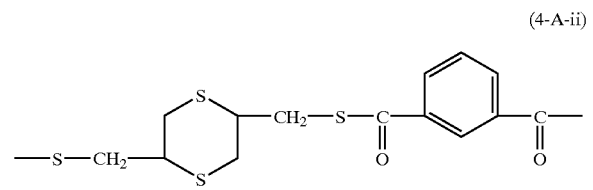
(4-A-ii)

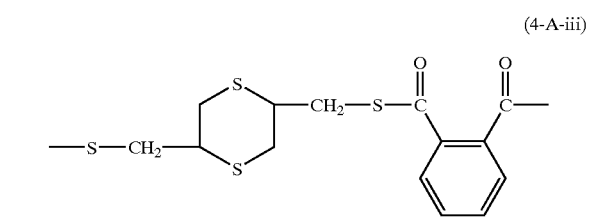
(4-A-iii)

Of the repeating structural units represented by the formula (6-B), repeating structural units represented by the formulae (6-B-i), (6-B-ii) and (6-B-iii) are more preferable.

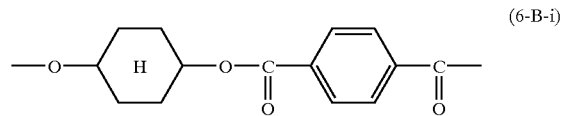
(6-B-i)

-continued

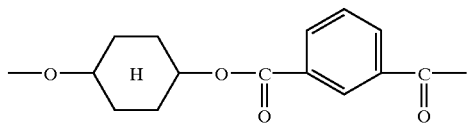
(6-B-ii)

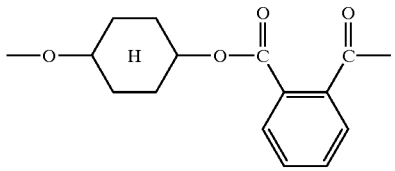
(6-B-iii)

The dihydroxy compound represented by the formula (6) as the starting monomer for the poly(thio)ester copolymer <5> of the present invention has a stereoisomer, and the phthalic acid represented by the formula (10) or a derivative thereof has a positional isomer. As a result, the repeating structural unit represented by the formula (4-A) or (6-B) normally has two or more different types of the isomers derived from the positional or steric isomer. The repeating structural unit for the poly(thio)ester copolymer <5> of the present invention may contain a mixture of these isomers, or may contain only a specific isomer.

The phthalic acid represented by the formula (10), and its acid halide (e.g., acid chloride or acid bromide) and ester (e.g., alkyl ester, e.g., methyl, ethyl, n-propyl, n-butyl, isobutyl or tert-butyl, or aryl ester, e.g., phenyl) are known compounds, and can be suitably produced by a known process, e.g., through a reaction route represented by the scheme (C) and industrially available. More specifically, a variety of phthalic acids can be suitably produced by oxidizing xylene (o-, p- and m-isomers) in the presence of a heavy metal catalyst. Moreover, a variety of phthalic acids can be suitably produced by the known acid halogenation process which uses thionyl halide or the like.

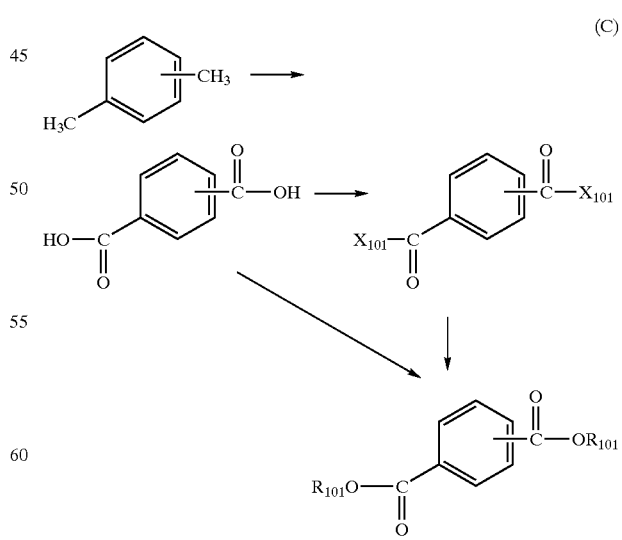
(C)

(wherein $X_{101}$ is a chlorine or bromine atom; and $R_{101}$ is an alkyl or aryl group).

The phthalic acids represented by the formula (10) for the present invention include terephthalic, isophthalic and phthalic acid.

These phthalic acids or derivatives thereof (acid halides or esters) have a positional isomer. Each of the isomers may be individually used after being isolated, or a mixture of these isomers may be used.

<6> Next, the poly(thio)ester copolymer containing the repeating structural units represented by the formulae (4-A) and (7-B) will be described:

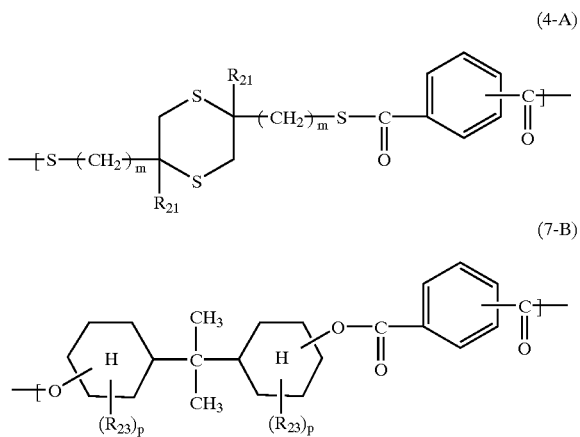

(wherein each $R_{21}$ is independently a hydrogen atom or alkyl group; each $R_{23}$ is independently an alkyl or alkoxy group, or a halogen atom; each "m" is independently an integer of 0 to 3; and each "p" is independently an integer of 0 to 4).

One of the typical processes for producing the poly(thio)ester copolymer <6> causes a mixture of the dithiol and dihydroxy compound represented by the formulae (5) and (8), respectively, to react with the phthalic acid represented by the formula (10) or a derivative thereof (e.g., halide or ester), to copolymerize them by the (thio)esterification reaction.

This poly(thio)ester copolymer <6> has two repeating structural units as essential structural units, one being represented by the formula (4-A) and obtained from the dithiol compound represented by the formula (5) and the phthalic acid represented by the formula (10) or a derivative thereof, and the other being represented by the formula (7-B) and obtained from the dihydroxy compound represented by the formula (8) and the phthalic acid represented by the formula (10) or a derivative thereof. It may be a random copolymer, alternating copolymer or block copolymer. In the poly(thio)ester copolymer, a ratio of the repeating structural unit represented by the formula (4-A) is in a range of 1 to 99% by mol, preferably 5 to 95% by mol, more preferably 10 to 90% by mol, still more preferably 20 to 80% by mol based on the total repeating structural units represented by the formulae (4-A) and (7-B), in consideration of balanced properties, e.g., optical properties (e.g., refractive index and Abbe number), heat resistance, moldability and mechanical properties. The repeating structural unit represented by the formula (4-A), when being 5% or more of the total repeating structural units represented by the formulae (4-A) and (7-B), will preferably give an optical resin having sufficient performance of the refractive index.

On the other hand, a ratio of the repeating structural unit represented by the formula (7-B) is in a range of 1 to 99% by mol, preferably 5 to 95% by mol, more preferably 10 to 90% by mol, still more preferably 20 to 80% by mol based on the total repeating structural units represented by the formulae (4-A) and (7-B) for the poly(thio)ester copolymer, in consideration of balanced properties, e.g., optical properties (e.g., refractive index and Abbe number), heat resistance, moldability and mechanical properties. The repeating structural unit represented by the formula (7-B), when being 5% or more of the total repeating structural units represented by the formula (4-A) and (7-B), will preferably give an optical resin having sufficient performance of both heat resistance and moldability.

In the formula (4-A), $R_{21}$ and "m" are the same as defined for the formula (2-A).

In the formula (7-B), $R_{23}$ and "p" are the same as defined for the formula (3-B).

Of the repeating structural units represented by the formula (7-B), repeating structural units represented by the formulae (7-B-i), (7-B-ii) and (7-B-iii) are more preferable.

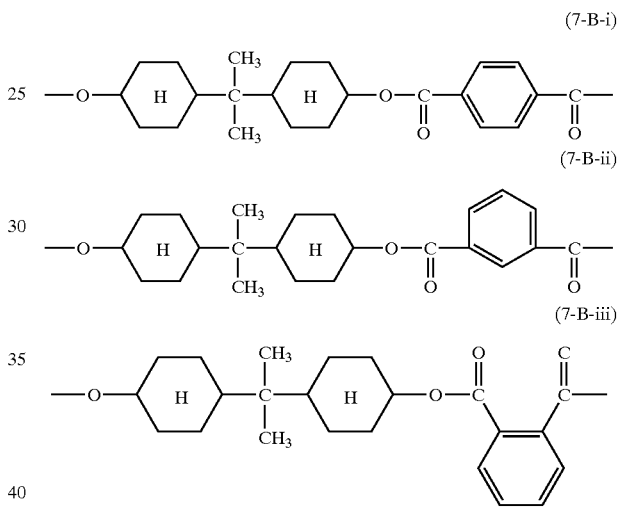

The dihydroxy compound represented by the formula (8) as the starting monomer for the poly(thio)ester copolymer <6> of the present invention has a stereoisomer, and the phthalic acid represented by the formula (10) or a derivative thereof has a positional isomer. As a result, the repeating structural unit represented by the formula (4-A) or (7-B) normally has two or more different types of the isomers derived from the positional or steric isomer. The repeating structural unit for the poly(thio)ester copolymer <6> of the present invention may contain a mixture of these isomers, or may contain only a specific isomer.

The poly(thio)ester copolymers <1> to <6> of the present invention have two repeating structural units selected from the group consisting of repeating structural units represented by the formulae (2-A) to (7-B) as essential repeating structural units, as described above. They may be a multi-component copolymer with three or more repeating structural units, or one or more units selected from the group consisting of units represented by the formulae (2-A) to (7-B) or units represented by the formulae (1-A) and (1-B) other than units represented by the formulae (2-A) to (7-B), in addition to the essential units.

Each of the poly(thio)ester copolymers of the present invention may contain repeating structural units other than the repeating structural unit represented by the formula (1-A) or (1-B) as an essential unit, within limits not harmful to the desired effects of the present invention.

In other words, it may contain a repeating structural unit other than that represented by the formula (1-A) or (1-B). The other repeating structural units include those derived from a dithiol or hydroxyl compound other than that represented by the formula (1) and a compound derived from a dicarboxylic acid other than that represented by the formula (2); those derived from a known hydroxyl compound other than the alicyclic dihydroxy compound represented by the formula (1) or as the starting monomer for the repeating unit represented by the formula (1-B) and a compound derived from the dicarboxylic acid represented by the formula (2); and those derived from one of these other dithiol or hydroxyl compounds and a compound derived from a dicarboxylic acid other than that represented by the formula (2).

Of the poly(thio)ester copolymers, these 3-component or higher multi-component copolymers can be suitably used in a manner similar to that for the above-described poly(thio) ester copolymer. In other words, they are produced by copolymerization involving the suitable monomer through the (thio)esterification.

The dithiol compounds other than the compounds represented by the formula (1) include a variety of known aromatic and chain aliphatic dithiol compounds. More specifically, these dithiol compounds include, but not limited to, 1,4-benzenedithiol, 1,3-benzenedithiol, 1,2-benzenedithiol, 4,4'-thiobenzenedithiol, p-xylylenedithiol, m-xylylenedithiol, o-xylylenedithiol, 1,2-ethanedithiol, 1,2-propanedithiol, 1,3-propanedithiol and 1,6-hexanedithiol.

The dihydroxy compounds other than the compounds represented by the formula (1) include a variety of known aromatic, and chain and cyclic aliphatic dihydroxy compounds. More specifically, these dihydroxy compounds include, but not limited to, bis(hydroxyaryl)alkanes, e.g., bis(4-hydroxyphenyl)methane, 1,1-bis(4'-hydroxyphenyl) ethane, 1,2-bis(4'-hydroxyphenyl)ethane, bis(4-hydroxyphenyl)phenylmethane, bis(4-hydroxyphenyl)diphenylmethane, bis(4-hydroxyphenyl)-1-naphthylmethane, 1,1-bis (4'-hydroxyphenyl)-1-phenylethane, 2,2-bis(4'-hydroxyphenyl)propane ["bisphenol A"], 2-(4'-hydroxyphenyl)-2-(3'-hydroxyphenyl)propane, 2,2-bis(4'-hydroxyphenyl)butane, 1,1-bis(4'-hydroxyphenyl)butane, 2,2-bis(4'-hydroxyphenyl)-3-methylbutane, 2,2-bis(4'-hydroxyphenyl)pentane, 3,3-bis(4'-hydroxyphenyl)pentane, 2,2-bis(4'-hydroxyphenyl)hexane, 2,2-bis(4'-hydroxyphenyl)-octane, 2,2-bis(4'-hydroxyphenyl)-4-methylpentane, 2,2-bis(4'-hydroxyphenyl)heptane, 4,4-bis(4'-hydroxyphenyl)-heptane, 2,2-bis(4'-hydroxyphenyl)tridecane, 2,2-bis (4'-hydroxyphenyl)octane, 2,2-bis(3'-methyl-4'-hydroxyphenyl)-propane, 2,2-bis(3'-ethyl-4'-hydroxyphenyl) propane, 2,2-bis(3'-n-propyl-4'-hydroxyphenyl)propane, 2,2-bis(3'-isopropyl-4'-hydroxyphenyl)propane, 2,2-bis(3'-sec-butyl-4'-hydroxyphenyl)propane, 2,2-bis(3'-tert-butyl-4'-hydroxyphenyl)propane, 2,2-bis(3'-cyclohexyl-4'-hydroxyphenyl)-propane, 2,2-bis(3'-allyl-4'-hydroxyphenyl) propane, 2,2-bis( 3'-methoxy-4'-hydroxyphenyl)propane, 2,2-bis(3',5'-dimethyl-4'-hydroxyphenyl)propane, 2,2-bis(2', 3',5',6'-tetramethyl-4'-hydroxyphenyl)propane, bis(4-hydroxyphenyl)cyanomethane, 1-cyano-3,3-bis(4'-hydroxyphenyl)butane and 2,2-bis(4'-hydroxyphenyl) hexafluoropropane; bis(hydroxyaryl)cycloalkanes, e.g., 1,1-bis(4'-hydroxyphenyl)cyclopentane, 1,1-bis(4'-hydroxyphenyl)cyclohexane, 1,1-bis(4'-hydroxyphenyl) cycloheptane, 1,1-bis(3'-methyl-4'-hydroxyphenyl) cyclohexane, 1,1-bis(3',5'-dimethyl-4'-hydroxyphenyl) cyclohexane, 1,1-bis(3',5'-dichloro-4'-hydroxyphenyl) cyclohexane, 1,1-bis(3'-methyl-4'-hydroxyphenyl)-4-methylcyclohexane, 1,1-bis(4'-hydroxyphenyl)-3,3,5-trimethylcyclohexane, 2,2-bis(4'-hydroxyphenyl)-norbornane and 2,2-bis(4'-hydroxyphenyl)adamantane; bis (hydroxyaryl) ethers, e.g., 4,4'-dihydroxydiphenyl ether, 4,4'-dihydroxy-3,3'-dimethyldiphenyl ether and ethylene glycol bis(4-hydroxyphenyl)ether; bis(hydroxyaryl) sulfides, e.g., 4,4'-dihydroxydiphenyl sulfide, 3,3'-dimethyl-4, 4'-dihydroxydiphenyl sulfide, 3,3'-dicyclohexyl-4,4'-dihydroxydiphenyl sulfide and 3,3'-diphenyl-4,4'-dihydroxydiphenyl sulfide; bis(hydroxyaryl) sulfoxides, e.g., 4,4'-dihydroxydiphenyl sulfoxide and 3,3'-dimethyl-4, 4'-dihydroxydiphenyl sulfoxide; bis(hydroxyaryl) sulfones, e.g., 4,4'-dihydroxydiphenyl sulfone and 4,4'-dihydroxydiphenyl-3,3'-dimethyldiphenyl sulfone; bis(hydroxyaryl) ketones, e.g., bis(4-hydroxyphenyl) ketone and bis(4-hydroxy-3-methylphenyl) ketone; and 7,7'-dihydroxy-3,3',4,4'-tetrahydro-4,4,4',4'-tetramethyl-2,2'-spirobi(2H-1-benzopyran), trans-2,3-bis(4'-hydroxyphenyl)-2-butene, 9,9-bis(4'-hydroxyphenyl)fluorene, 3,3-bis(4'-hydroxyphenyl)-2-butanone, 1,6-bis(4'-hydroxyphenyl)-1,6-hexanedione, α,α, α',α'-tetramethyl-α,α'-bis(4-hydroxyphenyl)-p-xylene, α,α, α',α'-tetramethyl-α,α'-bis(4-hydroxyphenyl)-m-xylene, 4,4'-dihydroxybiphenyl, hydroquinone and resorcin.

The aliphatic dihydroxy compounds specifically include, but not limited to, chain aliphatic dihydroxy compounds, e.g., 1,2-dihydroxyethane, 1,3-dihydroxypropane, 1,4-dihydroxybutane, 1,5-dihydroxypentane, 3-methyl-1,5-dihydroxypentane, 1,6-dihydroxyhexane, 1,7-dihydroxyheptane, 1,8-dihydroxyoctane, 1,9-dihydroxynonane, 1,10-dihydroxydecane, 1,11-dihydroxyundecane, 1,12-dihydroxydodecane, dihydroxyneopentyl, 2-ethyl-1,2-dihydroxyhexane and 2-methyl-1,3-dihydroxypropane; alicyclic dihydroxy compounds, e.g., 1,4-cyclohexane dimethanol, 1,3-cyclohexane dimethanol, 1,2-cyclohexane dimethanol and tricycle[5.2.1.0$^{2,6}$]decane dimethanol; and aliphatic dihydroxy compounds containing an aromatic group, e.g., o-dihydroxyxylylene, m-dihydroxyxylylene, p-dihydroxyxylylene, o-dihydroxyxylylene, 1,4-bis(2'-hydroxyethyl) benzene, 1,4-bis(3'-hydroxypropyl)benzene, 1,4-bis(4'-hydroxybutyl)benzene, 1,4-bis(5'-hydroxypentyl)benzene, 1,4-bis(6'-hydroxyhexyl)benzene and 2,2-bis[4'-(2"-hydroxyethyloxy)phenyl]propane.

Of these known dihydroxy compounds, the aromatic and alicyclic dihydroxy compounds are more preferable in consideration of optical characteristics (e.g., refractive index and Abbe number) and thermal characteristics. The still more preferable ones are aromatic dihydroxy compounds, e.g., 2,2-bis(4'-hydroxyphenyl)propane (commonly referred to as "bisphenol A"), 1,1-bis(4'-hydroxyphenyl)cyclohexane (commonly referred to as "bisphenol Z"), α,α,α',α'-tetramethyl-α,α'-bis(4-hydroxyphenyl)-p-xylene (commonly referred to as "bisphenol P"), α,α,α',α'-tetramethyl-α,α'-bis (4-hydroxyphenyl)-m-xylene (commonly referred to as "bisphenol M"), 4,4'-dihydroxydiphenyl sulfide, 3,3'-dimethyl-4,4'-dihydroxydiphenyl sulfide, 4,4'-dihydroxydiphenyl sulfone and 1,1-bis(4'-hydroxyphenyl)-1-phenyl-ethane.

The dicarboxylic acid derivatives include a variety of known aromatic, and chain and cyclic aliphatic dicarboxylic acid derivatives.

More specifically, they include, but not limited to, those derived from aromatic dicarboxylic acids, e.g., terephthalic acid, isophthalic acid, 2,5-thiophene-dicarboxylic acid and 4,4'-biphenyldicarboxylic acid; alicyclic dicarboxylic acids, e.g., 1,4-cyclohexane-dicarboxylic acid, 1,3-cyclohexanedicarboxylic acid, 1,2-cyclohexanedicarboxylic acid and 1,4-cyclohexanediacetic acid; and chain aliphatic dicarboxylic acids, e.g., succinic acid, maleic acid, fumaric acid, 1,3-propanedicarboxylic acid, 1,4-butanedicarboxylic acid and 1,6-hexanedicarboxylic acid.

Of these repeating structural units, repeating structural units represented by the formula (1-C) are more preferable:

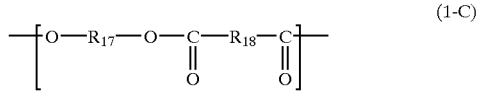

(wherein $R_{17}$ is a bivalent aromatic hydrocarbon group; and $R_{18}$ is an alicyclic or aromatic dicarboxylic acid residue).

In other words, of the poly(thio)ester copolymers of the present invention, those having the repeating structural units represented by the formulae (1-A), (1-B) and (1-C) are more preferable, in order to exhibit the desired effects of the present invention.

The poly(thio)ester copolymer may be a random copolymer, alternating copolymer or block copolymer.

$R_{17}$ in the formula (1-C) is a bivalent aromatic hydrocarbon group, preferably having a total carbon number of 6 to 25, more preferably 6 to 20.

$R_{18}$ in the formula (1-C) is an alicyclic or aromatic dicarboxylic acid residue. More specifically, it is the same as $R_{12}$ described above $R_{18}$ is preferably an alicyclic dicarboxylic acid residue, more preferably a group represented by one of the following formulae:

Moreover, a phenylene group which is the residue of benzenedicarboxylic acid is also one of the preferable groups.

The repeating structural unit represented by the formula (1-C) is obtained from the alicyclic or aromatic dicarboxylic acid represented by the formula (2) and the known aromatic dihydroxy compound represented by the formula (11):

(wherein $R_{17}$ is the same as described above).

More specifically, these aromatic dihydroxy compounds include bis(hydroxyaryl)alkanes, e.g., bis(4-hydroxyphenyl)methane, 1,1-bis(4'-hydroxyphenyl)ethane, 1,2-bis(4'-hydroxyphenyl)ethane, bis(4-hydroxyphenyl)phenylmethane, bis(4-hydroxyphenyl)diphenylmethane, bis(4-hydroxyphenyl)-1-naphthylmethane, 1,1-bis(4'-hydroxyphenyl)-1-phenylethane, 2,2-bis(4'-hydroxyphenyl)propane ["bisphenol A"], 2-(4'-hydroxyphenyl)- 2-(3'-hydroxyphenyl)propane, 2,2-bis(4'-hydroxyphenyl)butane, 1,1-bis(4'-hydroxyphenyl)butane, 2,2-bis(4'-hydroxyphenyl)-3-methylbutane, 2,2-bis(4'-hydroxyphenyl)pentane, 3,3-bis(4'-hydroxyphenyl)pentane, 2,2-bis(4'-hydroxyphenyl)hexane, 2,2-bis(4'-hydroxyphenyl)-octane, 2,2-bis(4'-hydroxyphenyl)-4-methylpentane, 2,2-bis(4'-hydroxyphenyl)heptane, 4,4-bis(4'-hydroxyphenyl)-heptane, 2,2-bis(4'-hydroxyphenyl)tridecane, 2,2-bis(4'-hydroxyphenyl)octane, 2,2-bis(3'-methyl-4'-hydroxyphenyl)-propane, 2,2-bis(3'-ethyl-4'-hydroxyphenyl)propane, 2,2-bis(3'-n-propyl-4'-hydroxyphenyl)propane, 2,2-bis(3'-isopropyl-4'-hydroxyphenyl)propane, 2,2-bis(3'-sec-butyl-4'-hydroxyphenyl)propane, 2,2-bis(3'-tert-butyl-4'-hydroxy-phenyl)propane, 2,2-bis(3'-cyclohexyl-4'-hydroxyphenyl)-propane, 2,2-bis(3'-allyl-4'-hydroxyphenyl)propane, 2,2-bis(3'-methoxy-4'-hydroxyphenyl)propane, 2,2-bis(3',5'-dimethyl-4'-hydroxyphenyl)propane, 2,2-bis(2',3',5',6'-tetramethyl-4'-hydroxyphenyl)propane, bis(4-hydroxyphenyl)-cyanomethane, 1-cyano-3,3-bis(4'-hydroxyphenyl)butane, 2,2-bis(4'-hydroxyphenyl)hexafluoropropane; bis(hydroxyaryl)cycloalkanes, e.g., 1,1-bis(4'-hydroxy-phenyl)cyclopentane, 1,1-bis(4'-hydroxyphenyl)cyclohexane, 1,1-bis(4'-hydroxyphenyl)cycloheptane, 1,1-bis(3'-methyl-4'-hydroxyphenyl)cyclohexane, 1,1-bis(3',5'-dimethyl-4'-hydroxyphenyl)cyclohexane, 1,1-bis(3',5'-dichloro-4'-hydroxyphenyl)cyclohexane, 1,1-bis(3'-methyl-4'-hydroxyphenyl)- 4-methylcyclohexane, 1,1-bis(4'-hydroxyphenyl)-3,3,5-trimethylcyclohexane, 2,2-bis(4'-hydroxyphenyl)-norbornane and 2,2-bis(4'-hydroxyphenyl)adamantane; bis(hydroxyaryl) ethers, e.g., 4,4'-dihydroxydiphenyl ether, 4,4'-dihydroxy-3,3'-dimethyldiphenyl ether and ethylene glycol bis(4-hydroxyphenyl) ether; bis(hydroxyaryl) sulfides, e.g., 4,4'-dihydroxydiphenyl sulfide, 3,3'-dimethyl-4,4'-dihydroxydiphenyl sulfide, 3,3'-dicyclohexyl-4,4'-dihydroxydiphenyl sulfide and 3,3'-diphenyl-4,4'-dihydroxydiphenyl sulfide; bis(hydroxyaryl) sulfoxides, e.g., 4,4'-dihydroxydiphenyl sulfoxide and 3,3'-dimethyl-4,4'-dihydroxydiphenyl sulfoxide; bis(hydroxyaryl) sulfones, e.g., 4,4'-dihydroxydiphenyl sulfone and 4,4'-dihydroxydiphenyl-3,3'-dimethyldiphenyl sulfone; bis(hydroxyaryl) ketones, e.g., bis(4-hydroxyphenyl) ketone and bis(4-hydroxy-3-methyl-phenyl) ketone; and 7,7'-dihydroxy-3,3',4,4'-tetrahydro-4,4,4',4'-tetramethyl-2,2'-spirobi(2H-1-benzopyran), trans-2,3-bis(4'-hydroxyphenyl)-2-butene, 9,9-bis(4'-hydroxyphenyl)fluorene, 3,3-bis(4'-hydroxyphenyl)-2-butanone, 1,6-bis(4'-hydroxyphenyl)-1,6-hexanedione, α,α,α',α'-tetramethyl-α, α'-bis(4-hydroxyphenyl)-p-xylene, α,α,α',α'-tetramethyl-α, α'-bis(4-hydroxyphenyl)-m-xylene, 4,4'-dihydroxybiphenyl, hydroquinone and resorcin.

Of these known dihydroxy compounds, the aromatic dihydroxy compounds are more preferable in consideration of optical characteristics (e.g., refractive index and Abbe number) and thermal characteristics. These aromatic dihydroxy compounds include 2,2-bis(4'-hydroxyphenyl)propane (commonly referred to as "bisphenol A"), 1,1-bis(4'-hydroxyphenyl)cyclohexane (commonly referred to as "bisphenol Z"), α,α,α',α'-tetramethyl-α,α'-bis(4-hydroxyphenyl)-p-xylene (commonly referred to as "bisphenol P"), α,α,α',α'-tetramethyl-α,α'-bis(4-hydroxyphenyl)-m-xylene (commonly referred to as "bisphenol M"), 4,4'-dihydroxydiphenyl sulfide, 3,3'-dimethyl-4,4'-dihydroxydiphenyl sulfide, 4,4'-dihydroxydiphenyl sulfone and 1,1-bis(4'-hydroxyphenyl)-1-phenylethane.

Of the poly(thio)ester copolymers, the 3-component or higher multi-component copolymers can be suitably obtained in a manner similar to that for the above-described poly(thio)ester copolymer. In other words, they are produced by copolymerization involving the suitable monomer through the (thio)esterification.

In the poly(thio)ester copolymer, a ratio of the repeating structural unit represented by the formula (1-C) is in a range of 1 to 80% by mol, preferably 5 to 70% by mol, more preferably 5 to 60% by mol, still more preferably 5 to 50% by mol based on the total repeating structural units, in consideration of balanced properties, e.g., optical properties (e.g., refractive index and Abbe number), heat resistance, moldability and mechanical properties.

Moreover, the poly(thio)ester copolymer of the present invention may contain a linking group, e.g., carbonate, imino, ether, imide, amide, urethane or urea, in addition to thioester or ester group, within limits not harmful to the desired effects of the present invention.

Such a copolymer is produced in the presence of a bi-functional compound (e.g., diamine or diisocyanate compound), other than the dicarboxylic acid, dithiol or dihydroxy compound, in the polymerization process.

However, the polymer or copolymer containing the only repeating structural unit represented by the formula (1-A), (1-B) or (1-C) is particularly preferable.

(Regarding Polymer Terminal Group:)

The terminal group of the poly(thio)ester (co)polymer of the present invention may be thiol, hydroxyl, carboxyl group or the like derived from the starting monomer as described above, or may be an inert terminal group which is at the main polymer chain and sealed by a molecular weight adjusting agent (e.g., a monovalent hydroxyl, thiol or carboxyl acid derivative).

Content of the terminal group of the poly(thio)ester (co)polymer of the present invention is not limited. It is however normally 0.001 to 5% by mol on the total structural units, preferably 0.01 to 4% by mol, more preferably 0.05 to 3% by mol.

It is preferable that the poly(thio)ester (co)polymer of the present invention is polymerized following the procedure described above in the presence of a molecular weight adjusting agent to adjust its molecular weight.

The molecular weight adjusting agent useful for the present invention is not limited, and a variety of known ones for a known poly(thio) ester polymerization process may be used. For example, they include an aliphatic and aromatic hydroxyl compound, aliphatic and aromatic thiol compound, and aliphatic and aromatic carboxylic acid derivative (e.g., aliphatic and aromatic carboxylic acid halide and aliphatic and aromatic carboxylate), all being monovalent.

More specifically, these monovalent compounds include, but not limited to, aliphatic and aromatic hydroxyl compounds, e.g., methanol, ethanol, butanol, octanol, lauryl alcohol, methoxy ethanol, propylene glycol monomethyl ether, cyclohexyl alcohol, allyl alcohol, benzyl alcohol, phenyl ethanol, phenoxy ethanol, phenol, 4-tert-butylphenol, 2-cresol, 3-cresol, 4-cresol, 4-ethylphenol, 4-cyclohexylphenol, 4-methoxy phenol, 4-isopropenyl phenol, 4-chlorophenol, 4-bromophenol, 4-cumylphenol, 4-phenylphenol, α-naphthol and β-naphthol; aliphatic and aromatic thiol compounds, e.g., methanethiol, ethanethiol, butanethiol, octanethiol, cyclohexanethiol, phenylmethanethiol and benzenethiol; and aliphatic and aromatic carboxylic acids, e.g., acetic, propionic, butyric, valeric, caproic, heptanoic, caprylic, cyclohexanecarboxylic, phenylacetic, phenoxyacetic, benzoic, 4-methylbenzoic, 3-methylbenzoic, 2-methylbenzoic, 4-chlorobenzoic, 3-chlorobenzoic, 2-chlorobenzoic, 1-naphthoic and 2-naphthoic acid.

Content of the molecular weight adjusting agent is not limited, and it may be used as required to adjust the molecular weight at a desired level. It is however normally 0.001 to 5% by mol on the total dihydroxy compounds to be polymerized, preferably 0.01 to 4% by mol, more preferably 0.05 to 3%, still more preferably 0.05 to 2% by mol.

[Definition of Polymer Properties]

Molecular weight of the poly(thio) ester (co)polymer of the present invention and optical component (e.g., plastic lens) thereof is not limited, but is normally 5,000 to 200,000, preferably 10,000 to 180,000, more preferably 20,000 to 150,000, as the weight-average molecular weight determined by gel permeation chromatography (GPC) as that of the standard polystyrene.

A polydisperse index, defined as the ratio of weight-average molecular weight to number-average molecular weight, is not limited, but is normally 1.5 to 20.0, preferably 2.0 to 15.0, more preferably 2.0 to 10.0.

Glass transition temperature of the poly(thio) ester (co)polymer of the present invention and optical component (e.g., plastic lens) thereof is not limited. However, it is normally 70° C. or higher, preferably 80° C. or higher because the (co)polymer is used as a molding material for a variety of optical components, more preferably 90° C. or higher, still more preferably 100° C. or higher.

The poly(thio) ester (co)polymer of excessively high glass transition temperature is not desirable viewed from its moldability, because its temperature at which it starts to flow and melt viscosity relatively increase to cause various problems, e.g., deteriorated moldability and dye-affinity for dyeing vision-correcting eyeglass lenses.

Glass transition temperature of the poly(thio) ester (co) polymer of the present invention is preferably 70 to 200° C., more preferably 80 to 180° C., still more preferably 90 to 170° C.

The optical components obtained by molding the poly (thio) ester (co)polymer of the present invention is characterized by good transparency, mechanical characteristics (e.g., impact resistance) and thermal characteristics, and being better balanced with respect to a refractive index and Abbe number than a known thermoplastic optical resin, e.g., carbonate or methyl methacrylate.

The refractive index (nd) of the poly(thio) ester (co) polymer of the present invention and optical component (e.g., plastic lens) thereof is 1.55 or more, preferably 1.56 or more, more preferably 1.57 or more, still more preferably 1.58 or more, particularly preferably 1.59 or more.

An Abbe number (vd) of the poly(thio) ester (co)polymer of the present invention and optical component (e.g., plastic lens) thereof is 35 or more, preferably 36 or more, more preferably 37 or more, still more preferably 38 or more, particularly preferably 40 or more.

The poly(thio) ester (co)polymer of the present invention may be incorporated with one or more of various known additives during the production or molding process, within limits not harmful to the desired effects of the present invention. The additives useful for the present invention include an antioxidant (e.g., phosphorus-containing, phenol-based, hindered phenol-based or sulfur-containing compound), ultraviolet ray absorber, mold releasing agent (e.g., higher fatty acid ester of a monovalent or polyhydric alcohol), lubricant, flame retardant (e.g., organohalogen-based compound), dye, flow improver and heat stabilizer (e.g., sulfur-containing compound).

The poly(thio) ester (co)polymer of the present invention may be also incorporated with one or more other additives, e.g., an antistatic agent and filler (e.g., calcium carbonate, clay, silica, glass fibers, glass beads, or carbon fibers) to be molded into shapes other than optical components.

The poly(thio) ester (co)polymer of the present invention may be also mixed with another type of polymer during the production or molding process, within limits not harmful to the desired effects of the present invention. These other polymers include polyethylene, polypropylene, polystyrene, ABS, polymethyl methacrylate, polytrifluoroethylene, polytetrafluoroethylene, polyacetal, polyphenylene oxide, polybutylene terephthalate, polyethylene terephthalate, polycarbonate, polyamide, polyimide, polyamideimide, polyetherimide, polysulfone, polyethersulfone, paraoxybenzoyl-based poly(thio) ester, polyallylate and polysulfide.

(Regarding Resin Composition, Molding Process therefor and Optical Components thereof:)

The resin composition comprising the poly(thio) ester (co)polymer of the present invention contains (1) the poly (thio) ester (co)polymer of the present invention as an essential component, and, preferably (2) an antioxidant (e.g., phosphorus-containing, phenol-based, hindered phenol-based or sulfur-containing compound).

Content of the antioxidant is normally 0.0001 to 10 parts by weight per 100 parts by weight of the poly(thio) ester (co)polymer of the present invention, preferably 0.01 to 5 parts by weight, more preferably 0.05 to 3 parts by weight.

Examples of the antioxidant include, but not limited to, diphosphites, e.g., trimethyl phosphite, triethyl phosphite, tributyl phosphite, trioctyl phosphite, tris(2-ethylhexyl) phosphite, trinonyl phosphite, tridecyl phosphite, tris(tridecyl) phosphite, trioctadecyl phosphite, tristearyl phosphite, tris(2-chloroethyl) phosphite, tris(2,3-dichloropropyl) phosphite, tricyclohexyl phosphite, triphenyl phosphite, tricresyl phosphite, tris(ethylphenyl) phosphite, tris(2,4-di-t-butylphenyl) phosphite, tris(nonylphenyl) phosphite, phenyl-didecyl phosphite, diphenyl-isooctyl phosphite, diphenyl-2-ethylhexyl phosphite, diphenyl-decyl phosphite, diphenyl-tridecyl phosphite, bis(tridecyl)-pentaerythritylyl-diphosphite, distearyl-pentaerythritylyl-diphosphite, diphenyl-pentaerythritylyl-diphosphite, bis(nonylphenyl)-pentaerythritylyl-diphosphite, bis(2,4-di-tert-butylphenyl)-pentaerythritylyl-diphosphite, bis(2,6-di-tert-butyl-4-methylphenyl)-pentaerythritylyl-diphosphite, tetraphenyl-dipropylene glycol-diphosphite, tetra(tridecyl)-4,4'-isopropylidenediphenyl-diphosphite, tetra(2,4-di-tert-butylphenyl)-4,4'-diphenyl phosphite, tetraphenyltetra (tridecyl)pentaerythritylyl tetraphosphite and trilauryl trithiophosphite; phosphates, e.g., trimethyl phosphate, triethyl phosphate, tributyl phosphate, triphenyl phosphate, diphenyl mono-ortho-xenyl phosphate, dibutyl phosphate, dioctyl phosphate and diisopropyl phosphate; phosphonous acids, e.g., tetrakis(2,4-di-tert-butylphenyl)-4,4-diphenylene phosphonite; phosphorus-containing phosphonic acids, e.g., dimethyl benzenephosphonate, diethyl benzenephosphonate and isopropyl benzenephosphonate; and known phenol-based compounds, e.g., octadecyl-3-(3,5-di-tert-butyl-5-methyl-4-hydroxyphenyl) propionate, triethylene glycol-bis[3-(3-tert-butyl-5-methyl-4-hydroxyphenyl)propionate], 1,6-hexanediol-bis[3-(3,5-di-tert-butyl-5-methyl-4-hydroxyphenyl)propionate], pentaerythritol-tetrakis[3-(3,5-di-tert-butyl-5-methyl-4-hydroxyphenyl)propionate], 1,3,5-trimethyl-2,4,6-tris(3,5-di-tert-butyl-4-hydroxybenzyl) benzene, N,N-hexamethylenebis(3,5-di-tert-butyl-4-hydroxy-hydrocinnamamide), 3,5-di-tert-butyl-4-hydroxybenzyl phosphonate diethyl ester and tris(3,5-di-tert-butyl-4-hydroxybenzyl)isocyanurate. These antioxidants may be used either individually or in combination.

The poly(thio) ester (co)polymer of the present invention may be also incorporated with one or more other additives described above, within limits not harmful to the desired effects of the present invention. These additives include an ultraviolet ray absorber, mold releasing agent (e.g., higher fatty acid ester of a monovalent or polyhydric alcohol), lubricant, flame retardant (e.g., organohalogen-based compound), dye, flow improver and heat stabilizer (e.g., sulfur-containing compound).

The process for producing the resin composition of the present invention is not limited, and can be selected from a variety of known processes normally used for producing resin compositions. More specifically, these processes include a process (1) which isolates the poly(thio) ester (co)polymer as the solid from the solution in which the (co)polymer is dissolved, and disperses an antioxidant selected from those described above in the (co)polymer solid by an adequate mixer selected from the known ones, e.g., tumbler mixer, V-shaped blender, Nauta mixer and Henschel mixer, ribbon blender, and supermixer.

Another process (2) melts/kneads the (co)polymer, uniformly dispersed with an antioxidant by the above-described mixer, by an extruder, Banbury mixer, roll or the like. These processes may be combined.

The poly(thio) ester (co)polymer of the present invention or the resin composition containing the (co)polymer is thermoplastic, and can be suitably molded into shapes, after being molten, by a method selected from a variety of known ones, e.g., injection, extrusion, blow, injection compression or solution casting molding.

The poly(thio) ester (co)polymer of the present invention or the resin composition containing the (co)polymer is preferably molded by injection, extrusion or injection compression, when molded into an optical component.

The conditions under which the poly(thio) ester (co) polymer of the present invention is molded into an optical component can be optionally changed depending on thermal properties of the resin or resin composition. Normally, resin temperature is 180 to 350° C. with mold temperature of 25° C. (room temperature) to 160° C., preferably 180 to 300° C. with mold temperature of 50 to 150° C., and more preferably 180 to 300° C. with mold temperature of 50 to 150° C.

The poly(thio)ester (co)polymer of the present invention is excellent in transparency and optical characteristics (e.g., a high refractive index, a high Abbe number and a low birefringence), good in thermal and mechanical characteristics, and good in moldability and productivity. Accordingly, it is useful as a molding material for a variety of optical components.

The optical components of the present invention include a variety of plastic optical lenses, e.g., sight-correcting eyeglass lenses, lenses for imaging devices (e.g., those for cameras and VTRs), and pick-up, collimatory, fθ and fresnel lenses; boards for optical recording media (e.g., optical and opto-magnetic disks); and plastic boards for liquid crystal cells, optical fibers and light waveguides.

The optical components of the present invention produced by the above-described procedures are excellent in transparency and optical characteristics (e.g., a high refractive index, a high Abbe number and a low birefringence), and good in thermal and mechanical characteristics. Accordingly, they are suitably used for the above-described purposes.

The poly(thio)ester (co)polymer of the present invention and resin composition composed thereof can be molded into a variety of components other than the above-described optical components, e.g., those for electric devices, electronic components, vehicle parts and building materials.

The present invention will be described in more detail with reference to EXAMPLES, which by no means limit the present invention.

Physical properties of the poly(thio)ester (co)polymer and resin composition composed thereof, prepared in each EXAMPLE, were determined by the following procedures.

[Measurement of Weight-Average Molecular Weight]

The 0.2% by weight chloroform solution of the poly(thio) ester (co)polymer prepared in each EXAMPLE was analyzed by gel permeation chromatography (GPC) (Showa Denko's System-11) to determine its weight-average molecular weight (Mw) as that of the standard polystyrene.

[Temperature at which it Starts to Flow and Melt Viscosity]

These properties were measured under a load of 100 kg by a flow tester (Shimadzu's CFT500A) having an orifice, 0.1-cm in diameter and 1-cm long.

[Refractive Index and Abbe Number]

The poly(thio)ester (co)polymer prepared in each EXAMPLE was pressed at 220° C. into a sheet-shaped test piece, and its refractive index (nd) and Abbe number (vd) were determined at 20° C. by a Pulfrich refractometer.

[Birefringence]

A 5 μm thick thin film of the poly(thio)ester (co)polymer prepared in each EXAMPLE was prepared on a silicon wafer. The 1,1,1-trichloroethane solution (20% conc.) of the poly(thio)ester (co)polymer was filtered by a filter of fluorine-based resin (Teflon) with pores of 0.45 μm in diameter, and spread over a silicon wafer (diameter: 5 inches) by a spin coater rotating at 2000 rpm for 5 seconds. The coated wafer was dried at 70° C. for 15 minutes to remove the solvent, to have the 5 μm thick thin film of the poly(thio) ester (co)polymer. The thin film was irradiated with two modes of light, TE and TM, from a 632 nm laser to measure refractive indexes under the two modes by a prism coupler (Metricon's Model 2020). The birefringence is defined as the difference in refractive index.

[Synthesis of the poly(thio)ester (co)polymer]

REFERENCE PRODUCTION EXAMPLE 1

Synthesis of 2,6-bis(acetoxy)-8-thiatricyclo[2.2.1.1$^{3,5}$]-octane

A 1-L flask equipped with a stirrer was charged with 114 g (0.60 mol) of 2,6-dichloro-8-thiatricyclo[2.2.1.1$^{3,5}$]octane and 360 g of acetic acid, to which 144 g (1.7 mols) of sodium acetate was added with stirring. The mixture was heated to 60° C., at which it was held for 11 hours. It was then cooled to room temperature and filtered the residue to collect a filtrate.

The filtrate was put in 1500 mL of water with stirring, and extracted with 900 mL of dichloromethane. The resultant organic layer was neutralized with an aqueous solution of sodium hydroxide, washed with water and concentrated by an evaporator, to obtain the white crystal.

The resultant white crystal was dissolved in a small quantity of ethyl acetate, and the solution was passed through a short column of silica gel chromatograph (development medium: ethyl acetate/n-hexane). The resultant extract was concentrated and dried, to obtain 119.4 g of the 2,6-bis(acetoxy)-8-thiatricyclo[2.2.1.1$^{3,5}$]octane represented by the formula (a) in a yield of 84.3%.

MS: 242 (M$^+$) $^1$H-NMR δ (ppm, DMSO): 1.63 (s, 2H), 1.99 (s, 6H), 2.92 (bs, 1H), 3.04–3.05 (bd, 2H), 3.83–3.87 (bt, 1H), 5.15 (s, 2H)

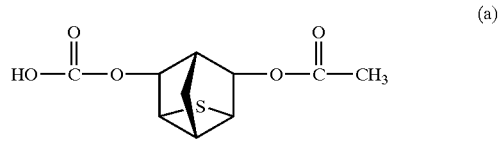

(a)

REFERENCE PRODUCTION EXAMPLE 2

Synthesis of 2,6-dihydroxy-8-thiatricyclo[2.2.1.1$^{3,5}$]octane

A 1-L flask equipped with a stirrer was charged with 110 g (0.56 mol) of the 2,6-bis(acetoxy)-8-thiatricyclo[2.2.1.1$^{3,5}$]octane prepared in REFERENCE PRODUCTION EXAMPLE 1 and 600 mL of methanol, to which 84 g (1.0 mol) of sodium hydrogen carbonate was added with stirring. The mixture was heated to a temperature at which methanol served as the reflux, at which it was held for 4 hours. It was then cooled to room temperature and filtered to remove the residue.

The resultant filtrate was concentrated by an evaporator, to which 1200 g of acetonitrile and 4 g of activated coal were added. It was heated to 80° C., and then cooled and filtered. The resultant filtrate was concentrated by an evaporator, to obtain a light yellowish crystal. It was heated again and dissolved in 160 g of acetonitrile, and the solution was cooled for recrystallization, filtered and dried, to obtain 61.6 g of the 2,6-dihydroxy-8-thiatricyclo[2.2.1.1$^{3,5}$]octane represented by the formula (1—1) in a yield of 85%. It was 99.8% pure, as determined by gas chromatography.

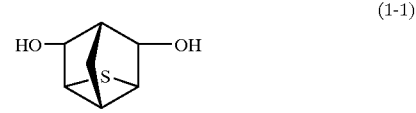

(1-1)

EXAMPLE 1

Production of a Polyester Polymer by Condensation of 2,6-dihydroxy-8-thiatricyclo[2.2.1.1$^{3,5}$]octane and 1,4-cyclo-hexanedicarboxylic acid dichloride A 500-mL flask equipped with a stirrer was charged with 22.2 g (0.14 mol) of the 2,6-dihydroxy-8-thiatricyclo-[2.2.1.1$^{3,5}$]octane prepared in REFERENCE PRODUCTION EXAMPLE 2, 66.4 g (0.84 mol) of pyridine and 80 g of o-dichlorobenzene (ODCB), and the mixture was heated to 60° C. under nitrogen atmosphere, to which 29.3 g (0.14 mol) of 1,4-cyclohexanedicarboxylic acid chloride was added dropwise in 2 hours through a funnel kept at 70° C. When the resultant mixture was held at 80° C. for 12 hours, viscosity increase of the reaction solution was observed. Therefore, 20 g of ODCB was further added, and the mixture was continuously kept the temperature for additional 3 hours. Then, 0.20 g (0.0014 mol) of benzoyl chloride was charged into the mixture and the resultant mixture was kept the temperature for 1 hour. Thereafter, 0.76 g (0.007 mol) of benzyl alcohol was added into the mixture, and the resultant mixture was kept the temperature for 1 hour and then cooled to 10° C.

Then, 150 g of water and 150 g of dichloromethane were added into the reaction solution under cooling with ice, and a pH of the resultant solution was controlled at 1 with 36% hydrochloric acid. The resultant solution was allowed to stand, and the lower organic layer was removed and washed with water 3 times.

The organic layer was added dropwise in 2 hours to 1500 mL of n-hexane with vigorous stirring by a homogenizer, to be precipitated. The resultant solid was filtered and dissolved in 150 g of dichloromethane, and the resultant solution was added dropwise in 2 hours to 1500 mL of methanol with vigorous stirring by a homogenizer, to be reprecipitated.

The resultant precipitate was filtered, washed with methanol and dried, to obtain 39.5 g of the polyester as a white, powdery solid having the repeating structural unit represented by the formula (1-A-1). It had a weight-average molecular weight of 67,000, as determined by GPC.

The resultant polymer (0.5 g) was weighed and introduced between films of "UPILEX" (trade name of a polyimide resin manufactured by Ube Industries) with metallic spacers and then molten under heating for 8 minutes by a hot press. The molten polymer was then cooled under a pressure of 4.9 MPa (50 kg/cm$^2$) by a press, to prepare a film-shaped test piece. It was colorless and transparent, having a refractive index (nd) of 1.574 and an Abbe number (vd) of 50.8. It showed no problem with respect to both fluidity and melt viscosity, and had good moldability.

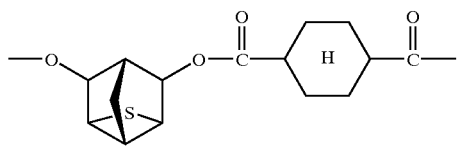

(1-A-1)

REFERENCE PRODUCTION EXAMPLE 3

Synthesis of 2,5-bis(hydroxymethyl)-1,4-dithian

A 3-L flask equipped with a stirrer was charged with 450 g (1.7 mols) of 2,5-bis(acetoxymethyl)-1,4-dithian and 1500 mL of methanol, to which 314.6 g (3.7 mols) of sodium hydrogen carbonate was added with stirring. The mixture was heated to a temperature at which methanol served as the reflux, at which it was held for 5 hours. It was then cooled to room temperature and filtered to remove the residue. Then, the resultant filtrate was transferred to a 3-L flask equipped with a stirrer, to which 20 g of activated carbon was added. The mixture was again heated to a temperature at which methanol served as the reflux, at which it was held for 30 minutes, and then cooled to room temperature and filtered. The resultant filtrate was concentrated by an evaporator, to obtain a colorless, oily product. It was purified by silica gel chromatography with ethyl acetate/n-hexane as the development medium, to obtain 298 g (yield: 97%) of the 2,5-bis(hydroxymethyl)-1,4-dithian, represented by the formula (1-2). It had 99.9% of purity, as determined by gas chromatography.

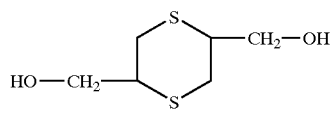

(1-2)

MS: 180 (M$^+$) IR (KBr, cm$^{-1}$): 1201.3 (C—O stretching), 1411.9 (C—S deformation) $^1$H-NMR: δ (ppm, D$_2$O): 2.85–2.90 (d, 4H), 2.88–2.96 (m, 2H), 3.62–3.67 (dd, 2H), 3.72–3.77 (dd, 2H)

REFERENCE PRODUCTION EXAMPLE 4

Synthesis of a dihydroxy mixture of 2,5-bis(hydroxymethyl)-1,4-dithian, 3-hydroxy-6-hydroxymethyl-1,5-dithiacycloheptane and 3,7-dihydroxy-1,5-dithiacyclooctane Produced by Hydrolysis of 2,5-bis(chloromethyl)-1,4-dithian A flask equipped with a stirrer and nitrogen bubbling tube was charged with 68.6 g of pure water, to which a solution of 34.3 g (0.16 mol) of 2,5-bis(chloro-methyl)-1,4-dithian and 102 g of acetonitrile was added dropwise in 1 hour at room temperature. The mixture was heated to 77° C., at which the reactions were effected for 10 hours. The reaction solution was cooled to room temperature and neutralized with 4 g of magnesium oxide. The neutralized solution was filtered, and the filtrate was concentrated by an evaporator, to obtain a colorless, oily product. It was then passed through a short column of silica gel chromatograph (development medium: ethyl acetate/n-hexane). The resultant extract was concentrated and dried, to obtain 18.2 g of the mixture of 2,5-bis(hydroxymethyl)-1,4-dithian represented by the formula (1-3), 3-hydroxy-6-hydroxymethyl-1,5-dithiacycloheptane represented by the formula (1-4) and 3,7-dihydroxy-1,5-dithiacyclooctane represented by the formula (1-5) in a yield of 64%.

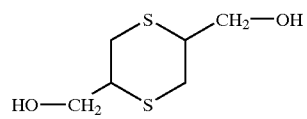

(1-3)

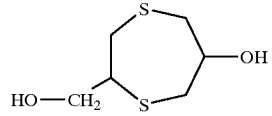

(1-4)

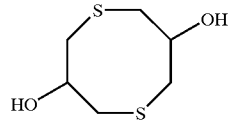

(1-5)

MS: 180 (M$^+$) IR (KBr, cm$^{-1}$): 1201.3 (C—O stretching), 1411.9 (C—S deformation) $^{13}$C-NMR: δ (ppm, D$_2$O): 29.2, 36.1, 39.4, 39.5, 41.7, 52.0, 63.9, 64.7, 62.8

EXAMPLE 2

Production of a Polyester Polymer by Condensation of 2,5-bis(hydroxymethyl)-1,4-dithian and 1,4-cyclohexane-dicarboxylic acid dichloride A 500-mL flask equipped with a stirrer was charged with 27.1 g (0.15 mol) of 2,5-bis(hydroxymethyl)-1,4-dithian, 71.3 g (0.90 mol) of pyridine and 100 g of o-dichlorobenzene (ODCB), and the mixture was heated to 60° C. under nitrogen atmosphere, to which 31.4 g (0.15 mol) of 1,4-cyclohexanedicarboxylic acid chloride was added dropwise in 2 hours through a funnel kept at 70° C. When the resultant mixture was held at 60° C. for 8 hours, viscosity increase of the reaction solution was observed. Therefore, 40 g of ODCB was further added, and the solution was continuously kept the temperature for additional 3 hours. Then, 0.21 g (0.0015 mol) of benzoyl chloride was added into the solution and it was kept the temperature for 1 hour. Thereafter, 0.81 g (0.0075 mol) of benzyl alcohol was added into the solution, and the resultant solution was kept the temperature for 1 hour and then cooled to 10° C.

Then, 160 g of water and 160 g of dichloromethane were added into the reaction solution under cooling by ice, and a pH of the resultant solution was controlled at 1 with 36% hydrochloric acid. The resultant solution was allowed to stand, and the lower organic layer was removed and washed with water 3 times. The organic layer was added dropwise in 2 hours to 1500 mL of n-hexane with vigorous stirring by a homogenizer, to be precipitated. The resultant solid was filtered and dissolved in 150 g of dichloromethane, and the resultant solution was added dropwise in 2 hours to 1500 mL of methanol with vigorous stirring by a homogenizer, to be reprecipitated.

The resultant precipitate was filtered, washed with methanol and dried, to obtain 41.9 g of the poly(thio)ester as a white, powdery solid represented by the formula (1-A-2). It had a weight-average molecular weight of 75,000, as determined by GPC.

The resultant polymer was formed into a film in the same manner as in EXAMPLE 1. It was colorless and transparent, having a refractive index (nd) of 1.566 and an Abbe number (vd) of 48.0. It showed no problem with respect to both fluidity and melt viscosity, and had good moldability.

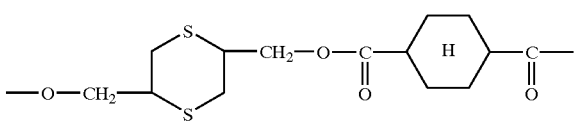

(1-A-2)

EXAMPLE 3

Production of the Polyester Polymer of the Present Invention, and Measurement of its Properties A 3-L (net volume) flask equipped with a stirrer, reflux condenser and thermometer was charged with 358.99 g (1.69 mols) of 2,5-bis(mercaptomethyl)-1,4-dithian and 500 g of chlorobenzene, and the mixture was stirred under nitrogen atmosphere to dissolve the former in the latter. Into the mixture, 375.84 g (1.70 mols) of norbornanedicarboxylic acid chloride (isomer mixture) were added dropwise at 100° C. in 1 hour. The reaction was allowed to proceed at 130° C. for 8 hours, while hydrogen chloride formed as a by-product in a flow of nitrogen was purged from the reaction system. After it was confirmed that the product had a GPC-determined weight-average molecular weight of 90,000, 8.43 g (0.0248 mol; 3.5% by mol) of p-tert-butyl phenol as a molecular weight adjustor (terminal terminator) were added into the reaction system at 100° C., and the reaction was allowed to proceed at the same temperature for 1 hour. The reaction solution was left to stand to be cooled to room temperature, and dissolved in 3900 g of chloroform which was added to the solution. The resultant chloroform solution of poly(thio)ester polymer was divided into 3 portions, and each portion was added dropwise to 4500 g of methanol using a 10-L homogenizer, to separate the polymer in the form of fine particles. The polymer was collected by filtration and dried under reduced pressure at 80° C. for 20 hours, to obtain 670 g of the target poly(thio)ester copolymer as the white, powdery solid having the repeating structural unit represented by the formula (1-A-3) in a yield of 99%.

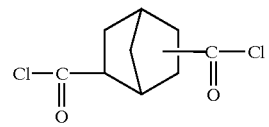

(3-1)

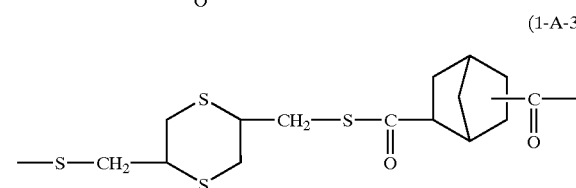

(1-A-3)

Physical properties of the poly(thio)ester copolymer thus prepared were determined by the procedures described above. It had a good glass transition temperature (Tg) of 104° C. It had a refractive index (nd) of 1.631 and an Abbe number (vd) of 37.7, each of which was higher than that of a common polycarbonate. It had a lower birefringence than a common polycarbonate.

EXAMPLE 4

A poly(thio)ester copolymer having a repeating structural unit represented by the formula (1-A-4) was prepared in the same manner as in EXAMPLE 3, except that 2,5-bis(mercaptomethyl)-1,4-dithian was replaced by bis(2-mercaptoethyl)sulfide.

Physical properties of the poly(thio)ester copolymer thus prepared were determined by the procedures described above. It had an acceptable glass transition temperature (Tg) of 80° C. or higher. It had a refractive index (nd) of 1.613 and an Abbe number (vd) of 39, each of which was higher than that of a common polycarbonate. It had a lower birefringence than a common polycarbonate.

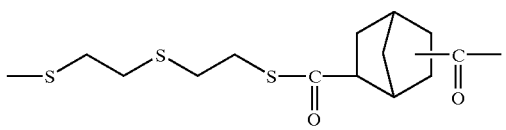

(1-A-4)

EXAMPLE 5

A poly(thio)ester copolymer having a repeating structural unit represented by the formula (1-A-5) was prepared in the same manner as in EXAMPLE 3, except that norbornanedicarboxylic acid chloride was replaced by 1,4-cyclohexanedicarboxylic acid chloride.

Physical properties of the poly(thio)ester copolymer thus prepared were determined by the procedures described above. It had an acceptable glass transition temperature (Tg) of 95° C. It had a refractive index (nd) of 1.631 and an Abbe number (vd) of 38.0, each of which was higher than that of a common polycarbonate. It had a lower birefringence than a common polycarbonate.

(1-A-5)

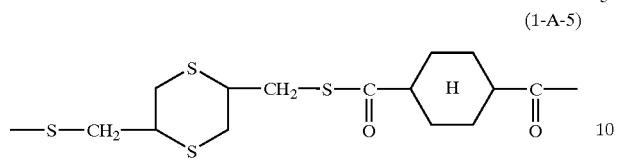

EXAMPLE 6

A poly(thio)ester copolymer having a repeating structural unit represented by the formula (1-A-6) was prepared in the same manner as in EXAMPLE 3, except that 2,5-bis(mercaptomethyl)-1,4-dithian was replaced by bis(2-mercaptoethyl)sulfide and norbornanedicarboxylic acid chloride was replaced by 1,4-cyclohexanedicarboxylic acid chloride.

Physical properties of the poly(thio)ester copolymer thus prepared were determined by the procedures described above. It had an acceptable glass transition temperature (Tg) of 80° C. or higher. It had a refractive index (nd) of 1.635 and an Abbe number (vd) of 39.0, each of which was higher than that of a common polycarbonate. It had a lower birefringence than a common polycarbonate.

(1-A-6)

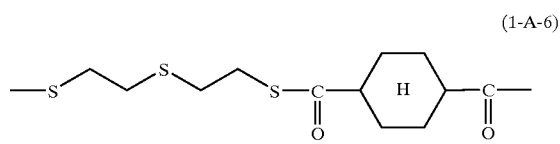

EXAMPLE 7

A poly(thio)ester copolymer having a repeating structural unit represented by the formula (1-A-7) was prepared in the same manner as in EXAMPLE 3, except that norbornanedicarboxylic acid chloride was replaced by terephthalic acid chloride.

Physical properties of the poly(thio)ester copolymer thus prepared were determined by the procedures described above. It had a good glass transition temperature (Tg) of 200° C. or higher, and was highly resistant to heat. It had a refractive index (nd) of 1.685, which was higher than that of a common polycarbonate, and an Abbe number (vd) of 30.2. It had a lower birefringence than a common polycarbonate.

(1-A-7)

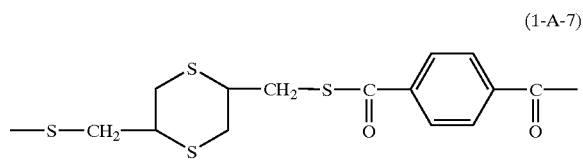

EXAMPLE 8

A poly(thio)ester copolymer having a repeating structural unit represented by the formula (1-A-8) was prepared in the same manner as in EXAMPLE 3, except that norbornanedicarboxylic acid chloride was replaced by isophthalic acid chloride.

Physical properties of the poly(thio)ester copolymer thus prepared were determined by the procedures described above. It had a good glass transition temperature (Tg) of 105° C. It had a refractive index (nd) of 1.685, which was higher than that of a common polycarbonate, and an Abbe number (vd) of 30.2. It had a lower birefringence than a common polycarbonate.

(1-A-8)

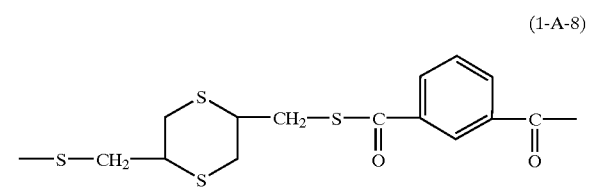

EXAMPLE 9

A poly(thio)ester copolymer having a repeating structural unit represented by the formula (1-A-9) was prepared in the same manner as in EXAMPLE 3, except that 2,5-bis(mercaptomethyl)-1,4-dithian was replaced by bis(2-mercaptoethyl)sulfide and norbornanedicarboxylic acid chloride was replaced by terephthalic acid chloride.

Physical properties of the poly(thio)ester copolymer thus prepared were determined by the procedures described above. It had a good glass transition temperature (Tg) of 100° C. or higher. It had a refractive index (nd) of 1.680, which was higher than that of a common polycarbonate, and an Abbe number (vd) of 30.0. It had a lower birefringence than a common polycarbonate.

(1-A-9)

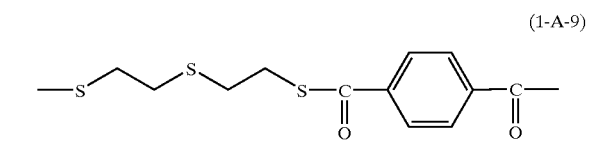

EXAMPLE 10

A poly(thio)ester copolymer having a repeating structural unit represented by the formula (1-A-10) was prepared in the same manner as in EXAMPLE 3, except that 2,5-bis(mercaptomethyl)-1,4-dithian was replaced by bis(2-mercaptoethyl)sulfide and norbornanedicarboxylic acid chloride was replaced by isophthalic acid chloride.

Physical properties of the poly(thio)ester copolymer thus prepared were determined by the procedures described above. It had an acceptable glass transition temperature (Tg) of 80° C. or higher. It had a refractive index (nd) of 1.680, which was higher than that of a common polycarbonate, and an Abbe number (vd) of 30.5. It had a lower birefringence than a common polycarbonate.

(1-A-10)

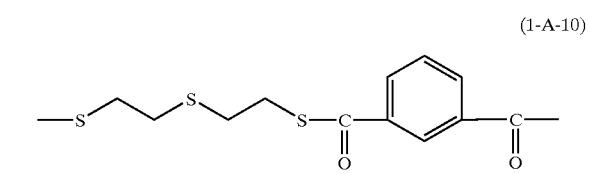

EXAMPLE 11

A poly(thio)ester copolymer having a repeating structural unit represented by the formula (1-A-11) was prepared in the same manner as in EXAMPLE 3, except that 2,5-bis(mercaptomethyl)-1,4-dithian was replaced by bis(2-mercaptoethyl)sulfide and norbornanedicarboxylic acid chloride was replaced by tetracyclododecenedicarboxylic acid chloride represented by the formula (2—2).

Physical properties of the poly(thio)ester copolymer thus prepared were determined by the procedures described above. It had an acceptable glass transition temperature (Tg) of 80° C. or higher. It had a refractive index (nd) of 1.601 and an Abbe number (vd) of 41.9, each of which was higher than that of a common polycarbonate. It had a lower birefringence than a common polycarbonate.

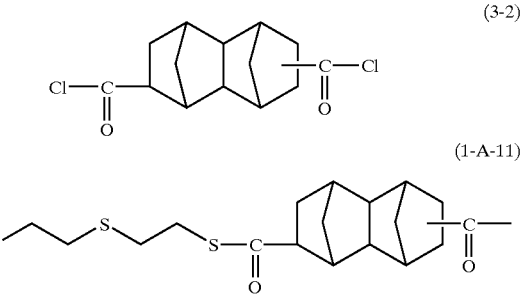

EXAMPLE 12

Production of a Molding Material for Optical Components, Composed of the poly(thio)ester Copolymer Prepared in Example 3

100 parts by weight of the polythioester copolymer prepared in EXAMPLE 3, 0.2 parts by weight of tris(2,4-di-tert-butylphenyl)phosphite (Ciba Specialty Chemicals' product: "IRGAFOS 618") and 0.2 parts by weight of octadecyl-3-(3,5-di-tert-butyl-4-hydroxyphenyl)propionate (Ciba Specialty Chemicals' product: "IRGANOX 1076") were mixed by a Henschel mixer, and the mixture was pelletized by a single-screw extruder (65 mm), where it was molten/kneaded and extruded at 210° C. of a cylinder temperature while the gases were purged from the system, to prepare a colorless, transparent molding material (resin composition) for optical components.

EXAMPLE 13

Production of an Optical Component (Plastic Lens)

The molding material (resin composition) for optical components, prepared in EXAMPLE 12, was injection-molded into a lens-shaped article, where the pelletized composition was dried under reduced pressure at 80° C. for 24 hours, and injection-molded under the conditions of molding temperature: 230° C. and mold temperature: 60° C. into a colorless plus lens-shaped article (convex lens, diameter: 75 mm, central thickness: 4.2 mm, peripheral thickness: 1.0 mm, +2.00D). The lens-shaped article showed neither striae nor distortion, when observed while put between polarizing plates, and was low in birefringence and optically uniform. It is therefore confirmed that the molding material (resin composition) of the present invention can be suitably molded into an optically uniform shape at a relatively low temperature (230° C.). The plastic lens of the present invention thus prepared showed good characteristics, e.g., transparency, mechanical characteristics (e.g., impact resistance, tensile strength and bending strength), thermal characteristics (e.g., thermal deformation temperature) and light resistance.

Production of poly(thio)ester Copolymers (Two-Component)

EXAMPLE 14

Production of the poly(thio)ester Polymer of the Present Invention, and Measurement of its Properties A 2-L (net volume) flask equipped with a stirrer, reflux condenser and thermometer was charged with 155.1 g (0.73 mol) of 2,5-bis(mercaptomethyl)-1,4-dithian, 84.8 g (0.73 mol) of 1,4-cyclohexanediol and 440 g of o-dichlorobenzene, and the mixture was stirred at 80° C. under nitrogen atmosphere to dissolve the dithian, to which 320.6 g (1.446 mols) of norbornanedicarboxylic acid chloride (isomer mixture) represented by the formula (3-1) was added dropwise at 80 to 105° C. in 75 minutes. The reaction was allowed to proceed at 105° C. for 4 hours, while hydrogen chloride formed as a by-product was purged in a flow of nitrogen from the reaction system. When weight-average molecular weight of the polymer reached 47,000, 350 g of o-dichlorobenzene was added, and the reaction was allowed to proceed continuously at 140° C. for 5 hours. The product polymer had a GPC-determined weight-average molecular weight of 82,000. Then, it was incorporated with 3.5 g (0.0248 mol) of benzoic acid chloride as a molecular weight adjustor (terminal terminator), and the reaction was allowed to proceed at the same temperature for 1 hour. The reaction solution was left to stand to be cooled to room temperature, and dissolved in 3000 g of chloroform which was added to the solution. The resultant solution was divided into two portions, and each portion was added dropwise to a poor solvent (methanol) in a 10-L homogenizer, to separate the polymer. The polymer was collected by filtration and dried under reduced pressure at 80° C. for 20 hours, to obtain 540 g of the poly(thio)ester copolymer product as the white, powdery solid in a yield of 99%.

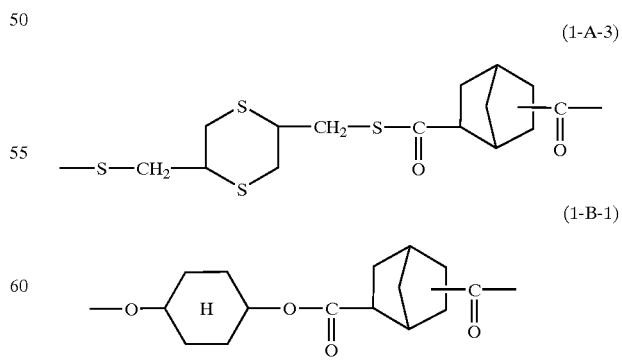

The 1% by weight deuterized chloroform solution of the poly(thio)ester copolymer, was analyzed by $^1$H-NMR (400 MHz). The results are shown below.

$^1$H-NMR δ (CDCl$_3$): 1.20 to 2.05 (m, 20H), 2.25 to 3.10 (m, 14H), 3.15 to 3.30 (m, 4H), 4.70 to 4.90 (br, 2H)

The $^1$H-NMR analysis results confirmed that the molar ratio of the repeating structural unit represented by the formula (1-A-3) to that represented by the formula (1-B-1) is 50:50 by finding the integral ratio of hydrogen in the thiomethylene group (3.15 to 3.30 ppm) bonded to the 2- and 5-site in the 1,4-dithan ring in the repeating structural unit represented by the formula (1-A-3) to methine hydrogen (4.70 to 4.90 ppm) in the 1- and 4-site in the cyclohexane ring in the repeating structural unit represented by the formula (1-B-1).

Physical properties of the poly(thio)ester copolymer thus prepared were determined by the procedures described above. It had a glass transition temperature (Tg) of 117° C. It started to flow at 210° C., and had a melt viscosity of 1200 Pa·s (12,000 poise) at 240° C., a refractive index (nd) of 1.581, an Abbe number (vd) of 44, which was higher than that of a common polycarbonate, and a lower birefringence than a common polycarbonate.

EXAMPLE 15

A poly(thio)ester copolymer was prepared in the same manner as in EXAMPLE 14, except that quantity of 2,5-bis(mercaptomethyl)-1,4-dithian was decreased from 155.1 g (0.73 mol) to 123.2 g (0.58 mol) and that of 1,4-cyclohexanediol was increased from 84.8 g (0.73 mol) to 102.2 g (0.88 mol).

The poly(thio)ester copolymer had a GPC-determined weight-average molecular weight of 66,000 as that of the standard polystyrene, and contained the repeating structural units represented by the formulae (1-A-3) and (1-B-1) in a molar ratio of 40:60, determined from the $^1$H-NMR analysis results.

Physical properties of the poly(thio)ester copolymer thus prepared were determined by the procedures described above. It had a glass transition temperature (Tg) of 124° C. It started to flow at 195° C., and had a melt viscosity of 980 Pa·s (9,800 poise) at 250° C., a refractive index (nd) of 1.565, an Abbe number (vd) of 45 and a very low birefringence.

EXAMPLE 16

Production of a Molding Material for Optical Components, Composed of the poly(thio)ester Copolymer Prepared in Example 14

100 parts by weight of the poly(thio)ester copolymer prepared in EXAMPLE 14, 0.1 part by weight of tris(2,4-di-tert-butylphenyl)phosphite and 0.1 part by weight of pentaerythritylyl[3-(3,5-di-tert-butyl-4-hydroxyphenyl)propionate were mixed by a Henschel mixer, and the mixture was pelletized by a single-screw extruder (65 mm), where it was molten/kneaded and extruded at 215° C. as cylinder temperature while the gases were purged from the system, to prepare a colorless, transparent molding material (resin composition) for optical components.

EXAMPLE 17

Production of an Optical Component of the Present Invention

The molding material (resin composition) for optical components, prepared in EXAMPLE 16, was injection-molded into a lens-shaped article, where the pelletized composition was dried under reduced pressure at 100° C. for 24 hours, and injection-molded under the conditions of molding temperature: 250° C. and mold temperature: 80° C. into a colorless plus lens-shaped article (convex lens, diameter: 75 mm, central thickness: 4.2 mm, peripheral thickness: 1.0 mm, +2.00D). The lens-shaped article showed neither striae nor distortion, when observed while put between polarizing plates, and was low in birefringence and optically uniform. It is therefore confirmed that the molding material (resin composition) of the present invention can be suitably molded into an optically uniform shape at a lower temperature (250° C.) than a common polycarbonate. The plastic lens of the present invention thus prepared showed good characteristics for practical purposes, e.g., transparency, mechanical characteristics (e.g., impact resistance, tensile strength and bending strength), thermal characteristics (e.g., thermal deformation temperature) and light resistance.

EXAMPLE 18

Production of the Polyester Polymer of the Present Invention, and Measurement of its Properties A 2-L (net volume) flask equipped with a stirrer, reflux condenser and thermometer was charged with 155.1 g (0.73 mol) of 2,5-bis(mercaptomethyl)-1,4-dithian, 175.5 g (0.73 mol) of 2,2-bis(4-hydroxycyclohexyl)propane and 440 g of o-dichlorobenzene, and the mixture was stirred at 80° C. under nitrogen atmosphere to dissolve the dithian, to which 320.6 g (1.446 mols) of norbornanedicarboxylic acid chloride (isomer mixture) represented by the formula (3-1) was added dropwise at 80 to 105° C. in 75 minutes. The reaction was allowed to proceed at 105° C. for 4 hours, while hydrogen chloride formed as a by-product was purged in a flow of nitrogen from the reaction system. When weight-average molecular weight of the polymer reached 45,000, 350 g of o-dichlorobenzene was added, and the reaction was allowed to proceed continuously at 160° C. for 2 hours. The product polymer had a GPC-determined weight-average molecular weight of 7.4×10$^4$. Then, it was incorporated with 3.5 g (0.0248 mol) of benzoic acid chloride as a molecular weight adjustor (terminal terminator), and the reaction was allowed to proceed at the same temperature for 1 hour. The reaction solution was left to stand to be cooled to room temperature, and dissolved in 3000 g of chloroform which was added to the solution. The resultant solution was divided into two portions, and each portion was added dropwise to a poor solvent (methanol) in a 10-L homogenizer, to separate the polymer. The polymer was collected by filtration and dried under reduced pressure at 80° C. for 20 hours, to obtain 536.5 g of the target poly(thio)ester copolymer product as the white, powdery solid in a yield of 99%. It had a GPC-determined weight-average molecular weight of 7.4×10$^4$.

The 1% by weight deuterized chloroform solution of the poly(thio)ester copolymer was analyzed by $^1$H-NMR (400 MHz). The results are shown below.

$^1$H-NMR δ (CDCl$_3$): 0.65 (m, 6H) to 3.10 (m, 43H), 3.20 to 3.35 (m, 4H), 4.50 to 5.05 (2H)

The $^1$H-NMR analysis results confirmed that the molar ratio of the repeating structural unit represented by the formula (1-A-3) to that represented by the formula (1-B-2) is 50:50 by finding the integral proton ratio of hydrogen in the thiomethyl group bonded to the 2- and 5-site in the 1,4-dithan ring in the repeating structural unit represented by the formula (1-A-3) to methine hydrogen substituted by oxygen at the 4-site atom on the cyclohexane ring in the repeating structural unit represented by the formula (1-B-2).

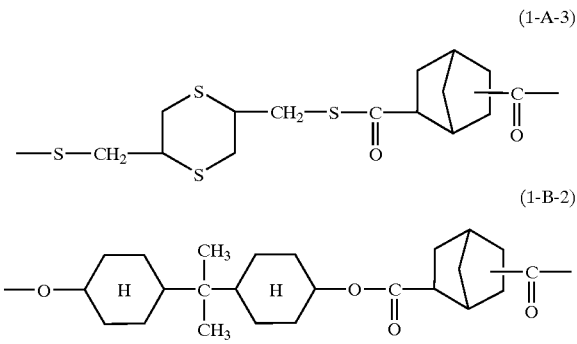

Physical properties of the poly(thio)ester copolymer thus prepared were determined by the procedures described above. It had a glass transition temperature (Tg) of 130° C. It started to flow at 210° C., and had a melt viscosity of 360 Pa·s (3,600 poise) at 260° C., a relatively high refractive index (nd) of 1.578, a high Abbe number (vd) of 46 and a lower birefringence than a common polycarbonate.

EXAMPLE 19

A poly(thio)ester copolymer was prepared in the same manner as in EXAMPLE 18, except that quantity of 2,5-bis(mercaptomethyl)-1,4-dithian was increased from 155.1 g (0.73 mol) to 187.0 g (0.88 mol) and that of 2,2-bis(4-hydroxycyclohexyl)propane was decreased from 175.5 g (0.73 mol) to 139.4 g (0.58 mol).

The poly(thio)ester copolymer had a GPC-determined weight-average molecular weight of 66,000 as that of the standard polystyrene, and contained the repeating structural units represented by the formulae (1-A-3) and (1-B-2) in a molar ratio of 60:40, determined from the $^1$H-NMR analysis results.

Physical properties of the poly(thio)ester copolymer thus prepared were determined by the procedures described above. It had a glass transition temperature (Tg) of 130° C. It started to flow at 190° C., and had a melt viscosity of 1,200 Pa·s (12,000 poise) at 250° C., a refractive index (nd) of 1.587, an Abbe number (vd) of 45 and a very low birefringence.

EXAMPLE 20

Production of a Molding Material for Optical Components, Composed of the poly(thio)ester Copolymer Prepared in Example 18

100 parts by weight of the poly(thio)ester copolymer prepared in EXAMPLE 18, 0.1 part by weight of tris(2,4-di-tert-butylphenyl)phosphite and 0.1 part of pentaerythritylyl[3-(3,5-di-tert-butyl-4-hydroxyphenyl)propionate] were mixed by a Henschel mixer, and the mixture was pelletized by a single-screw extruder (65 mm), where it was molten/kneaded and extruded at 220° C. as cylinder temperature while the gases were purged from the system, to prepare a colorless, transparent molding material (resin composition) for optical components.

EXAMPLE 21

Production of an Optical Component of the Present Invention

The molding material (resin composition) for optical components, prepared in EXAMPLE 20, was injection-molded into a lens-shaped article, where the pelletized composition was dried under reduced pressure at 100° C. for 24 hours, and injection-molded under the conditions of molding temperature: 250° C. and mold temperature: 80° C. into a colorless plus lens-shaped article (convex lens, diameter: 75 mm, central thickness: 4.2 mm, peripheral thickness: 1.0 mm, +2.00D). The lens-shaped article showed neither striae nor distortion, when observed while put between polarizing plates, and was low in birefringence and optically uniform. It is therefore confirmed that the molding material (resin composition) of the present invention can be suitably molded into an optically uniform shape at a lower temperature (250° C.) than a common polycarbonate. The plastic lens of the present invention thus prepared showed good characteristics for practical purposes, e.g., transparency, mechanical characteristics (e.g., impact resistance, tensile strength and bending strength), thermal characteristics (e.g., thermal deformation temperature) and light resistance.

EXAMPLE 22

Production of the Polyester Polymer of the Present Invention, and Measurement of its Properties A 300-mL (net volume) flask equipped with a stirrer, reflux condenser and thermometer was charged with 15.93 g (0.075 mol) of 2,5-bis(mercaptomethyl)-1,4-dithian, 18.03 g (0.075 mol) of 2,2-bis(4-hydroxycyclohexyl)propane and 44 g of o-dichlorobenzene, and the mixture was stirred at 80° C. under nitrogen atmosphere to dissolve the dithian, to which 31.21 g (0.1493 mol) of 1,4-cyclohexanedicarboxylic acid chloride was added dropwise at 95 to 100° C. in 90 minutes. The reaction was allowed to proceed at 105° C. for 3 hours, while hydrogen chloride formed as a by-product was purged in a flow of nitrogen from the reaction system. When weight-average molecular weight of the polymer reached $4.1 \times 10^4$, 30 g of o-dichlorobenzene was added, and the reaction was allowed to proceed continuously at 140° C. for 5 hours. Then, 40 g of o-dichlorobenzene was added, and the reaction was allowed to proceed further at 160° C. for 2 hours. The product polymer had a GPC-determined weight-average molecular weight of $8.8 \times 10^4$. Then, 0.42 g (0.008 mol) of benzoic acid chloride as a molecular weight adjustor (terminal terminator) was added thereto, and the reaction was allowed to proceed at the same temperature for 1 hour. The reaction solution was left to stand to be cooled to room temperature, and dissolved in 300 g of chloroform which was added to the solution. The resultant solution was added dropwise to a poor solvent (methanol) in a 1.5-L homogenizer, to separate the polymer. The polymer was collected by filtration and dried under reduced pressure at 80° C. for 20 hours, to obtain 53.3 g of the target poly(thio)ester copolymer product as the white, powdery solid in a yield of 98%. It had a GPC-determined weight-average molecular weight of $8.6 \times 10^4$.

The 1% by weight deuterized chloroform solution of the poly(thio)ester copolymer was analyzed by $^1$H-NMR (400 MHz). The results are shown below.

$^1$H-NMR δ (CDCl$_3$): 0.74 (m, 6H) to 3.15 (m, 43H), 3.20 to 3.35 (m, 4H), 4.55 to 5.02 (2H)

The $^1$H-NMR analysis results confirmed that the molar ratio of the repeating structural unit represented by the formula (1-A-5) to that represented by the formula (1-B-3) is 50:50 by finding the integral proton ratio of hydrogen in the thiomethyl group bonded to the 2- and 5-site in the 1,4-dithan ring in the repeating structural unit represented by the formula (1-A-5) to methine hydrogen substituted by an oxygen atom at the 4-site on the cyclohexane ring in the repeating structural unit represented by the formula (1-B-3).

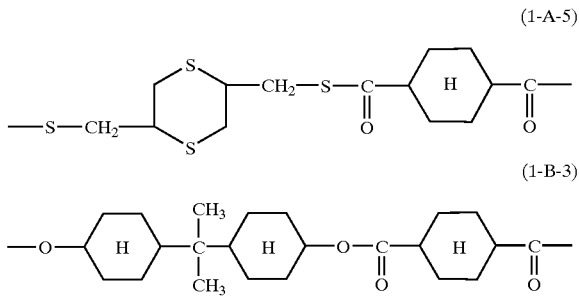

Physical properties of the poly(thio)ester copolymer thus prepared were determined by the procedures described above. It had a glass transition temperature (Tg) of 132° C. It started to flow at 240° C., and had a melt viscosity of 1,200 Pa·s (12,000 poise) at 260° C., a relatively high refractive index (nd) of 1.577, a high Abbe number (vd) of 46 and a lower birefringence than a common polycarbonate.

EXAMPLE 23

A poly(thio)ester copolymer was prepared in the same manner as in EXAMPLE 22, except that quantity of 2,5-bis(mercaptomethyl)-1,4-dithian was increased from 15.93 g (0.075 mol) to 19.12 g (0.09 mol) and that of 2,2-bis(4-hydroxycyclohexyl)propane was decreased from 18.03 g (0.075 mol) to 14.42 g (0.06 mol).

The poly(thio)ester copolymer had a GPC-determined weight-average molecular weight of 60,000 as that of the standard polystyrene, and contained the repeating structural units represented by the formulae (1-A-5) and (1-B-3) in a molar ratio of 60:40, determined from the $^1$H-NMR analysis results.

Physical properties of the poly(thio)ester copolymer thus prepared were determined by the procedures described above. It had a glass transition temperature (Tg) of 125° C. It started to flow at 210° C., and had a melt viscosity of 1,050 Pa·s (10,500 poise) at 250° C., a high refractive index (nd) of 1.586, a high Abbe number (vd) of 41 and a very low birefringence.

EXAMPLE 24

Production of a Molding Material for Optical Components, Composed of the poly(thio)ester Copolymer Prepared in Example 22

100 parts of the poly(thio)ester copolymer prepared in EXAMPLE 22, 0.1 part by weight of tris(2,4-di-tert-butylphenyl)phosphite and 0.1 part by weight of pentaerythritylyl[3-(3,5-di-tert-butyl-4-hydroxyphenyl)-propionate were mixed by a Henschel mixer, and the mixture was pelletized by a single-screw extruder (65 mm), where it was molten/kneaded and extruded at 220° C. as cylinder temperature while the gases were purged from the system, to prepare a colorless, transparent molding material (resin composition) for optical components.

EXAMPLE 25

Production of an Optical Component of the Present Invention

The molding material (resin composition) for optical components, prepared in EXAMPLE 24, was injection-molded into a lens-shaped article, where the pelletized composition was dried under reduced pressure at 100° C. for 24 hours, and injection-molded under the conditions of molding temperature: 250° C. and mold temperature: 80° C. into a colorless plus lens-shaped article (convex lens, diameter: 75 mm, central thickness: 4.2 mm, peripheral thickness: 1.0 mm, +2.00D). The lens-shaped article showed neither striae nor distortion, when observed while put between polarizing plates, and was low in birefringence and optically uniform. It is therefore confirmed that the molding material (resin composition) of the present invention can be suitably molded into an optically uniform shape at a lower temperature (250° C.) than a common polycarbonate. The plastic lens of the present invention thus prepared showed good characteristics for practical purposes, e.g., transparency, mechanical characteristics (e.g., impact resistance, tensile strength and bending strength), thermal characteristics (e.g., thermal deformation temperature) and light resistance.

EXAMPLE 26

Production of the Polyester Polymer of the Present Invention, and Measurement of its Properties A 2-L (net volume) flask equipped with a stirrer, reflux condenser and thermometer was charged with 155.1 g (0.73 mol) of 2,5-bis(mercaptomethyl)-1,4-dithian, 84.8 g (0.73 mol) of 1,4-cyclohexanediol and 440 g of o-dichlorobenzene, and the mixture was stirred at 80° C. under nitrogen atmosphere to dissolve the dithian, to which 302.3 g (1.446 mols) of 1,4-cyclohexanedicarboxylic acid chloride was added dropwise at 80 to 105° C. in 75 minutes. The reaction was allowed to proceed at 105° C. for 4 hours, while hydrogen chloride formed as a by-product was purged in a flow of nitrogen from the reaction system. When weight-average molecular weight of the polymer reached 47,000, 350 g of o-dichlorobenzene was added, and the reaction was allowed to proceed continuously at 140° C. for 5 hours. Then, 370 g of o-dichlorobenzene was added, and the reaction was allowed to proceed further at 160° C. for 2 hours. The product polymer had a GPC-determined weight-average molecular weight of 75,000. Then, 3.5 g (0.0248 mol) of benzoic acid chloride as a molecular weight adjustor (terminal terminator) were added thereto, and the reaction was allowed to proceed at the same temperature for 1 hour. The reaction solution was left to stand to be cooled to room temperature, and dissolved in 3,000 g of chloroform which was added to the solution. The resultant solution was divided into two portions, and each portion was added dropwise to a poor solvent (methanol) in a 10-L homogenizer, to separate the polymer. The polymer was collected by filtration and dried under reduced pressure at 80° C. for 20 hours, to obtain 434.2 g of the target poly(thio)ester copolymer product as the white, powdery solid in a yield of 99%.

The 1% by weight deuterized chloroform solution of the poly(thio)ester copolymer was analyzed by $^1$H-NMR (400 MHz). The results are shown below.

$^1$H-NMR δ (CDCl$_3$): 1.20 to 2.05 (m, 20H), 2.25 to 3.10 (m, 14H), 3.15 to 3.30 (m, 4H), 4.70 to 4.90 (br, 2H)

The $^1$H-NMR analysis results confirmed that the molar ratio of the repeating structural unit represented by the formula (1-A-5) to that represented by the formula (1-B-4) is 50:50 by finding the integral ratio of hydrogen (3.15 to 3.30 ppm) in the thiomethylene group bonded to the 2- and 5-site in the 1,4-dithan ring in the repeating structural unit represented by the formula (1-A-5) to methine hydrogen (4.70 to 4.90 ppm) at the 1- and 4-site on the cyclohexane ring in the repeating structural unit represented by the formula (1-B-4).

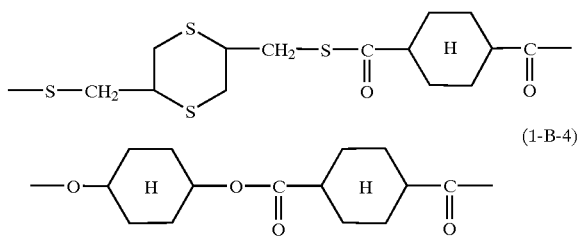

Physical properties of the poly(thio)ester copolymer thus prepared were determined by the procedures described above. It had a glass transition temperature (Tg) of 106° C. It started to flow at 215° C., and had a melt viscosity of 900 Pa·s (9,000 poise) at 260° C., a refractive index (nd) of 1.591, an Abbe number (vd) of 44, each of which was higher than that of a common polycarbonate, and a lower birefringence than a common polycarbonate.

EXAMPLE 27

A poly(thio)ester copolymer was prepared in the same manner as in EXAMPLE 26, except that quantity of 2,5-bis(mercaptomethyl)-1,4-dithian was decreased from 155.1 g (0.73 mol) to 123.2 g (0.58 mol) and that of 1,4-cyclohexanediol was increased from 84.8 g (0.73 mol) to 102.2 g (0.88 mol).

The poly(thio)ester copolymer had a GPC-determined weight-average molecular weight of 66,000 as that of the standard polystyrene, and contained the repeating structural units represented by the formulae (1-A-5) and (1-B-4) in a molar ratio of 40:60, determined from the $^1$H-NMR analysis results.

Physical properties of the poly(thio)ester copolymer of the present invention thus prepared were determined by the procedures described above. It had a glass transition temperature (Tg) of 116° C. It started to flow at 190° C., and had a melt viscosity of 690 Pa·s (6,900 poise) at 250° C., a high refractive index (nd) of 1.580, a high Abbe number (vd) of 47, and a lower birefringence than a common polycarbonate.

EXAMPLE 28

Production of a Molding Material for Optical Components, Composed of the poly(thio)ester Copolymer Prepared in Example 1

100 parts by weight of the poly(thio)ester copolymer prepared in EXAMPLE 26, 0.1 part by weight of tris(2,4-di-tert-butylphenyl)phosphite and 0.1 part by weight of pentaerythritylyl[3-(3,5-di-tert-butyl-4-hydroxyphenyl)propionate were mixed by a Henschel mixer, and the mixture was pelletized by a single-screw extruder (65 mm), where it was molten/kneaded and extruded at 215° C. as cylinder temperature while the gases were purged from the system, to prepare a colorless, transparent molding material (resin composition) for optical components.

EXAMPLE 29

Production of an Optical Component of the Present Invention

The molding material (resin composition) for optical components, prepared in EXAMPLE 28, was injection-molded into a lens-shaped article, where the pelletized composition was dried under reduced pressure at 100° C. for 24 hours, and injection-molded under the conditions of molding temperature: 250° C. and mold temperature: 80° C. into a colorless plus lens-shaped article (convex lens, diameter: 75 mm, central thickness: 4.2 mm, peripheral thickness: 1.0 mm, +2.00D). The lens-shaped article showed neither striae nor distortion, when observed while put between polarizing plates, and was low in birefringence and optically uniform. It is therefore confirmed that the molding material (resin composition) of the present invention can be suitably molded into an optically uniform shape at a lower temperature (250° C.) than a common polycarbonate. The plastic lens of the present invention thus prepared showed good characteristics for practical purposes, e.g., transparency, mechanical characteristics (e.g., impact resistance, tensile strength and bending strength), thermal characteristics (e.g., thermal deformation temperature) and light resistance.

EXAMPLE 30

Production of the Polyester Polymer of the Present Invention, and Measurement of its Properties A 2-L (net volume) flask equipped with a stirrer, reflux condenser and thermometer was charged with 107.3 g (0.505 mol) of 2,5-bis(mercaptomethyl)-1,4-dithian, 121.4 g (0.505 mol) of 2,2-bis(4-hydroxycyclohexyl)propane and 200 g of o-dichlorobenzene, and the mixture was stirred at 80° C. under nitrogen atmosphere to dissolve the dithian, to which a solution of 209.0 g (1 mol) of terephthalic acid chloride dissolved in 100 g of o-dichlorobenzene was added dropwise at 95 to 100° C. in 1 hour. The reaction was allowed to proceed at 150° C. for 3 hours, while hydrogen chloride formed as a by-product was purged in a flow of nitrogen from the reaction system. When weight-average molecular weight of the polymer reached 2.6×10$^4$, 200 g of o-dichlorobenzene was added, and the reaction was allowed to proceed continuously at 160° C. for 5 hours. Then, 200 g of o-dichlorobenzene was added, and the reaction was allowed to proceed further at 160° C. for 2 hours. The product polymer had a GPC-determined weight-average molecular weight of 8.0×10$^4$. Then, 3.5 g (5% by mol) of benzoic acid chloride as a molecular weight adjustor (terminal terminator) were added thereto, and the reaction was allowed to proceed at the same temperature for 1 hour. The reaction solution was left to stand to be cooled to room temperature, and dissolved in 1,500 g of chloroform which was added to the solution. The resultant solution was added dropwise to a poor solvent (methanol) in a 8-L homogenizer, to separate the polymer. The polymer was collected by filtration and dried under reduced pressure at 80° C. for 20 hours, to obtain 373 g of the target poly(thio)ester copolymer product as the white, powdery solid in a yield of 97%. It had a GPC-determined weight-average molecular weight of 7.6×10⁴.

The 1% by weight deuterized chloroform solution of the poly(thio)ester copolymer was analyzed by ¹H-NMR (400 MHz). The results are shown below.

¹H-NMR δ (CDCl₃): 0.74 to 0.88 (m, 6H), to 3.22 (m, 24H), 3.41 to 3.54 (m, 4H), 4.92 to 5.32 (m, 2H), 7.15 to 8.72 (m, 8H)

The ¹H-NMR analysis results confirmed that the molar ratio of the repeating structural unit represented by the formula (1-A-7) to that represented by the formula (1-B-5) is 50:50 by finding the integral proton ratio of hydrogen in the thiomethyl group bonded to the 2- and 5-site in the 1,4-dithan ring in the repeating structural unit represented by the formula (1-A-7) to methine hydrogen substituted by an oxygen atom at the 4-site on the cyclohexane ring in the repeating structural unit represented by the formula (1-B-5).

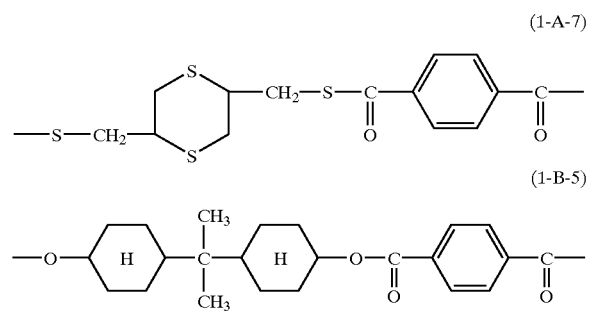

Physical properties of the poly(thio)ester copolymer thus prepared were determined by the procedures described above. It had a glass transition temperature (Tg) of 170° C. It started to flow at 230° C., and had a melt viscosity of 1,250 Pa·s (12,500 poise) at 270° C., a relatively high refractive index (nd) of 1.613, a high Abbe number (vd) of 36 and a lower birefringence than a common polycarbonate.

EXAMPLE 31

A poly(thio)ester copolymer of the present invention as a target white powdery solid was prepared in the same manner as in EXAMPLE 30, except that 209.0 g (1 mol) of terephthalic acid chloride was replaced by 209.0 g (1 mol) of isophthalic acid chloride. This produced 377 g of the target compound in a yield of 98%. It had a GPC-determined weight-average molecular weight of 70,000 as that of the standard polystyrene, and contained the repeating structural units represented by the formulae (1-A-8) and (1-B-6) in a molar ratio of 50:50, determined from the ¹H-NMR analysis results.

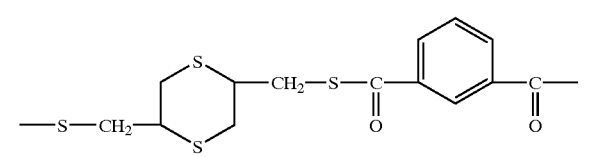

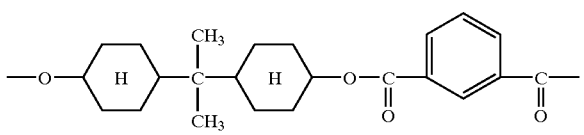

Physical properties of the poly(thio)ester copolymer thus prepared were determined by the procedures described above. It had a glass transition temperature (Tg) of 124° C. It started to flow at 170° C., and had a melt viscosity of 1,150 Pa·s (11,500 poise) at 260° C., a high refractive index (nd) of 1.609, a high Abbe number (vd) of 36 and a lower birefringence than a common polycarbonate.

EXAMPLE 32

Production of a Molding Material for Optical Components, Composed of the poly(thio)ester Copolymer Prepared in Example 30

100 parts by weight of the poly(thio)ester copolymer prepared in EXAMPLE 30, 0.1 part by weight of tris(2,4-di-tert-butylphenyl)phosphite and 0.1 part by weight of pentaerythritylyl[3-(3,5-di-tert-butyl-4-hydroxyphenyl)propionate were mixed by a Henschel mixer, and the mixture was pelletized by a single-screw extruder (65 mm), where it was molten/kneaded and extruded at 220° C. as cylinder temperature while the gases were purged from the system, to prepare a colorless, transparent molding material (resin composition) for optical components.

EXAMPLE 33

Production of an Optical Component of the Present Invention

The molding material (resin composition) for optical components, prepared in EXAMPLE 32, was injection-molded into a lens-shaped article, where the pelletized composition was dried under reduced pressure at 100° C. for 24 hours, and injection-molded under the conditions of molding temperature: 250° C. and mold temperature: 80° C. into a colorless plus lens-shaped article (convex lens, diameter: 75 mm, central thickness: 4.2 mm, peripheral thickness: 1.0 mm, +2.00D). The lens-shaped article showed neither striae nor distortion, when observed while put between polarizing plates, and was low in birefringence and optically uniform. It is therefore confirmed that the material (resin composition) of the present invention can be suitably molded into an optically uniform shape at a lower temperature (250° C.) than a common polycarbonate. The plastic lens of the present invention thus prepared showed good characteristics for practical purposes, e.g., transparency, mechanical characteristics (e.g., impact resistance, tensile strength and bending strength), thermal characteristics (e.g., thermal deformation temperature) and light resistance.

EXAMPLE 34

Production of the Polyester Polymer of the Present Invention, and Measurement of its Properties A 2-L (net volume) flask equipped with a stirrer, reflux condenser and thermometer was charged with 155.1 g (0.73 mol) of 2,5-bis(mercaptomethyl)-1,4-dithian, 84.8 g (0.73 mol) of 1,4-cyclohexanediol and 440 g of o-dichlorobenzene, and the mixture was stirred at 80° C. under nitrogen atmosphere to dissolve the dithian, to which 293.57 g (1.446 mols) of terephthalic acid chloride represented by the formula (3-1) was added dropwise at 95 to 100° C. in 90 minutes. The reaction was allowed to proceed at 105° C. for 3 hours, while hydrogen chloride formed as a by-product was purged in a flow of nitrogen from the reaction system. When weight-average molecular weight of the polymer reached $4.1 \times 10^4$, 30 g of o-dichlorobenzene was added, and the reaction was allowed to proceed continuously at 140° C. for 5 hours. Then, 40 g of o-dichlorobenzene was added, and the reaction was allowed to proceed further at 160° C. for 2 hours. The product polymer had a GPC-determined weight-average molecular weight of $7.8 \times 10^4$. Then, 3.5 g (0.0248 mol) of benzoic acid chloride as a molecular weight adjustor (terminal terminator) were added thereto, and the reaction was allowed to proceed at the same temperature for 1 hour. The reaction solution was left to stand to be cooled to room temperature, and dissolved in 3,000 g of chloroform which was added to the solution. The resultant solution was divided into two portions, and each portion was added dropwise to a poor solvent (methanol) in a 10-L homogenizer, to separate the polymer. The polymer was collected by filtration and dried under reduced pressure at 80° C. for 20 hours, to obtain 417.2 g of the target poly(thio)ester copolymer product as the white, powdery solid in a yield of 98%. It had a GPC-determined weight-average molecular weight of $7.9 \times 10^4$.

The 1% by weight deuterized chloroform solution of the poly(thio)ester copolymer was analyzed by $^1$H-NMR (400 MHz). The results are shown below.

$^1$H-NMR δ (CDCl$_3$): 1.62 to 2.22 (m, 8H), 2.86 to 3.38 (m, 6H), 3.41 to 3.54 (m, 4H), 5.20 (s, 2H), 7.18 to 8.76 (m, 8H)

The $^1$H-NMR analysis results confirmed that the molar ratio of the repeating structural unit represented by the formula (1-A-7) to that represented by the formula (1-B-7) is 50:50 by finding the integral proton ratio of hydrogen in the thiomethyl group bonded to the 2- and 5-site in the 1,4-dithan ring in the repeating structural unit represented by the formula (1-A-7) to methine hydrogen substituted by an oxygen atom at the 4-site on the cyclohexane ring in the repeating structural unit represented by the formula (1-B-7).

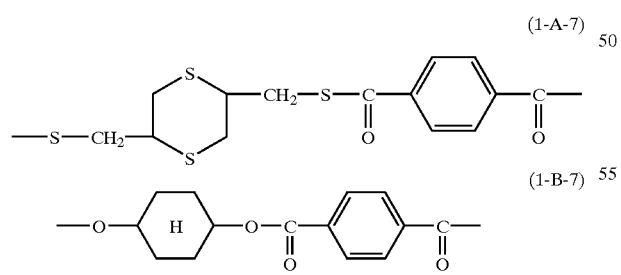

Physical properties of the poly(thio)ester copolymer thus prepared were determined by the procedures described above. It had a glass transition temperature (Tg) of 150° C. It started to flow at 240° C., and had a melt viscosity of 1,200 Pa·s (12,000 poise) at 260° C., a relatively high refractive index (nd) of 1.640, a high Abbe number (vd) of 33 and a lower birefringence than a common polycarbonate.

EXAMPLE 35

A poly(thio)ester copolymer was prepared in the same manner as in EXAMPLE 34, except that 293.57 g (1.446 mols) of terephthalic acid chloride was replaced by 293.57 g (1.446 mols) of isophthalic acid chloride.

It had a GPC-determined weight-average molecular weight of 60,000 as that of the standard polystyrene, and contained the repeating structural units represented by the formulae (1-A-8) and (1-B-8) in a molar ratio of 50:50, determined from the $^1$H-NMR analysis results.

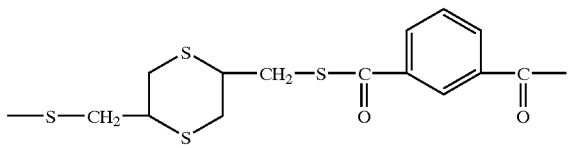

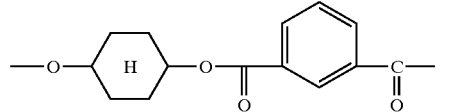

Physical properties of the poly(thio)ester copolymer thus prepared were determined by the procedures described above. It had a glass transition temperature (Tg) of 117° C. It started to flow at 215° C., and had a melt viscosity of 1,050 Pa·s (10,500 poise) at 250° C., a high refractive index (nd) of 1.639, a high Abbe number (vd) of 33 and a lower birefringence than a common polycarbonate.

EXAMPLE 36

Production of a Molding Material for Optical Components, Composed of the poly(thio)ester Copolymer Prepared in Example 34

100 parts by weight of the poly.(thio)ester copolymer prepared in EXAMPLE 34, 0.1 part by weight of tris(2,4-di-tert-butylphenyl)phosphite and 0.1 part by weight of pentaerythritylyl[3-(3,5-di-tert-butyl-4-hydroxyphenyl)propionate were mixed by a Henschel mixer, and the mixture was pelletized by a single-screw extruder (65 mm), where it was molten/kneaded and extruded at 220° C. as cylinder temperature while the gases were purged from the system, to prepare a colorless, transparent molding material (resin composition) for optical components.

EXAMPLE 37

Production of an Optical Component of the Present Invention

The molding material (resin composition) for optical components, prepared in EXAMPLE 36, was injection-molded into a lens-shaped article, where the pelletized composition was dried under reduced pressure at 100° C. for 24 hours, and injection-molded under the conditions of molding temperature: 250° C. and mold temperature: 80° C. into a colorless plus lens-shaped article (convex lens, diameter: 75 mm, central thickness: 4.2 mm, peripheral thickness: 1.0 mm, +2.00D). The lens-shaped article showed neither striae nor distortion, when observed while put between polarizing plates, and was low in birefringence and optically uniform. It is therefore confirmed that the molding material (resin composition) of the present invention can be suitably molded into an optically uniform shape at a lower temperature (250° C.) than a common polycarbonate. The plastic lens of the present invention thus prepared showed good characteristics for practical purposes such as transparency, mechanical characteristics and weather resistances (e.g., thermal resistance, moisture resistance and light resistance).

Production of poly(thio)ester copolymers
(Three-Component)

EXAMPLE 38

Production of the Polyester Polymer of the Present Invention, and Measurement of its Properties A 2-L (net volume) flask equipped with a stirrer, reflux condenser and thermometer was charged with 84.9 g (0.40 mol) of 2,5-bis(mercaptomethyl)-1,4-dithian, 58.1 g (0.50 mol) of 1,4-cyclohexanediol, 29.0 g (0.10 mol) of 1,1-bis (4'-hydroxyphenyl)-1-phenylethane and 280 g of a xylene mixture, and the mixture was stirred at 90° C. under nitrogen atmosphere to dissolve the contents, to which 223.3 g (1.01 mols) of norbornanedicarboxylic acid chloride (isomers mixture) represented by the formula (3-1) was added dropwise at 90 to 95° C. in 75 minutes. The reaction was allowed to proceed at 130° C. for 6 hours, while hydrogen chloride formed as a by-product was purged in a flow of nitrogen from the reaction system. The resultant polymer had a GPC-determined weight-average molecular weight of $8.8 \times 10^4$. Then, 4.5 g (0.03 mol; 3% by mol on the total dihydroxy compounds) of p-tert-butyl phenol as a molecular weight adjustor (terminal terminator) were added thereto, and the reaction was allowed to proceed at 100° C. for 1 hour. The reaction solution was left to stand to be cooled to room temperature, and dissolved in 2,000 g of a xylene mixture which was added to the solution. The resultant solution was divided into two portions, and each portion was added dropwise to 3,500 g of methanol in a 10-L homogenizer, to separate the solid polymer in the form of fine particles. This produced 315.0 g of the target poly(thio)ester copolymer as the white, powdery solid in a yield of 98%. It had a GPC-determined weight-average molecular weight of $8.7 \times 10^4$.

The 1% by weight deuterized chloroform solution of the poly(thio)ester copolymer was analyzed by $^1$H-NMR (400 MHz). The $^1$H-NMR analysis results confirmed that the poly(thio)ester copolymer had the repeating structural units represented by the formulae (1-A-3), (1-B-1) and (1-C-1) in a molar ratio of 40:50:10.

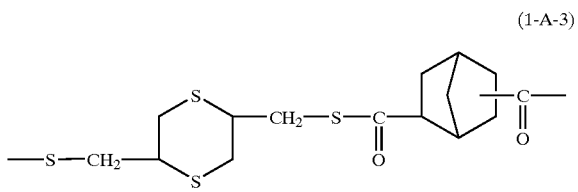

(1-A-3)

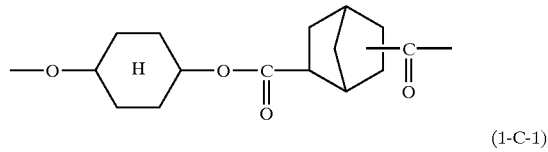

(1-B-1)

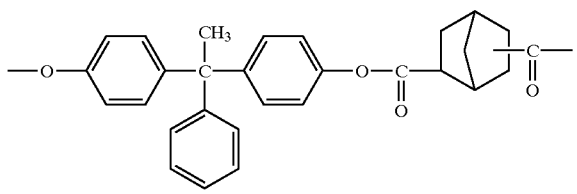

(1-C-1)

Physical properties of the poly(thio)ester copolymer thus prepared were determined by the procedures described above. It had a glass transition temperature (Tg) of 136° C. It started to flow at 205° C., and had a melt viscosity of $6.3 \times 10^3$ Pa·s ($6.3 \times 10^4$ poise) at 240° C., a relatively high refractive index (nd) of 1.578, an Abbe number (vd) of 41.6, each of which was higher than that of a common polycarbonate, and a lower birefringence than a common polycarbonate.

EXAMPLE 39

A poly(thio)ester copolymer was prepared in the same manner as in EXAMPLE 38, except that 29.0 g (0.10 mol) of 1,1-bis(4'-hydroxyphenyl)-1-phenylethane was replaced by 22.8 g (0.10 mol) of 2,2-bis(4'-hydroxyphenyl)propane. It had a GPC-determined weight-average molecular weight of $8.0 \times 10^4$ as that of the standard polystyrene, and contained the repeating structural units represented by the formulae (1-A-3), (1-B-1) and (1-C-2) in a molar ratio of 40:50:10, determined from the $^1$H-NMR analysis results.

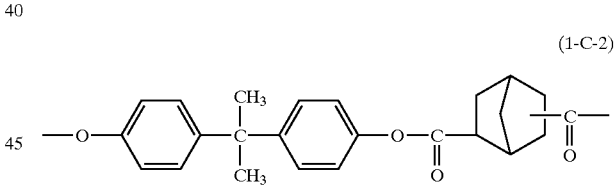

(1-C-2)

Physical properties of the poly(thio)ester copolymer thus prepared were determined by the procedures described above. It had a glass transition temperature (Tg) of 126° C. It started to flow at 200° C., and had a melt viscosity of $1.8 \times 10^4$ Pa·s ($1.8 \times 10^5$ poise) at 230° C., a refractive index (nd) of 1.570, an Abbe number (vd) of 45.3 and a very low birefringence.

EXAMPLE 40

The poly(thio)ester copolymer was prepared in the same manner as in EXAMPLE 38, except that 29.0 g (0.10 mol) of 1,1-bis(4'-hydroxyphenyl)-1-phenylethane was replaced by 34.6 g (0.10 mol) of α,α,α',α'-tetramethyl-α,α'-bis(4-hydroxyphenyl)-p-xylene. It had a GPC-determined weight-average molecular weight of $7.8 \times 10^4$ as that of the standard polystyrene, and contained the repeating structural units represented by the formulae (1-A-3), (1-B-1) and (1-C-3) in a molar ratio of 40:50:10, determined from the $^1$H-NMR analysis results.

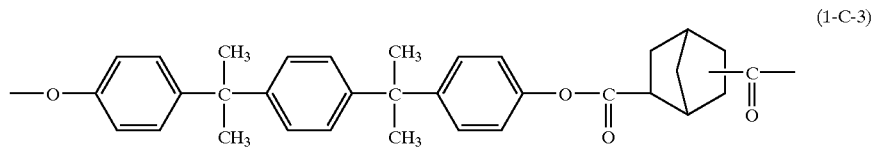

(1-C-3)

Physical properties of the poly(thio)ester copolymer thus prepared were determined by the procedures described above. It had a glass transition temperature (Tg) of 138° C., a refractive index (nd) of 1.572, an Abbe number (vd) of 45.3 and a very low birefringence.

EXAMPLE 41

Production of a Molding Material for Optical Components, Composed of the poly(thio)ester copolymer Prepared in Example 38

100 parts by weight of the poly(thio)ester copolymer prepared in EXAMPLE 38, 0.2 part by weight of tris(2,4-di-tert-butylphenyl)phosphite (trade name: "IRGAFOS 618", manufactured by Ciba Specialty Chemicals) and 0.2 part by weight of octadecyl-3-(3,5-di-tert-butyl-4-hydroxyphenyl)propionate (trade name: "IRGANOX 1076", manufactured by Ciba Specialty Chemicals) were mixed by a Henschel mixer, and the mixture was pelletized by a single-screw extruder (65 mm), where it was molten/kneaded and extruded at 220° C. as cylinder temperature while the gases were purged from the system, to prepare a colorless, transparent molding material (resin composition) for optical components.

EXAMPLE 42

Production of an Optical Component of the Present Invention

The molding material (resin composition) for optical components, prepared in EXAMPLE 41, was injection-molded into a lens-shaped article, where the pelletized composition was dried under reduced pressure at 80° C. for 24 hours, and injection-molded under the conditions of molding temperature: 230° C. and mold temperature: 110° C. into a colorless plus lens-shaped article (convex lens, diameter: 75 mm, central thickness: 4.2 mm, peripheral thickness: 1.0 mm, +2.00D). The lens-shaped article showed neither striae nor distortion, when observed while put between polarizing plates, and was low in birefringence and optically uniform. It is therefore confirmed that the molding material (resin composition) of the present invention can be suitably molded into an optically uniform shape at a relatively low temperature (230° C.). The plastic lens of the present invention thus prepared showed good characteristics, e.g., transparency, mechanical characteristics (e.g., impact resistance, tensile strength and bending strength), thermal characteristics (e.g., thermal deformation temperature) and light resistance.

COMPARATIVE EXAMPLE 1

Measurement of Properties of a Known Polymethylmethacrylate, and Production of an Optical Component thereof Physical properties of a known polymethyl-methacrylate (common optical component grade) were determined by the procedures described above. It had a glass transition temperature (Tg) of 111° C., a refractive index (nd) of 1.487, an Abbe number (vd) of 54 and a birefringence of $1 \times 10^{-4}$ or less.

COMPARATIVE EXAMPLE 2

Measurement of Properties of a Known Polycarbonate

Physical properties of a known polycarbonate (optical disk grade) were determined by the procedures described above. It had a glass transition temperature (Tg) of 130° C., a refractive index (nd) of 1.580, an Abbe number (vd) of 30 and a high birefringence of $70 \times 10^{-4}$ or less.

Possibility of Industrial Utilization

According to the present invention, the optical component obtained by molding the poly(thio)ester (co)polymer shows better characteristics, e.g., transparency, mechanical characteristics (e.g., impact resistance) and thermal characteristics, and a higher refractive index, a lower chromatic aberration (higher Abbe number) and a lower birefringence than those of a variety of known optical resins. The poly(thio)ester (co)polymer of the present invention has good melt fluidity and moldability. Accordingly, it is useful as a molding material for a variety of optical components, e.g., those for plastic optical lenses represented by vision-correcting eyeglass lenses (spectacles lenses), pickup lenses, and optical lenses for photographing devices and copiers.

What is claimed is:

1. An optical component obtained by molding a poly(thio) ester (co)polymer comprising a repeating structural unit represented by the formula (1-A) as an essential structural unit:

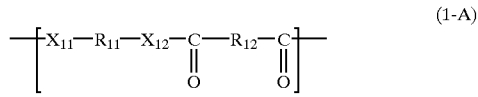

(1-A)

wherein $R_{11}$ is a cyclic alkylene group, straight-chain or cyclic alkylene group containing at least one sulfur atom in a sulfide group, or a combination of the straight-chain and cyclic alkylene groups; $R_{12}$ is a mono- or poly-cyclic aliphatic dicarboxylic acid residue; and $X_{11}$ and $X_{12}$ are each independently an oxygen atom or sulfur atom, and when $X_{11}$ and $X_{12}$ are the oxygen atoms, $R_{11}$ is a straight-chain or cyclic alkylene group containing at least one sulfur atom in the sulfide group, or a combination of the straight-chain and cyclic alkylene groups.

2. The optical component according to claim 1, wherein $R_{12}$ in the formula (1-A) is represented by one of the following formulae:

3. The optical component according to claim 1, wherein $R_{11}$ in the formula (1-A) is a straight-chain or cyclic alkylene group containing at least one sulfur atom in the sulfide group, or a combination of the straight-chain and cyclic alkylene groups.

4. The optical component according to claim 3, wherein $R_{11}$ in the formula (1-A) is represented by one of the following formulae:

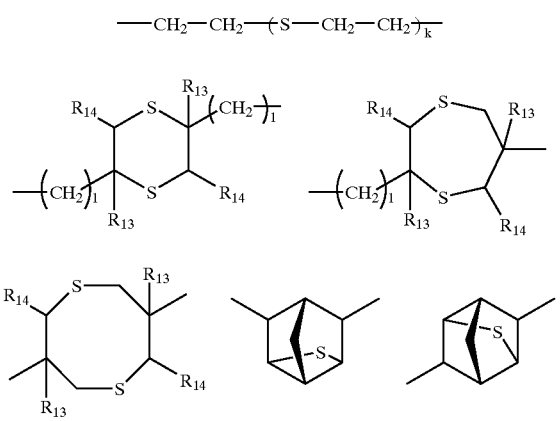

(wherein "k" is an integer of 1 to 4; "I" is an integer of 0 to 3; and $R_{13}$ and $R_{14}$ are each a hydrogen atom or alkyl group).

5. The optical component according to claim 4, wherein $R_{12}$ in the formula (1-A) is represented by one of the following formulae:

and $R_{11}$ is represented by one of the following formulae:

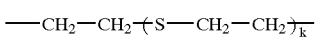

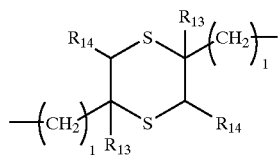

(wherein "k" is an integer of 1 to 4; "I" is an integer of 0 to 3; $R_{13}$ and $R_{14}$ are each a hydrogen atom or alkyl group; and $X_{11}$ and $X_{12}$ are each a sulfur atom).

6. An optical component obtained by molding a poly(thio) ester (co)nolvmer comprising a repeating structural unit represented by the formula (1-A) as an essential structural unit:

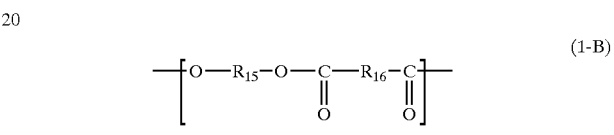

(wherein $R_{11}$ is a cyclic alkylene group, straight-chain or cyclic alkylene group containing at least one sulfur atom in a sulfide group, or a combination of the straght-chain and cyclic alkylene groups; $R_{12}$ is a mono- or poly-cyclic aliphatic or aromatic dicarboxylic acid residue; and $X_{11}$ and $X_{12}$ are each independently an oxygen atom or sulfur atom, and when $X_{11}$ and $X_{12}$ are the oxygen atoms, $R_{11}$ is a straight-chain or cyclic alkylene group containing at least one sulfur atom in the sulfide group, or a combination of the straight-chain and cyclic alkylene groups) and a repeating structural unit represented by the formula (1-B):

$$\left[\text{O}-R_{15}-\text{O}-\underset{\underset{\text{O}}{\|}}{\text{C}}-R_{16}-\underset{\underset{\text{O}}{\|}}{\text{C}}\right] \quad (1\text{-B})$$

(wherein $R_{15}$ is a divalent alicyclic hydrocarbon group; and $R_{16}$ is an alicyclic or aromatic dicarboxylic acid residue).

7. A poly(thio)ester (co)polymer comprising a repeating structural unit represented by the formula (1-A) as an essential structural unit:

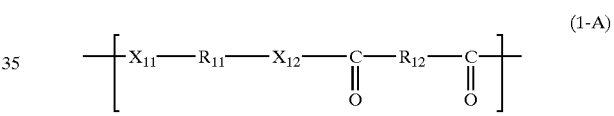

wherein $R_{11}$ is a cyclic alkylene group, straight-chain or cyclic alkylene group containing at least one sulfur atom in a sulfide group, or a combination of the straight-chain and cyclic alkylene groups; $R_{12}$ is a mono- or poly-cyclic aliphatic dicarboxylic acid residue; and $X_{11}$ and $X_{12}$ are each independently an oxygen atom or sulfur atom, and when $X_{11}$ and $X_{12}$ are the oxygen atoms, $R_{11}$ is a straight-chain or cyclic alkylene group containing at least one sulfur atom in the sulfide group, or a combination of the straight-chain and cyclic alkylene groups.

8. The poly(thio)ester (co)polymer according to claim 7, wherein $R_{12}$ in the formula (1-A) is represented by one of the following formulae:

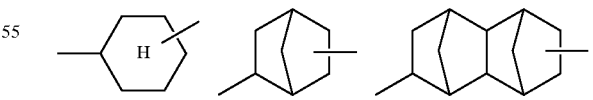

9. The poly(thio)ester (co)pelymers copolymer according to claim 7, wherein $R_{11}$ in the formula (1-A) is a straight-chain or cyclic alkylene group containing at least one sulfur atom in the sulfide group, or a combination of the straight-chain and cyclic alkylene groups.

10. The poly(thio)ester (co)polymer according to claim 9, wherein $R_{11}$ in the formula (1-A) is represented by one of the following formulae:

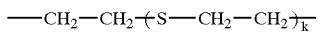

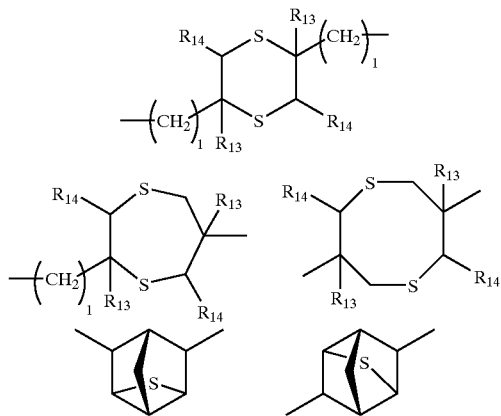

(wherein "k" is an integer of 1 to 4; "I" is an integer of 0 to 3; and $R_{13}$ and $R_{14}$ are each a hydrogen atom or alkyl group).

11. The poly(thio)ester (co)polymer according to claim 10, wherein $R_{12}$ in the formula (1-A) is represented by one of the following formulae:

and $R_{11}$ is represented by one of the following formulae:

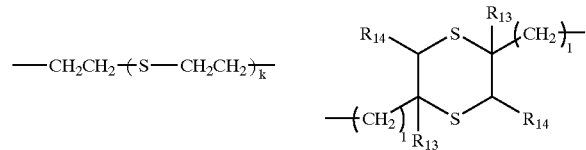

(wherein "k" is an integer of 1 to 4; "I" is an integer of 0 to 3; $R_{13}$ and $R_{14}$ are each a hydrogen atom or alkyl group); and $X_{11}$ and $X_{12}$ are sulfur atoms.

12. A poly(thio)ester copolymer comprising a repeating structural unit represented by the formula (1-A) as an essential structural unit:

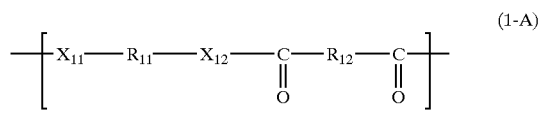

(wherein $R_{11}$ is a cyclic alkylene group, straight-chain or cyclic alkylene group containing at least one sulfur atom in a sulfide group, or a combination of the straight-chain and cyclic alkylene groups; $R_{12}$ is a mono- or poly-cyclic aliphatic or aromatic dicarboxylic acid residue; and $X_{11}$ and $X_{12}$ are each independently an oxygen atom or sulfur atom, and when $X_{11}$ and $X_{12}$ are the oxygen atoms, $R_{11}$ is a straight-chain or cyclic alkylene group containing at least one sulfur atom in the sulfide group, or a combination of the straight-chain and cyclic alkylene groups) and a repeating structural unit represented by the formula (1-B):

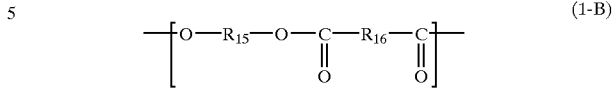

(wherein $R_{15}$ is a divalent alicyclic hydrocarbon group; and $R_{16}$ is an alicyclic or aromatic dicarboxylic acid residue).

13. The poly(thio)ester copolymer according to claim 12, wherein repeating structural units (1-A) and (1-B) are represented by the formulae (2-A) and (2-B), respectively:

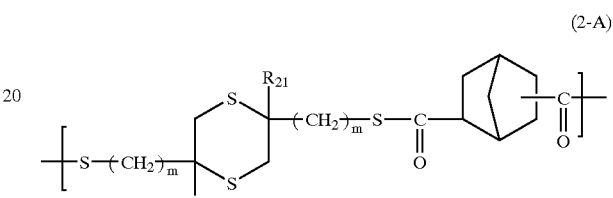

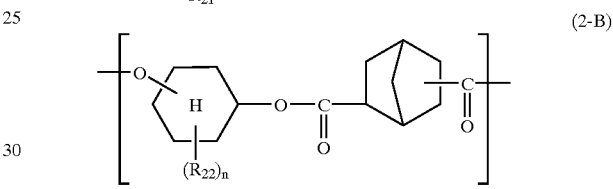

(wherein each $R_{21}$ is a hydrogen atom or alkyl group; each $R_{22}$ is independently an alkyl or alkoxy group, or a halogen atom; each "m" is an integer of 0 to 3; and each "n" is an integer of 0 to 4).

14. The poly(thio)ester copolymer according to claim 12, wherein repeating structural units (I-A) and (1-B) are represented by the formulae (2-A) and (3-B), respectively:

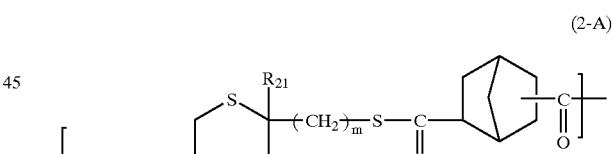

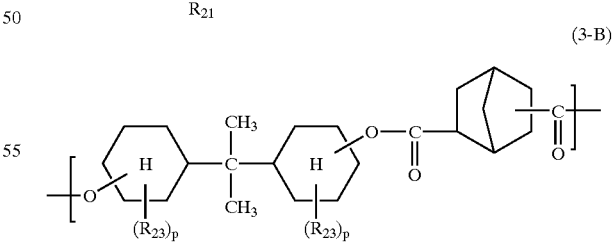

(wherein each $R_{21}$ is a hydrogen atom or alkyl group; each $R_{23}$ is independently an alkyl or alkoxy group, or a halogen atom; each "m" is an integer of 0 to 3; and each "p" is an integer of 0 to 4).

15. The poly(thio)ester copolymer according to claim 12, wherein repeating structural units (I-A) and (1-B) are represented by the formulae (3-A) and (4-B), respectively:

(3-A)

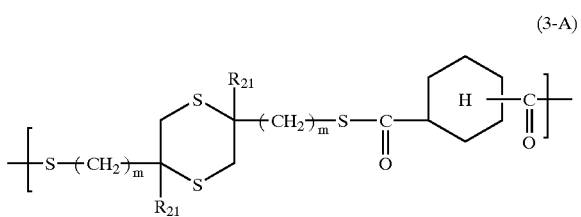

(4-B)

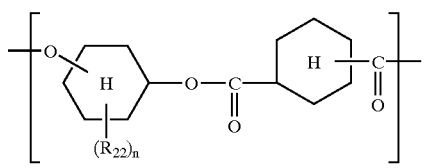

(wherein each $R_{21}$ is a hydrogen atom or alkyl group; each $R_{22}$ is independently an alkyl or alkoxy group, or a halogen atom; each "m" is an integer of 0 to 3; and each "n" is an integer of 0 to 4).

16. The poly(thio)ester copolymer according to claim 12, wherein repeating structural units (I-A) and (1-B) are represented by the formulae (3-A) and (5-B), respectively:

(3-A)

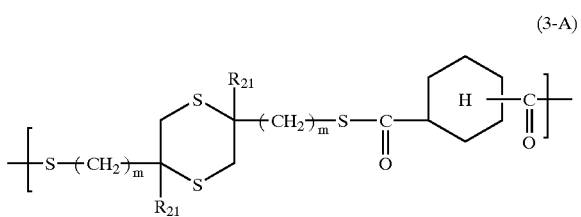

(5-B)

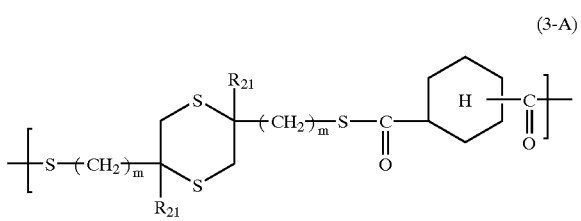

(wherein each $R_{21}$ is a hydrogen atom or alkyl group; each $R_{23}$ is independently an alkyl or alkoxy group, or a halogen atom; each "m" is an integer of 0 to 3; and each "p" is an integer of 0 to 4).

17. The poly(thio)ester copolymer according to claim 12, wherein repeating structural units (I-A) and (1-B) are represented by the formulae (4-A) and (6-B), respectively:

(4-A)

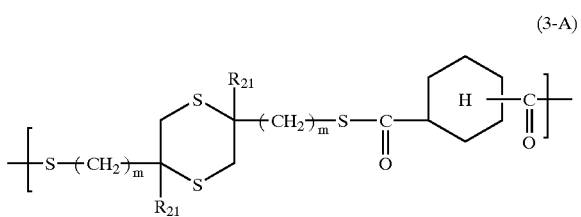

-continued (6-B)

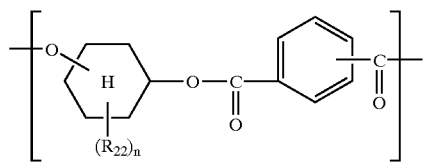

(wherein each $R_{21}$ is a hydrogen atom or alkyl group; each $R_{22}$ is independently an alkyl or alkoxy group, or a halogen atom; each "m" is an integer of 0 to 3; and each "n" is an integer of 0 to 4).

18. The poly(thio)ester copolymer according to claim 12, wherein repeating structural units (I-A) and (1-B) are represented by the formulae (4-A) and (7-B), respectively:

(4-A)

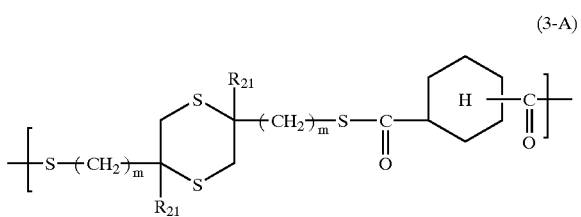

(7-B)

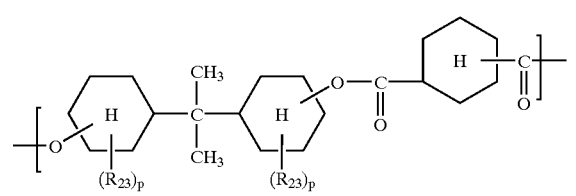

(wherein each $R_{21}$ is a hydrogen atom or alkyl group; each $R_{23}$ is independently an alkyl or alkoxy group, or a halogen atom; each "m" is an integer of 0 to 3; and each "p" is an integer of 0 to 4).

19. The poly(thio)ester copolymer according to claim 12, which further contains a repeating structural unit represented by the formula (1-C):

(1-C)

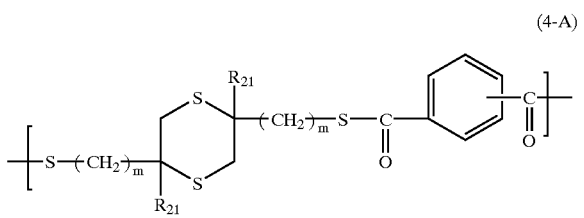

(wherein $R_{17}$ is a divalent aromatic hydrocarbon group; and $R_{18}$ is an alicyclic or aromatic dicarboxylic acid residue).

20. A resin composition comprising the poly(thio)ester copolymer according to claim 12.

21. The optical component according to claim 6, wherein $R_{12}$ in the formula (1-A) is a mono- or poly-cyclic aliphatic dicarboxylic acid residue.

22. The optical component according to claim 21, wherein $R_{12}$ in the formula (1-A) is represented by one of the following formulae:

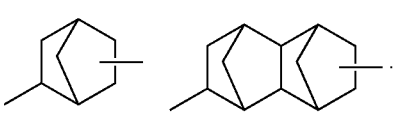

23. The optical component according to claim 6, wherein $R_{11}$ in the formula (1-A) is a straight-chain or cyclic alkylene group containing at least one sulfur atom in the sulfide group, or a combination of the straight-chain and cyclic alkylene groups.

24. The optical component according to claim 23, wherein $R_{11}$ in the formula (1-A) is represented by one of the following formulae:

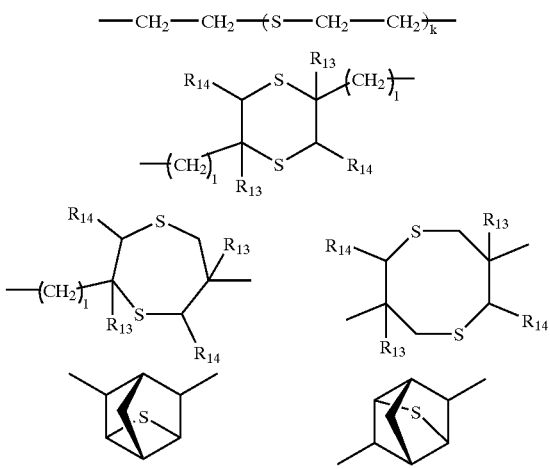

(wherein "k" is an integer of 1 to 4; "I" is an integer of 0 to 3; and $R_{13}$ and $R_{14}$ are each a hydrogen atom or alkyl group).

25. The optical component according to claim 24, wherein $R_{12}$ in the formula (1-A) is represented by one of the following formulae:

and $R_{11}$ is represented by one of the following formulae:

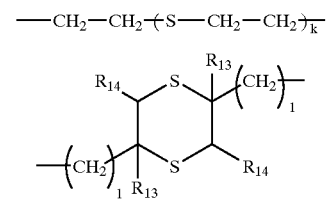

(wherein "k" is an integer of 1 to 4; "I" is an integer of 0 to 3; $R_{13}$ and $R_{14}$ are each hydrogen atom or alkyl group); and $X_{11}$ and $X_{12}$ are each a sulfur atom.

26. The optical component according to claim 6, wherein $R_{12}$ in the formula (1-A) is a group represented by the following formula

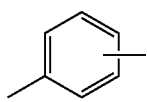

and $R_{11}$ is represented by one of the following formulae:

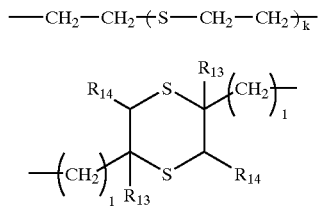

(wherein "k" is an integer of 1 to 4; "I" is an integer of 0 to 3; $R_{13}$ and $R_{14}$ are each hydrogen atom or alkyl group); and $X_{11}$ and $X_{12}$ are each a sulfur atom.

27. The poly(thio)ester copolymer according to claim 12, wherein $R_{12}$ in the formula (1-A) is a mono- or poly-cyclic aliphatic dicarboxylic acid residue.

28. The poly(thio)ester copolymer according to claim 27, wherein $R_{12}$ in the formula (1-A) is represented by one of the following formulae:

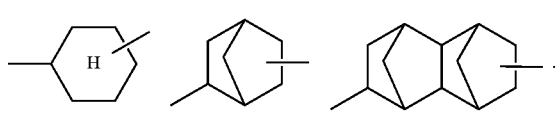

29. The poly(thio)ester copolymer according to claim 12, wherein $R_{11}$ in the formula (1-A) is a straight-chain or cyclic alkylene group containing at least one sulfur atom in the sulfide group, or a combination of the straight-chain and cyclic alkylene groups.

30. The poly(thio)ester copolymer according to claim 29, wherein $R_{11}$ in the formula (1-A) is represented by one of the following formulae:

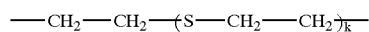

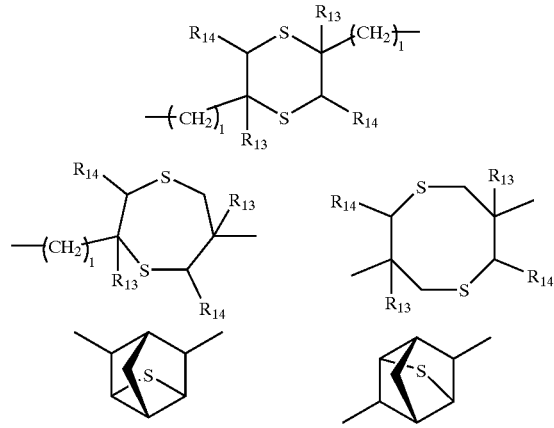

(wherein "k" is an integer of 1 to 4; "I" is an integer of 0 to 3; and $R_{13}$ and $R_{14}$ are each a hydrogen atom or alkyl group).

31. The poly(thio)ester copolymer according to claim 30, wherein $R_{12}$ in the formula (1-A) is represented by one of the following formulae:

and R$_{11}$ is represented by one of the following formulae:

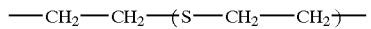

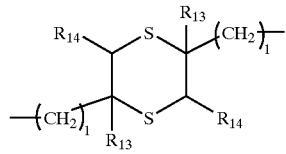

(wherein "k" is an integer of 1 to 4; "l" is an integer of 0 to 3; R$_{13}$ and R$_{14}$ are each hydrogen atom or alkyl group); and X$_{11}$ and X$_{12}$ are each a sulfur atom.

32. The poly(thio)ester copolymer according to claim 12, wherein R$_{12}$ in the formula (1-A) is a group represented by the following formula

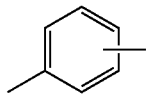

and R$_{11}$ is a group represented by one of the following formulae:

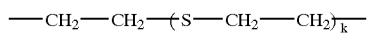

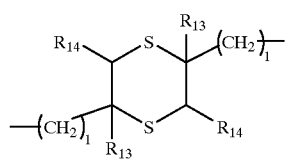

(wherein "k" is an integer of 1 to 4; "l" is an integer of 0 to 3; R$_{13}$ and R$_{14}$ are each a hydrogen atom or alkyl group); and X$_{11}$ and X$_{12}$ are each a sulfur atom.

33. An optical component obtained by molding a poly(thio)ester copolymer comprising a repeating structural unit represented by the formula (1-A) as an essential structural unit:

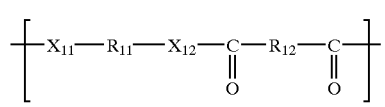

(1-A)

wherein R$_{11}$ is represented by one of the following formulae:

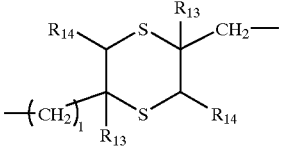

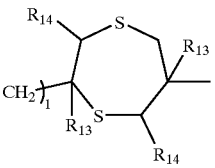 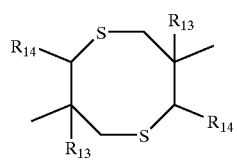

 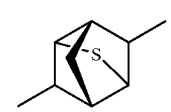

(wherein "k" is an integer of 1 to 4; "l" is an integer of 0 to 3; and R$_{13}$ and R$_{14}$ are each a hydrogen atom or alkyl group); R$_{12}$ is an aromatic dicarboxylic acid residue;

and X$_{11}$ and X$_{12}$ are each independently an oxygen atom or sulfur atom.

34. The optical component according to claim 33, wherein R$_{12}$ in the formula (1-A) is a group represented by the following formula:

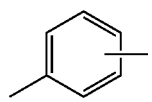

and R$_{11}$ is a group represented by the following formula:

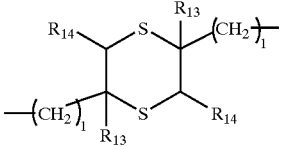

(wherein "l" is an integer of 0 to 3; R$_{13}$ and R$_{14}$ are each a hydrogen atom or alkyl group); and X$_{11}$ and X$_{12}$ are each a sulfur atom.

35. A poly(thio)ester copolymer comprising a repeating structural unit represented by the formula (1-A) as an essential structural unit:

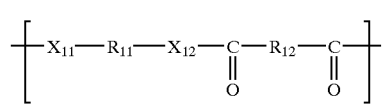

(1-A)

wherein $R_{11}$ is represented by one of the following formulae:

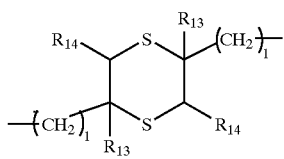

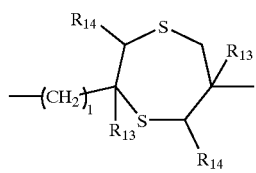 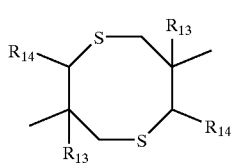

 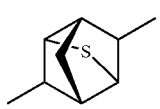

(wherein "I" is an integer of 0 to 3; and $R_{13}$ and $R_{14}$ are each a hydrogen atom or alkyl group); $R_{12}$ is an aromatic dicarboxylic acid residue; and $X_{11}$ and $X_{12}$ are each independently an oxygen atom or sulfur atom.

36. The poly(thio)ester copolymer according to claim 35, wherein $R_{12}$ in the formula (1-A) is a group represented by the following formula:

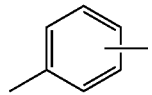

and $R_{11}$ is a group represented by the following formula:

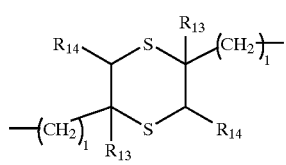

(wherein "I" is an integer of 0 to 3; $R_{13}$ and $R_{14}$ are each a hydrogen atom or alkyl group); and $X_{11}$ and $X_{12}$ are each a sulfur atom.

37. A resin composition comprising the poly(thio)ester copolymer according to claim 35.

* * * * *